United States Patent
Sato et al.

(10) Patent No.: US 10,513,127 B2
(45) Date of Patent: *Dec. 24, 2019

(54) AQUEOUS DISPERSION, METHOD FOR MANUFACTURING THE SAME, AND IMAGE FORMING METHOD

(71) Applicant: FUJIFILM CORPORATION, Minato-ku, Tokyo (JP)

(72) Inventors: Noriaki Sato, Kanagawa (JP); Ichiro Koyama, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,395

(22) Filed: Jul. 30, 2018

(65) Prior Publication Data

US 2019/0023921 A1   Jan. 24, 2019

Related U.S. Application Data

(63) Continuation of application No. PCT/JP2017/002175, filed on Jan. 23, 2017.

(30) Foreign Application Priority Data

Feb. 5, 2016  (JP) ................................ 2016-021363
Jul. 22, 2016  (JP) ................................ 2016-144557

(51) Int. Cl.
| | |
|---|---|
| B41J 2/21 | (2006.01) |
| C09D 11/30 | (2014.01) |
| C08J 3/03 | (2006.01) |
| C08L 57/00 | (2006.01) |
| C08L 71/00 | (2006.01) |
| C08L 77/06 | (2006.01) |

(52) U.S. Cl.
CPC .............. *B41J 2/2107* (2013.01); *C08J 3/03* (2013.01); *C08L 57/00* (2013.01); *C08L 71/00* (2013.01); *C08L 77/06* (2013.01); *C09D 11/30* (2013.01); *C08J 2377/06* (2013.01); *C08J 2471/00* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| | | | |
|---|---|---|---|
| 5,336,581 A | 8/1994 | Inaba et al. | |
| 5,516,621 A | 5/1996 | Tsuda et al. | |
| 5,563,017 A * | 10/1996 | Yabuki ................. | G03F 7/0285 430/138 |
| 5,596,051 A * | 1/1997 | Jahns .................... | B41M 5/165 428/402.2 |
| 5,910,556 A | 6/1999 | Wamprecht et al. | |
| 2004/0137031 A1 | 7/2004 | Seitz et al. | |
| 2012/0076843 A1 | 3/2012 | Jung et al. | |
| 2017/0218565 A1* | 8/2017 | Loccufier ............... | D06P 5/30 |
| 2018/0009927 A1 | 1/2018 | Suzuki et al. | |

FOREIGN PATENT DOCUMENTS

| | | |
|---|---|---|
| EP | 392876 A1 | 10/1990 |
| EP | 2933374 A1 | 10/2015 |
| EP | 3345967 A1 | 7/2018 |
| JP | H03-054276 A | 3/1991 |
| JP | H05-061237 A | 3/1993 |
| JP | H09-57091 A | 3/1997 |
| JP | H10-120752 A | 5/1998 |
| JP | H11-193344 A | 7/1999 |
| JP | 2000-211262 A | 8/2000 |

(Continued)

OTHER PUBLICATIONS

International Search Report issued in International Application No. PCT/JP2017/002175 dated Mar. 28, 2017.

(Continued)

*Primary Examiner* — Manish S Shah
(74) *Attorney, Agent, or Firm* — Solaris Intellectual Property Group, PLLC

(57) ABSTRACT

Provided are an aqueous dispersion including a microcapsule that has a shell having a three-dimensional cross-linked structure containing at least one bond selected from a urethane bond or a urea bond, and has a core, in which at least one of the shell or the core has a polymerizable group, including a dispersant that has at least one bond selected from a urethane bond or a urea bond and a hydrophilic group, and including water; a method for manufacturing the aqueous dispersion; and an image forming method using the aqueous dispersion.

19 Claims, No Drawings

(56) References Cited

FOREIGN PATENT DOCUMENTS

| | | | |
|---|---|---|---|
| JP | 2001-130143 | A | 5/2001 |
| JP | 2004-75759 | A | 3/2004 |
| JP | 2006-083344 | A | 3/2006 |
| JP | 2012-0529981 | A | 11/2012 |
| JP | 2015-174876 | A | 10/2015 |
| WO | 2016151904 | A1 | 9/2016 |

OTHER PUBLICATIONS

Written Opinion of the ISA issued in International Application No. PCT/JP2017/002175 dated Mar. 28, 2017.
English language translation of the following: Office action dated Jan. 8, 2019 from the JPO in a Japanese patent application No. 2017-565488 corresponding to the instant patent application.
Extended European Search Report dated Jan. 18, 2019, issued in corresponding EP Patent Application No. 17747247.9.

* cited by examiner

AQUEOUS DISPERSION, METHOD FOR MANUFACTURING THE SAME, AND IMAGE FORMING METHOD

CROSS-REFERENCE TO RELATED APPLICATIONS

This application is a continuation application of International Application No. PCT/JP2017/002175, filed Jan. 23, 2017, the disclosure of which is incorporated herein by reference in its entirety. Further, this application claims priority from Japanese Patent Application No. 2016-021363, filed Feb. 5, 2016, and Japanese Patent Application No. 2016-144557, filed Jul. 22, 2016, the disclosures of which are incorporated herein by reference in their entireties.

BACKGROUND OF THE INVENTION

1. Field of the Invention

The present disclosure relates to an aqueous dispersion, a method for manufacturing the same, and an image forming method.

2. Description of the Related Art

An aqueous dispersion in which a microcapsule having a core and a shell is dispersed in an aqueous medium (medium containing water) has been known in the related art.

As a method for manufacturing a microcapsule in which a core material (that is, the core) is certainly contained in the interior thereof, background fogging after shelf-life storage of a fixing-type heat sensitive recording material is reduced, and thus staining in a background portion of a non-fixing type heat sensitive recording material after image printing can be reduced, for example, a method for manufacturing a microcapsule has been known, in which a specific diazonium salt and a microcapsule wall precursor are added to an aqueous solution of water-soluble polymer so as to be emulsified, and then the microcapsule wall precursor is polymerized, and in which the pH of the aqueous solution of water-soluble polymer is adjusted to be more than 4 and 6 or less (for example, refer to JP2001-130143A). JP2001-130143A discloses a method for dispersing the microcapsule by using phthalated gelatin as a water-soluble polymer contained in the aqueous solution of water-soluble polymer.

In addition, in an aqueous ink which is advantageous from the viewpoints of handleability, odorlessness, safety, and the like, as an ink composition in which jetting stability is particularly high, color tone and color developability, weather fastness, water resistance, and ozone resistance are excellent, and which has no defects in image quality, an ink composition formed by using a coloring microparticle dispersion including a microcapsule in which capsule walls are formed by using a specific difunctional isocyanate compound and a polyfunctional isocyanate compound having three or more isocyanate groups in the same molecule, the microcapsule containing, in the interior thereof, a coloring composition that contains at least one hydrophobic coloring agent, at least one hydrophobic polymer, and at least one high-boiling-point organic solvent, as a core substance of the capsule, has been known (for example, refer to JP2004-75759A). JP2004-75759A discloses a method for dispersing the microcapsule by using phthalated gelatin.

In addition, as a microcapsule containing a volatile substance in the interior thereof, in which sustained release properties with respect to the volatile substance to be contained in the interior thereof are excellent and thus the volatile substance can be released over a long period, a microcapsule containing a volatile substance in the interior thereof has been known, in which a core portion is covered with a shell portion, the core portion is formed of a gel-shaped polyurethane resin containing volatile substances (such as agricultural chemicals, aromatics, and plant essential oils), and the shell portion is formed of a polyurea resin (for example, JP1997-57091A (JP-H09-57091A)). In JP1997-57091A (JP-H09-57091A), it is disclosed that an aqueous dispersion having the microcapsules containing volatile substances in the interior thereof, further contains a water-soluble polyurethane resin.

SUMMARY OF THE INVENTION

In recent years, a method for forming a film having excellent hardness through photocuring by using an aqueous dispersion having microcapsules to which photocuring properties are imparted has been examined. With respect to such an aqueous dispersion having the microcapsules to which photocuring properties are imparted, it is required to further improve the dispersion stability of the microcapsules in some cases. Specific examples of such cases include a case in which the aqueous dispersion having the microcapsules is used as an ink jet ink (hereinafter will also be simply referred to as "ink"), a case in which the aqueous dispersion having the microcapsules is used as an application liquid (so-called a "coating liquid") for forming a coated film, and the like.

Under the above circumstances, it is considered that further improving the dispersion stability of the microcapsules is desirable with respect to the aqueous dispersion having microcapsules disclosed in JP2001-130143A and JP2004-75759A.

The aqueous dispersion having the microcapsules disclosed in JP1997-57091A (JP-H09-57091A) is an aqueous dispersion in which volatile substances such as agricultural chemicals, aromatics, and plant essential oils are contained in the interior of microcapsules. Therefore, in JP1997-57091A (JP-H09-57091A), imparting photocuring properties to the aqueous dispersion having the microcapsules is not taken into consideration at all. On the contrary, in a case of imparting photocuring properties to the aqueous dispersion having the microcapsules disclosed in JP1997-57091A (JP-H09-57091A), properties of agricultural chemicals, aromatics, plant essential oils, and the like contained in the interior of the microcapsules deteriorate, and there is concern for damaging the original object of the invention disclosed in JP1997-57091A (JP-H09-57091A).

The present disclosure is based on the circumstances described above and is for achieving the following objects.

That is, an object of the present disclosure is to provide an aqueous dispersion by which a film having excellent hardness can be formed and in which dispersion stability of a microcapsule is excellent, and a method for manufacturing the same, and an image forming method using the aqueous dispersion.

Specific means for achieving the object includes the following aspects.

<1> An aqueous dispersion comprising: a microcapsule comprising: a shell having a three-dimensional cross-linked structure comprising at least one bond selected from a urethane bond or a urea bond; and a core, at least one of the shell or the core having a polymerizable group; a dispersant comprising: at least one bond selected from a urethane bond or a urea bond; and a hydrophilic group; and water.

<2> The aqueous dispersion according to <1>, wherein at least one hydrophilic group of the dispersant is an anionic group.

<3> The aqueous dispersion according to <2>, wherein the anionic group is at least one of a carboxy group or a salt of a carboxy group.

<4> The aqueous dispersion according to any one of <1> to <3>, wherein at least one dispersant is a compound represented by Formula (X).

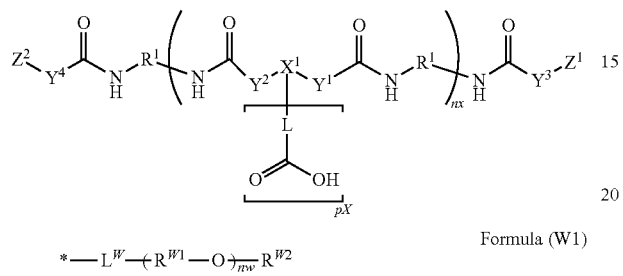

Formula (X)

Formula (W1)

In Formula (X), $X^1$ represents a (pX+2)-valent organic group; nX and pX each independently represents an integer that is 1 or more; $Y^1$ and $Y^2$ each independently represents O or NH; $Y^3$ represents O, S, NH, or $NZ^3$; $Y^4$ represents O, S, NH, or $NZ^4$; $R^1$ represents a divalent hydrocarbon group having 1 to 20 carbon atoms that may comprise an alicyclic structure or an aromatic ring structure and that may have a substituent; L represents a single bond or a divalent linking group; $Z^1$ and $Z^2$ each independently represent a hydrocarbon group having 1 to 30 carbon atoms that may have a substituent, or represents a group (W1) represented by Formula (W1); and $Z^3$ and $Z^4$ each independently represent a hydrocarbon group having 1 to 30 carbon atoms that may have a substituent, or represents a group (W1) represented by Formula (W1);

in Formula (W1), $R^{W1}$ represents an alkylene group having 1 to 6 carbon atoms that may be branched; $R^{W2}$ represents an alkyl group having 1 to 6 carbon atoms that may be branched; $L^W$ represents a single bond, or a divalent hydrocarbon group having 1 to 30 carbon atoms that may have a substituent; nw represents an integer from 2 to 200; and * represents a binding position; and a carboxy group in Formula (X) may be neutralized.

<5> The aqueous dispersion according to <4>, wherein the compound represented by Formula (X) is a compound represented by Formula (A).

represents O, S, NH, or $NZ^{44}$; $Z^{41}$ and $Z^{42}$ each independently represents a hydrocarbon group having 1 to 30 carbon atoms that may have a substituent, or represents a group (W1) represented by Formula (W1); and $Z^{43}$ and $Z^{44}$ each independently represents a hydrocarbon group having 1 to 30 carbon atoms which may have a substituent, or represents a group (W1) represented by Formula (W1); and a carboxy group in Formula (A) may be neutralized.

<6> The aqueous dispersion according to any one of <1> to <5>, wherein the dispersant has a value (U), that is obtained by the following Equation (U), that is from 1 mmol/g to 10 mmol/g:

Value (U)=(total number of urethane bonds and urea bonds contained in one molecule of dispersant/ molecular weight of dispersant)×1000.  Equation (U):

<7> The aqueous dispersion according to any one of <1> to <6>, wherein the dispersant comprises an anionic group as the hydrophilic group, and a value (a), that is a millimolar number of the anionic group included in 1 g of the dispersant, is from 0.3 mmol/g to 3.5 mmol/g.

<8> The aqueous dispersion according to any one of <1> to <7>, wherein a ratio of a mass content of the dispersant with respect to a mass content of a total solid content of the microcapsule is from 0.05 to 0.7.

<9> The aqueous dispersion according to any one of <1> to <8>, wherein the shell comprises a nonionic group as the hydrophilic group.

<10> The aqueous dispersion according to <9>, wherein the nonionic group included as the hydrophilic group of the shell is a group (WS) represented by Formula (WS).

$$*\!-\!(\!R^{W1}\!-\!O\!)_{\overline{nw}}R^{W2}$$  Formula (WS)

In Formula (WS), $R^{W1}$ represents an alkylene group having 1 to 6 carbon atoms that may be branched; $R^{W2}$ represents an alkyl group having 1 to 6 carbon atoms that may be branched; nw represents an integer from 2 to 200; and * represents a binding position.

<11> The aqueous dispersion according to any one of <1> to <10>, wherein the polymerizable group is a radical polymerizable group.

<12> The aqueous dispersion according to any one of <1> to <10>, wherein the core comprises a radical polymerizable compound.

<13> The aqueous dispersion according to any one of <1> to <12>, wherein the core comprises a di- or lower func-

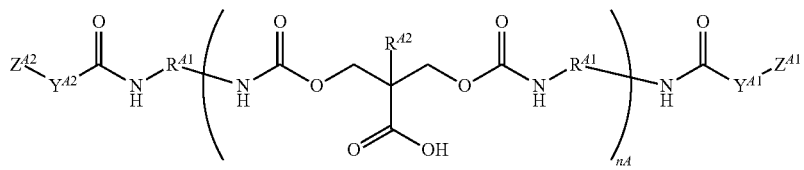

Formula (A)

In Formula (A), nA represents an integer that is 1 or more; $R^{41}$ represents a divalent hydrocarbon group having 1 to 20 carbon atoms that may contain an alicyclic structure or an aromatic ring structure and may have a substituent; $R^{42}$ represents a hydrogen atom or an alkyl group having 1 to 10 carbon atoms; $Y^{41}$ represents O, S, NH, or $NZ^{43}$; $Y^{42}$ tional radical polymerizable compound and a tri- or higher functional radical polymerizable compound.

<14> The aqueous dispersion according to any one of <1> to <13>, wherein the core comprises a photopolymerization initiator.

<15> The aqueous dispersion according to <14>, wherein the photopolymerization initiator contained in the core has at least one of a carbonyl compound or an acylphosphine oxide compound.

<16> The aqueous dispersion according to any one of <1> to <10>, wherein the polymerizable group is a thermally polymerizable group.

<17> The aqueous dispersion according to any one of <1> to <10> and <16>, wherein the core comprises a thermally polymerizable compound.

<18> The aqueous dispersion according to any one of <1> to <17>, wherein a sum of a total solid content of the microcapsule and a total amount of the dispersant with respect to a total solid content of the aqueous dispersion is 50% by mass or more.

<19> The aqueous dispersion according to any one of <1> to <18>, that is used as an ink jet ink.

<20> A method for manufacturing the aqueous dispersion according to any one of <1> to <19>, the method comprising a microcapsule-forming step of: mixing, with a water-phase component comprising water, an oil-phase component comprising an organic solvent, the dispersant, a tri- or higher functional isocyanate compound, and at least one of an isocyanate compound into which a polymerizable group is introduced or a polymerizable compound; and emulsifying the obtained mixture so as to form the microcapsule.

<21> An image forming method comprising: an application step of applying the aqueous dispersion according to any one of <1> to <19> to a recording medium; and a curing step of curing the aqueous dispersion applied to the recording medium.

According to the present disclosure, the aqueous dispersion wherein dispersion stability of the microcapsule is excellent and by which the film having excellent hardness can be formed, the method for manufacturing the same, and the image forming method using the aqueous dispersion, are provided.

DESCRIPTION OF THE PREFERRED EMBODIMENTS

Hereinafter, specific embodiments of the present invention will be described in detail, but the present invention is not limited to the following embodiments.

In the present specification, a range of numerical values described using "to" means a range including the numerical values listed before and after "to" as a minimum value and a maximum value.

In the present specification, the symbol "*" in chemical formulas represents a binding position.

In the present specification, in a case where there are a plurality of substances corresponding to each component in a composition, unless otherwise specified, the amount of each component in the composition means the total amount of the plurality of substances present in the composition.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, and visible rays.

In the present specification, the ultraviolet rays are referred to as "Ultra Violet (UV) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

[Aqueous Dispersion]

An aqueous dispersion of the present disclosure includes a microcapsule that has a shell having a three-dimensional cross-linked structure containing at least one bond selected from a urethane bond or a urea bond, and has a core, in which at least one of the shell or the core has a polymerizable group; a dispersant that has at least one bond selected from a urethane bond or a urea bond and a hydrophilic group; and water.

In the aqueous dispersion of the present disclosure, dispersion stability of the microcapsule is excellent, and a film having excellent hardness can be formed by the aqueous dispersion.

The reasons why such effects are exhibited are presumed as follows, but the present invention is not limited to the following reasons presumed.

As one reason of the aqueous dispersion of the present disclosure being excellent for the dispersion stability of the microcapsule, the following reasons is considered.

That is, in the aqueous dispersion of the present disclosure, the microcapsule which is a dispersoid has the shell having the three-dimensional cross-linked structure containing at least one bond selected from a urethane bond or a urea bond (hereinafter, will also be referred to as "urethane bond and the like"). Meanwhile, the dispersant in the aqueous dispersion of the present disclosure also contains at least one bond selected from a urethane bond or a urea bond (hereinafter, will also be referred to as "urethane bond and the like"). In the aqueous dispersion of the present disclosure, an interaction (for example, an interaction due to hydrogen bonding) is generated between the urethane bond and the like contained in the shell of the microcapsule, and the urethane bond and the like contained in the dispersant.

According to the aqueous dispersion of the present disclosure, it is considered that the interaction between the shell and the dispersant, is combined with a dispersing action of the hydrophilic group of the dispersant, thereby improving the dispersion stability of the microcapsule.

In addition, in the present disclosure, it is considered that the shell having the three-dimensional cross-linked structure containing the urethane bond and the like also contributes to the dispersion stability of the microcapsule.

That is, the microcapsule in the present disclosure includes the shell having the three-dimensional cross-linked structure containing the urethane bond or the like, and thus has a firm structure. It is considered that a structure of each microcapsule is firm, leading to the suppression of aggregation or linking between microcapsules, and therefore dispersion stability of the microcapsule is improved.

In examples described later, the dispersion stability of the microcapsule is evaluated by evaluating jetting properties from an ink jet head and storage stability.

Next, the presumed reason why a film having excellent hardness can be formed by the aqueous dispersion of the present disclosure will be described.

The aqueous dispersion of the present disclosure includes the microcapsule having a polymerizable group, and therefore has a property of being cured by polymerization. The polymerization (curing) is carried out by at least one selected from the group consisting of photoirradiation, heating, and infrared ray irradiation. Therefore, it is considered that in a case of forming a film using the aqueous dispersion of the present disclosure and curing the formed film, the film having excellent hardness can be formed.

In the examples described later, the hardness of the formed film is evaluated by evaluating pencil hardness of an image.

In the aqueous dispersion of the present disclosure, as the polymerizable group (polymerizable group contained in at least the core or the shell) of the microcapsule, a photopolymerizable group or a thermally polymerizable group is preferable.

As the photopolymerizable group, a radical polymerizable group is preferable, a group containing an ethylenic double bond is more preferable, and a group containing at least one of a vinyl group or a 1-methylvinyl group is even more preferable. As the radical polymerizable group, a (meth)acryloyl group is particularly preferable from the viewpoints of a radical polymerization reactivity and hardness of a formed film.

The thermally polymerizable group is preferably an epoxy group, an oxetanyl group, an aziridinyl group, an azetidinyl group, a ketone group, an aldehyde group, or a blocked isocyanate group.

The microcapsule may have only one kind of the polymerizable group or may have two or more kinds thereof.

Whether the "microcapsule has the polymerizable group" can be checked by, for example, Fourier transform infrared spectroscopy (FT-IR).

In the aqueous dispersion of the present disclosure, in the microcapsule, the polymerizable group may be contained in any one of the core and the shell or may be contained in both.

From the viewpoint of the film hardness, it is preferable that at least the core has the polymerizable group, and it is more preferable that the core contains the polymerizable compound.

The term "polymerizable compound" referred herein means a polymerizable compound capable of being contained in the core (internal polymerizable compound), among all compounds having the polymerizable group. The term "isocyanate compound into which the polymerizable group is introduced", which is for introducing the polymerizable group into the shell does not include a concept of the term "polymerizable compound" referred herein.

Each of preferable aspects of the "polymerizable compound" (internal polymerizable compound) and the "isocyanate compound into which the polymerizable group is introduced" will be described later.

Furthermore, according to the aqueous dispersion of the present disclosure, it is possible to form a film having excellent adhesiveness to a substrate.

The presume reason why the film having excellent adhesiveness to a substrate can be formed is the same as the presume reason why the film having excellent hardness can be formed.

In addition, the aqueous dispersion of particles is required to have redispersibility in some cases.

The term "redispersibility" means the properties in which in a case where an aqueous liquid (for example, water, an aqueous solution, an aqueous dispersion, or the like) is supplied to a solidified product formed by the evaporation of water from the aqueous dispersion, the particles (in this case, microcapsules) in the solidified product are dispersed again in the aqueous liquid. Examples of the solidified product include a solidified product of the aqueous dispersion formed by an application head or an ink jet head.

Because the aqueous dispersion of the present disclosure contains the microcapsule, the aqueous dispersion also has excellent redispersibility.

It is considered that the reason for having excellent redispersibility is the same as the reason why the dispersion stability of the microcapsule is excellent.

Furthermore, in the present disclosure, the shell of the microcapsule does not necessarily have the hydrophilic group. In the present disclosure, even if the shell of the microcapsule does not have the hydrophilic group, the dispersant has the hydrophilic group, thereby suitably securing the dispersion stability of the microcapsule.

That is, it is not necessary to incorporate the hydrophilic group into the shell, and a high degree of freedom of forming the shell (ease of forming the shell) is one of the advantages of the aqueous dispersion of the present disclosure.

In addition, in the case where the shell of the microcapsule has the hydrophilic group, the action of the hydrophilic group of the shell is combined with the action of the hydrophilic group of the dispersant, thereby further improving the dispersion stability of the microcapsule.

The condition that the dispersion stability of the microcapsule can be further improved in the case where the shell of the microcapsule has the hydrophilic group, is one of the advantages of the aqueous dispersion of the present disclosure.

A preferable aspect of the dispersant contained in the aqueous dispersion of the present disclosure will be described later.

Furthermore, in the aqueous dispersion of the present disclosure, a ratio of a content mass of the dispersant (hereinafter, will also be referred to as "mass ratio [dispersant/MC solid content]) is preferably 0.005 to 1.000, and more preferably 0.05 to 0.7 with respect to a content mass of a total solid content of the microcapsule.

With the mass ratio [dispersant/MC solid content] being 0.005 or more, the dispersion stability of the microcapsule is further improved.

With the mass ratio [dispersant/MC solid content] being 1.000 or less, the hardness of a film to be formed is further improved. It is considered that the reason is because in the aqueous dispersion, an amount of the microcapsule is secured to some extent, and therefore an amount of curable components (polymerizable group and the like) is also secured to some extent.

A mass ratio [dispersant/MC solid content] in the aqueous dispersion liquid can be checked by the following method.

First, the microcapsules and the dispersant are removed from the aqueous dispersion liquid by centrifugation. Next, the removed microcapsules and the dispersant are washed with a solvent so as to be separated into the dispersant and the core as a component to be dissolved in the solvent, and the shell as a residual component (that is, a component insoluble in the solvent). Next, identification and quantification of each component are carried out by analysis means such as high-performance liquid chromatography (HPLC), mass spectrometry (MS), nuclear magnetic resonance spectroscopy (NMR), and the like. Based on the obtained results, a mass ratio of the dispersant with respect to a total amount of the core and the shell (that is, MC solid content), that is, the mass ratio [dispersant/MC solid content] is determined.

In addition, in the aqueous dispersion of the present disclosure, the shell of the microcapsule preferably has a nonionic group as the hydrophilic group. According to the above description, the dispersion stability of the microcapsule is further improved.

As the nonionic group as the hydrophilic group, a group having a polyether structure is preferable, a monovalent group containing a polyalkyleneoxy group is more preferable, and a group (WS) represented by Formula (WS) is particularly preferable.

The total solid content of the microcapsule and the total amount of the dispersant in the aqueous dispersion of the present disclosure are preferably 50% by mass or more, more preferably 60% by mass or more, even more preferably 70% by mass or more, still more preferably 80% by mass or more, and yet more preferably 85% by mass or more, with respect to the total solid content of the aqueous dispersion.

According to the above description, the dispersion stability of the microcapsule is further improved, and the hardness of a film to be formed is further improved.

The total solid content of the microcapsule and the total amount of the dispersant in the aqueous dispersion of the present disclosure are preferably 1% by mass to 50% by mass, more preferably 3% by mass to 40% by mass, and even more preferably 5% by mass to 30% by mass, with respect to a total amount of the aqueous dispersion.

With the total amount being 1% by mass or more, the hardness of a film to be formed is further improved. With the total amount being 50% by mass or less, the dispersion stability of the microcapsule becomes excellent.

In the aqueous dispersion of the present disclosure, a volume average particle diameter of the microcapsule is preferably 0.01 μm to 10.0 μm, more preferably 0.01 μm to 5 μm, and even more preferably 0.05 μm to 1 μm, still more preferably 0.05 μm to 0.5 μm, and yet more preferably 0.05 μm to 0.3 μm, from the viewpoint of the dispersion stability of the microcapsule.

In the present specification, the term "volume average dispersing particle diameter of the microcapsule" indicates a value measured by a light scattering method. The measurement of a volume average dispersing particle diameter of the microcapsule by the light scattering method is carried out by using, for example, LA-960 (manufactured by HORIBA, Ltd.).

In addition, the term "volume average dispersing particle diameter of the microcapsule" means a volume average particle diameter of the microcapsules in a state of having been dispersed by the dispersant.

The aqueous dispersion of the present disclosure can be suitably used as a liquid for forming a film (for example, image) on a substrate (for example, recording medium).

Examples of such liquid include an ink jet ink for forming an image on a substrate as a recording medium, an application liquid (so called a coating liquid) for forming a coated film on a substrate, and the like.

The aqueous dispersion of the present disclosure is particularly preferably used as an ink jet ink. Therefore, an image in which the adhesiveness to a recording medium and the hardness are excellent can be formed. Furthermore, in this case, the aqueous dispersion has excellent jetting properties from an ink jet head.

An ink jet ink which is one of usage of the aqueous dispersion of the present disclosure may be an ink jet ink containing a colorant or may be a transparent ink jet ink not containing a colorant (also referred to as "clear ink" and the like).

The same applies to the application liquid which is another usage of the aqueous dispersion of the present disclosure.

In a case where the aqueous dispersion of the present disclosure is used as an ink jet ink containing the colorant, gloss of an image to be formed is improved.

It is presumed that the reason is because the above-described dispersant which interacts with the microcapsule, becomes to interact with the colorant in the case of the aqueous dispersion applied to a recording medium.

In the present disclosure, a substrate for forming a film is not particularly limited, and a known substrate can be used.

Examples of the substrate include paper, paper on which plastic (for example, polyethylene, polypropylene, polystyrene, and the like) is laminated, a metal plate (for example, a metal plate such as aluminum, zinc, copper, and the like), a plastic film (for example, films of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, acrylic resin, and the like), paper on which the aforementioned metal is laminated or vapor-deposited, a plastic film on which the aforementioned metal is laminated or vapor-deposited, and the like.

The aqueous dispersion of the present disclosure is particularly suitable for uses in which a film is formed on a nonabsorbent substrate, because the aqueous dispersion makes it possible to form a film exhibiting excellent adhesiveness with respect to a substrate.

As the nonabsorbent substrate, plastic substrates such as PVC substrate, PS substrate, PC substrate, PET substrate, glycol-modified PET substrate, PE substrate, PP substrate, and acrylic resin substrate are preferable.

The aqueous dispersion of the present disclosure may be used for usage of forming an image on a substrate other than the plastic substrates.

Examples of the substrate other than the plastic substrates include a textile substrate.

Examples of a material of the textile substrate include natural fibers such as cotton, silk, hemp, and wool; chemical fibers such as viscose rayon and reocell; synthetic fibers such as polyester, polyamide, and acryl; a mixture of at least two types selected from the group consisting of the natural fibers, the chemical fibers, and the synthetic fibers; and the like.

As the textile substrate, a textile substrate disclosed in paragraphs 0039 to 0042 of WO2015/158592A may be used.

Hereinafter, each component of the aqueous dispersion of the present disclosure will be described.

<Dispersant>

The aqueous dispersion of the present disclosure contains a dispersant that has at least one bond selected from a urethane bond or a urea bond, and a hydrophilic group. The aqueous dispersion of the present disclosure may contain one kind of the dispersant or may contain two or more kinds thereof.

In the aqueous dispersion of the present disclosure, the dispersant has a function of dispersing the microcapsule in an aqueous medium (medium containing water).

A preferable aspect of the aqueous dispersion of the present disclosure is an aspect which is a state in which the dispersant is adsorbed on the shell of the microcapsule through the interaction between the dispersant and the shell of the microcapsule (for example, an interaction due to hydrogen bonding). The interaction between the dispersant and the shell is not a covalent bond.

The interaction between the dispersant and the shell being not a covalent bond, can be confirmed by the following analysis.

First, the dispersant and the microcapsules are removed from the aqueous dispersion liquid by centrifugation. Next, the removed dispersant and microcapsules are washed with a solvent so as to be separated into the dispersant and the core as a component to be dissolved in the solvent, and the shell as a residual component (that is, a component insoluble in the solvent). Each of the separated components is subjected to Fourier transform infrared spectroscopy (FT-IR), and therefore the interaction between the dispersant and the shell being not a covalent bond can be confirmed.

The dispersant may be a low molecular weight compound or a polymer compound.

The weight-average molecular weight (Mw) of the dispersant is, for example, 300 or more and less than 10000, preferably 500 to 8000, and more preferably 1000 to 5000.

With the weight-average molecular weight (Mw) of the dispersant being 300 or more, the dispersion stability is further improved. Furthermore, the weight-average molecular weight (Mw) of the dispersant being 1000 or more, elution (migration) of the low molecular weight component from a film to be formed is further suppressed.

With the weight-average molecular weight (Mw) of the dispersant being less than 10000, the manufacture of the dispersant becomes simpler.

The weight-average molecular weight (Mw) of the dispersant is measured by gel permeation chromatography (GPC).

In the present specification, the mass of a compound is measured by the gel permeation chromatography (GPC), by using HLC (registered trademark)-8020 GPC (manufactured by Tosoh Corporation) as a measurement device, three columns of TSKgel (registered trademark) Super Multipore HZ-H (4.6 mm ID×15 cm, manufactured by Tosoh Corporation) as columns, and tetrahydrofuran (THF) as an eluent. Furthermore, GPC is performed using an RI detector under the measurement conditions of a sample concentration of 0.45% by mass, a flow rate of 0.35 ml/min, a sample injection amount of 10 μl, and a measurement temperature of 40° C.

A calibration curve is prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

The dispersant preferably has at least one of an anionic group or a nonionic group as the hydrophilic group from the viewpoint of the dispersion stability and from the viewpoint of ease of application to ink.

At least one hydrophilic group of the dispersant is more preferably the anionic group from the viewpoint of further improving the dispersion stability.

The anionic group may be an unneutralized anionic group or may be a neutralized anionic group.

Examples of the unneutralized anionic group include a carboxy group, a sulfo group, a sulfate group, a phosphonic acid group, a phosphoric acid group, and the like.

Examples of the neutralized anionic group include a salt of a carboxy group, a salt of a sulfo group, a salt of a sulfate group, a salt of a phosphonic acid group, a salt of a phosphoric acid group, and the like.

In the present specification, the term "neutralized carboxy group" refers to a carboxy group as the anionic group being in the form of "salt" (for example, "—COONa"). The same applied to a sulfo group, a sulfate group, a phosphonic acid group, and a phosphoric acid group as the anionic group.

The neutralization can be carried out by using alkali metal hydroxides (for example, sodium hydroxides, potassium hydroxides, and the like), and organic amines (for example, triethylamine and the like).

As the anionic group capable of being contained in the dispersant, at least one selected from the group consisting of a carboxy group, a salt of a carboxy group, a sulfo group, a salt of a sulfo group, a sulfate group, a salt of a sulfate group, a phosphonic acid group, a salt of a phosphonic acid group, a phosphoric acid group, and a salt of a phosphoric acid group is preferable, and at least one selected from the group consisting of a carboxy group and a salt of a carboxy group is more preferable, from the viewpoint of the dispersion stability.

As the "salt" in the salt of a carboxy group, the salt of a sulfo group, the salt of a sulfate group, the salt of a phosphonic acid group, and the salt of a phosphoric acid group, which are described above, an alkali metal salt or an organic amine salt is preferable, and an alkali metal salt is more preferable.

As the alkali metal in the alkali metal salt, K or Na is preferable.

In a case where the dispersant has the anionic group, a degree of neutralization of the anionic group of the dispersant is preferably 50% to 100%, more preferably 70% to 95%, and even more preferably 70% to 90%.

The degree of neutralization referred herein refers to a ratio of "the number of neutralized anionic group" (that is, ratio (the number of neutralized anionic group/(the number of unneutralized anionic group+the number of neutralized anionic group)) with respect to "a total of the number of unneutralized anionic group and the number of neutralized anionic group" in the all dispersants contained in the aqueous dispersion liquid.

The degree of neutralization (%) of the dispersant is measured by neutralization titration.

In addition, in a case where the dispersant has the anionic group, a degree of neutralization of the anionic group of the all dispersants and microcapsules is preferably 50% to 100%, more preferably 70% to 95%, and even more preferably 70% to 90%.

The degree of neutralization referred herein refers to a ratio of "the number of neutralized anionic group" (that is, ratio (the number of neutralized anionic group/(the number of unneutralized anionic group+the number of neutralized anionic group)) with respect to "a total of the number of unneutralized anionic group and the number of neutralized anionic group" in the all dispersants and microcapsules contained in the aqueous dispersion liquid.

The degree of neutralization (%) of the all dispersants and microcapsules is also measured by neutralization titration.

The degree of neutralization (%) of the all dispersants and microcapsules in the aqueous dispersion of the present disclosure is calculated as below.

First, an aqueous dispersion containing the dispersants and the microcapsules which is a measurement target is prepared.

50 g of the prepared aqueous dispersion is subjected to centrifugation under the conditions of 80,000 rounds per minute (rpm; the same shall apply hereinafter) and 40 minutes. The supernatant generated by the centrifugation is removed, and the precipitate (dispersants and microcapsules) is collected.

Approximately 0.5 g of the dispersants and the microcapsules collected in a container 1 is weighed, and a weighed value W1 (g) is recorded. Subsequently, a mix solution of 54 mL of tetrahydrofuran (THF) and 6 mL of distilled water is added thereto, and the weighed dispersants and microcapsules are diluted so as to obtain a sample 1 for measurement of degree of neutralization.

Titration is performed on the obtained sample 1 for measurement of degree of neutralization by using 0.1 N (=0.1 mol/L) aqueous solution of sodium hydroxide as a titrant, and a titrant volume required up to the equivalent point is recorded as F1 (mL). In a case where a plurality of equivalent points were obtained in the titration, a maximum value among a plurality of titrant volumes required up to a plurality of equivalent points was taken as F1 (mL). The product of F1 (mL) and the normality of the aqueous solution of sodium hydroxide (0.1 mol/L) corresponds to the millimolar number of unneutralized anionic groups (for example, —COOH) among anionic groups contained in the dispersants and the microcapsules.

In addition, approximately 0.5 g of the dispersants and the microcapsules collected in a container 2 is weighed, and a weighed value W2 (g) is recorded. Subsequently, 60 mL of acetate is added thereto, and the weighed dispersants and microcapsules are diluted so as to obtain a sample 2 for measurement of degree of neutralization.

Titration is performed on the obtained sample 2 for measurement of degree of neutralization by using 0.1 N (=0.1 mol/L) perchloric acid-acetic acid solution as a titrant, and a titrant volume required up to the equivalent point is recorded as F2 (mL). In a case where a plurality of equivalent points were obtained in the titration, a maximum value among a plurality of titrant volumes required up to a plurality of equivalent points was taken as F2 (mL). The product of F2 (mL) and the normality of a perchloric acid-acetic acid solution (0.1 mol/L) corresponds to the millimolar number of neutralized anionic groups (for example, —COONa) among anionic groups contained in the dispersants and the microcapsules.

Based on the measurement values of "F1 (mL)" and "F2 (mL)", the degree of neutralization (%) of the anionic groups is calculated according to the following equations.

$F1$ (mL)×normality of aqueous solution of sodium hydroxide (0.1 mol/L)/$W1$ (g)+$F2$ (mL)×normality of perchloric acid-acetic acid solution (0.1 mol/L)/$W2$ (g)=a total of the millimolar number of anionic groups contained in a total of 1 g of the dispersants and the microcapsules (a total of the millimolar number of neutralized anionic groups and unneutralized anionic groups) (mmol/g)     (1)

$F2$ (mL)×normality of perchloric acid-acetic acid solution (0.1 mol/L)/$W2$ (g)=the millimolar number of neutralized anionic groups among anionic groups contained in a total of 1 g of the dispersants and the microcapsules (mmol/g)     (2)

Degree of neutralization (%)=(2)/(1)×100

In addition, as the nonionic group as the hydrophilic group of the dispersant, a group having a polyether structure is preferable, a monovalent group containing a polyalkyleneoxy chain is preferable, and a group (W1) represented by Formula (W1) is particularly preferable, from the viewpoint of the dispersion stability.

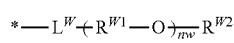

Formula (W1)

In Formula (W1), $R^{W1}$ represents an alkylene group having 1 to 6 carbon atoms which may be branched, $R^{W2}$ represents an alkyl group having 1 to 6 carbon atoms which may be branched, $L^W$ represents a single bond, or a divalent hydrocarbon group having 1 to 30 carbon atoms which may have a substituent, nw represents an integer from 2 to 200, and * represents a binding position.

In Formula (W1), the number of carbon atoms in the alkylene group represented by $R^{W1}$ having 1 to 6 carbon atoms which may be branched is preferably 2 to 4, more preferably 2 or 3, and particularly preferably 2 (that is, $R^{W1}$ is an ethylene group).

In Formula (W1), the number of carbon atoms in the alkyl group represented by $R^{W2}$ having 1 to 6 carbon atoms which may be branched is preferably 1 to 4, and particularly preferably 1 (that is, $R^{W2}$ is a methyl group).

In Formula (W1), as nw, an integer from 2 to 150 is preferable, an integer from 2 to 100 is more preferable, an integer from 2 to 50 is even more preferable, and an integer from 2 to 20 is particularly preferable.

In Formula (W1), $L^W$ represents a single bond, or a divalent hydrocarbon group having 1 to 30 carbon atoms which may have a substituent.

In Formula (W1), the term "carbon atoms" in the phrase "a divalent hydrocarbon group having 1 to 30 carbon atoms which may have a substituent" represented by $L^W$ means, in a case of having a substituent, the number of carbon atoms of the whole group having a substituent.

The number of "carbon atoms" in the phrase "a divalent hydrocarbon group having 1 to 30 carbon atoms which may have a substituent" represented by $L^W$ is preferably 2 to 25 and more preferably 4 to 20.

In Formula (W1), as "divalent hydrocarbon group" in the phrase "a divalent hydrocarbon group having 1 to 30 carbon atoms which may have a substituent" represented by $L^W$, an alkylene group or an arylene group is preferable.

In Formula (W1), examples of "substituent" in the phrase "a divalent hydrocarbon group having 1 to 30 carbon atoms which may have a substituent" represented by $L^W$ include an alkoxy group, an alkoxycarbonyl group, an acyl group, an acyloxy group, a carboxy group, a salt of carboxy group, a (meth)acryloyloxy group, a vinyl group, a vinyloxy group, and the like.

As $L^W$ in Formula (W1), a single bond or an alkylene group having 1 to 10 carbon atoms is preferable, a single bond or an alkylene group having 1 to 6 carbon atoms is more preferable, and a single bond is particularly preferable.

In addition, the dispersant may have both the anionic group and the nonionic group as the hydrophilic group.

Preferable aspects of each of the anionic group and the nonionic group are as described above.

Furthermore, with respect to the dispersant, a value (U) calculated by Equation (U) is preferably 0.5 mmol/g to 11 mmol/g, and more preferably 1 mmol/g to 10 mmol/g.

Value $(U)$=(total number of urethane bond and urea bond contained in one molecule of dispersant/ molecular weight of dispersant)×1000     Equation (U)

With the value (U) being 0.5 mmol/g or more, the dispersion stability of the microcapsule is further improved. Furthermore, the hardness of a film to be formed is also improved.

With the value (U) being 11 mmol/g or less, dissolution in water is suppressed, and adsorption to the microcapsules is promoted, whereby the dispersion stability is further improved.

In a case where the dispersant is a compound having the molecular weight of 1000 or more, as "total number of urethane bond and urea bond contained in one molecule of dispersant", a value of the total number of a urethane bond and a urea bond contained in one molecule of the dispersant having a number average molecular weight is used, and as "molecular weight of dispersant", a value of the dispersant having a number average molecular weight is used.

Furthermore, in a case where the dispersant has the anionic group, a value (a) which is the millimolar number of anionic groups contained in 1 g of the dispersant is preferably 0.05 mmol/g to 5 mmol/g, more preferably 0.1 mmol/g to 5 mmol/g, even more preferably 0.2 mmol/g to 4 mmol/g, and still more preferably 0.3 mmol/g to 3.5 mmol/g.

With the value (a) being 0.05 mmol/g or more, the dispersion stability of the microcapsule is further improved.

With the value (a) being 5 mmol/g or less, water resistance of a film to be formed is further improved.

At least one dispersant is preferably a compound represented by Formula (X) from the viewpoint of the dispersion stability of the microcapsule.

As the compound represented by Formula (X), a compound represented by Formula (A), a compound represented by Formula (B), or a compound represented by Formula (C) is preferable, and the compound represented by Formula (A) is particularly preferable.

Each of the compound represented by Formula (X), the compound represented by Formula (A), the compound represented by Formula (B), and the compound represented by Formula (C) is a compound having, as the hydrophilic group, a carboxy group that is an anionic group. As shown in each Formula, a carboxy group may be neutralized (that is, at least a part thereof may be a salt of a carboxy group).

The compound represented by Formula (D) is a compound having a —($R^{D1}$O)$_{nD}$$R^{D2}$ group that is a nonionic group as a hydrophilic group.

(Compound Represented by Formula (X))

The compound represented by Formula (X) is a compound having, as the hydrophilic group, a carboxy group which may be neutralized, which is an anionic group.

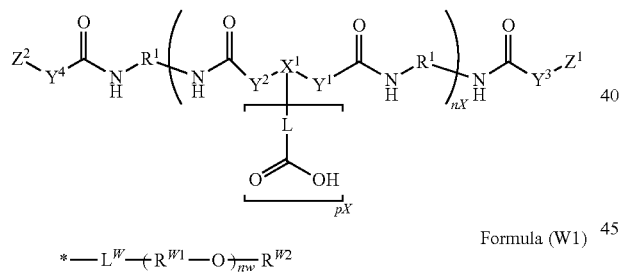

Formula (X)

Formula (W1)

In Formula (X), $X^1$ represents a (pX+2)-valent organic group, nX and pX each independently represent an integer that is 1 or more, $R^1$ represents a divalent hydrocarbon group having 1 to 20 carbon atoms which may contain an alicyclic structure or an aromatic ring structure and may have a substituent, $Y^1$ and $Y^2$ each independently represent O or NH, $Y^3$'s each independently represent O, S, NH, or N$Z^3$, $Y^4$'s each independently represents O, S, NH, or N$Z^4$, L represents a single bond or a divalent linking group, $Z^1$ and $Z^2$ each independently represent a hydrocarbon group having 1 to 30 carbon atoms which may have a substituent, or the group (W1) represented by Formula (W1), and $Z^3$ and $Z^4$ each independently represent a hydrocarbon group having 1 to 30 carbon atoms which may have a substituent, or the group (W1) represented by Formula (W1), in Formula (W1), $R^{W1}$ represents an alkylene group having 1 to 6 carbon atoms which may be branched, $R^{W2}$ represents an alkyl group having 1 to 6 carbon atoms which may be branched, $L^W$ represents a single bond, or a divalent hydrocarbon group having 1 to 30 carbon atoms which may have a substituent, nw represents an integer from 2 to 200, and * represents a binding position, and a carboxy group in Formula (X) may be neutralized.

A plurality of $R^1$'s present in Formula (X) may be the same as or different from each other.

In addition, in Formula (X), in a case where a plurality of $X^1$'s are present, the plurality of $X^1$'s may be the same as or different from each other. The same applies to $Y^1$, $Y^2$, and pX.

nX represents an integer that is 1 or more, but is preferably an integer from 1 to 1000, more preferably an integer from 1 to 500, even more preferably an integer from 2 to 300, and particularly preferably an integer from 2 to 100.

pX represents an integer that is 1 or more.

As pX, an integer from 1 to 6 is preferable, an integer from 1 to 3 is more preferable, an integer from 1 or 2 is even more preferable, and an integer that is 1 is particularly preferable.

As specific examples of $X^1$, a group represented by (XX-1) to (XX-7) (hereinafter, will also be referred to as groups (XX-1) to (XX-7)) is preferable.

Among these, the groups (XX-1) to (XX-3) are even more preferable, and the group (XX-1) is particularly preferable.

(XX-1)

(XX-2)

(XX-3)

(XX-4)

(XX-5)

(XX-6)

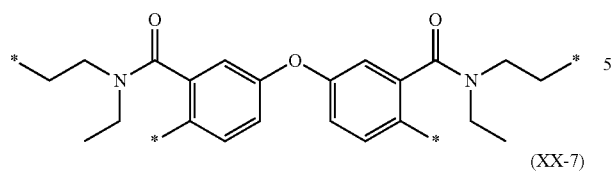

(XX-7)

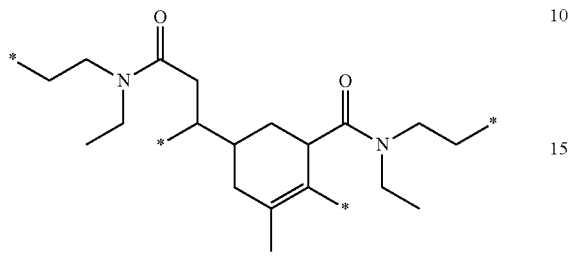

$R^{A2}$ in the group (XX-1) and $R^{C2}$ in the group (XX-3) each independently represent a hydrogen atom or an alkyl group having 1 to 10 carbon atoms (more preferably 1 to 6 carbon atoms).

$R^{B2}$ in the group (XX-2) represents an alkyl group having 1 to 10 carbon atoms (more preferably 1 to 6 carbon atoms).

$L^C$ in the group (XX-3) represents a divalent hydrocarbon group having 1 to 20 carbon atoms which may contain an alicyclic structure or an aromatic ring structure and may have a substituent.

x in the group (XX-2) represents an integer from 0 to 3, y represents an integer from 1 to 4, and a total of x and y is an integer from 1 to 4.

In addition, in Formula (X), the term "carbon atoms" in the phrase "a divalent hydrocarbon group having 1 to 20 carbon atoms which may contain an alicyclic structure or an aromatic ring structure and may have a substituent" in $R^1$ means, in a case of having a substituent, the number of carbon atoms of the whole group having a substituent.

The term "divalent hydrocarbon group" in the phrase "a divalent hydrocarbon group having 1 to 20 carbon atoms which may contain an alicyclic structure or an aromatic ring structure and may have a substituent" in $R^1$ means an alkylene group, an arylene group, an alkylene arylene group, an arylene alkylene arylene group, an alkylene arylene alkylene group, and the like, which may contain an alicyclic structure.

The term "substituent" in the phrase "a divalent hydrocarbon group having 1 to 20 carbon atoms which may contain an alicyclic structure or an aromatic ring structure and may have a substituent" in $R^1$ means an alkoxy group, an alkoxycarbonyl group, an acyl group, an acyloxy group, and the like.

$R^1$ is preferably a group represented by any one of (XR-1) to (XR-20) (hereinafter, will also be referred to as groups (XR-1) to (XR-20)). In (XR-1) to (XR-20), * represents a binding position.

(XR-1)

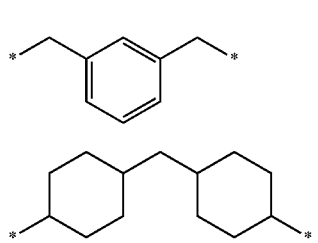

(XR-2)

(XR-3)

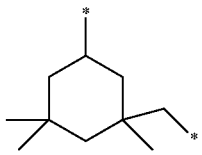

(XR-4)

(XR-5)

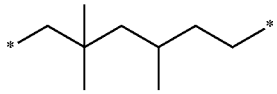

(XR-6)

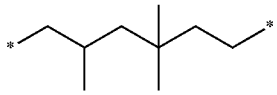

(XR-7)

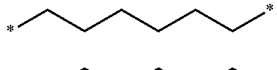

(XR-8)

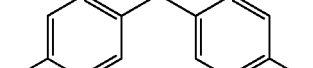

(XR-9)

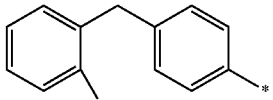

(XR-10)

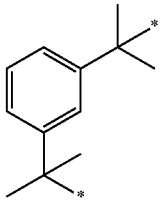

(XR-11)

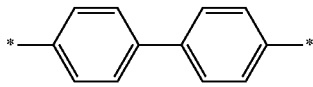

(XR-12)

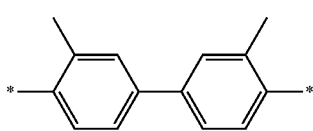

(XR-13)

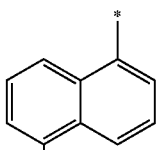

(XR-14)

-continued

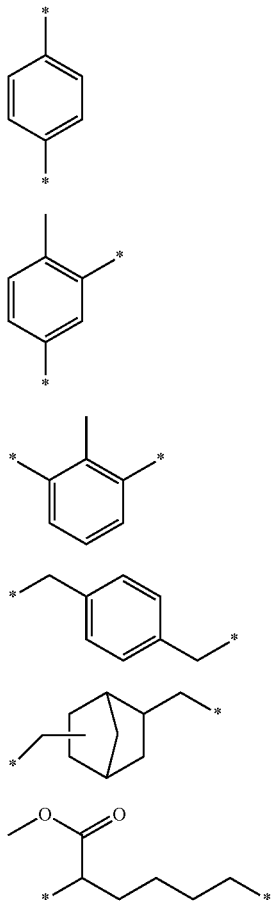

(XR-15)

(XR-16)

(XR-17)

(XR-18)

(XR-19)

(XR-20)

It is particularly preferable that $R^1$'s each independently represent a group (XR-1) which is a group derived from m-xylylene diisocyanate (XDI), a group (XR-2) which is a group derived from dicyclohexylmethane 4,4'-diisocyanate, a group (XR-3) which is a group derived from isophorone diisocyanate (IPDI), a group (XR-4) which is a group derived from 1,3-bis(isocyanatomethyl)cyclohexane, a group (XR-5) or a group (XR-6) which is a group derived from trimethylhexamethylene diisocyanate (TMHDI), or a group (XR-7) which is a group derived from hexamethylene diisocyanate (HDI).

In Formula (X), $Y^1$ and $Y^2$ each independently represent O or NH, and O is preferable.

In Formula (X), L represents a single bond or a divalent linking group, but a single bond is preferable.

A preferable range of a divalent linking group represented by L is the same as the preferable range of "a divalent hydrocarbon group having 1 to 20 carbon atoms which may contain an alicyclic structure or an aromatic ring structure and may have a substituent" in $R^1$.

In Formula (X), $Z^1$ and $Z^2$ each independently represent a hydrocarbon group having 1 to 30 carbon atoms which may have a substituent, or the group (W1) represented by Formula (W1).

A preferable range of the group (W1) represented by Formula (W1), which is represented by $Z^1$ and $Z^2$ is as described above.

In Formula (X), the term "carbon atoms" in the phrase "a hydrocarbon group having 1 to 30 carbon atoms which may have a substituent" represented by $Z^1$ and $Z^2$ means, in a case of having a substituent, the number of carbon atoms of the whole group having a substituent.

The number of "carbon atoms" in the phrase "a hydrocarbon group having 1 to 30 carbon atoms which may have a substituent" represented by $Z^1$ and $Z^2$ is preferably 2 to 25 and more preferably 4 to 20.

In Formula (X), as "hydrocarbon group" in the phrase "a hydrocarbon group having 1 to 30 carbon atoms which may have a substituent" represented by $Z^1$ and $Z^2$, an alkyl group or an aryl group is preferable.

In Formula (X), examples of "substituent" in the phrase "a hydrocarbon group having 1 to 30 carbon atoms which may have a substituent" represented by $Z^1$ and $Z^2$ include an alkoxy group, an alkoxycarbonyl group, an acyl group, an acyloxy group, a carboxy group, a salt of carboxy group, a (meth)acryloyloxy group, a vinyl group, a vinyloxy group, and the like.

A carboxy group in Formula (X) may be neutralized.

A degree of neutralization of a carboxy group of the compound represented by Formula (X) is preferably 50% to 100% and more preferably 70% to 90%.

In Formula (X), a preferable aspect of the group (W1) represented by Formula (W1) is as described above.

The compound represented by Formula (X) is preferably synthesized according to the following Synthesize Scheme X.

—Synthesize Scheme X—

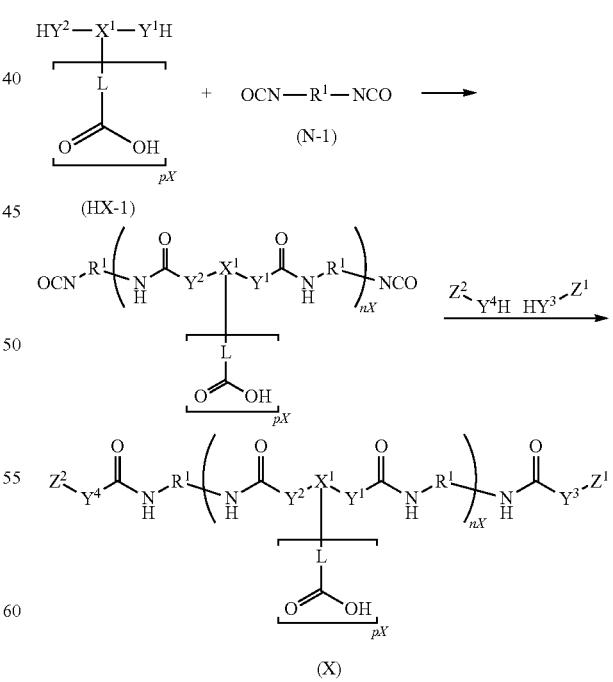

In Synthesize Scheme X, each of symbols of $X^1$, Y', and the like is the same as each of symbols of $X^1$, and the like in Formula (X).

In Synthesize Scheme X, a compound (HX-1) having an active hydrogen group and a carboxy group which may be neutralized, is allowed to react with a difunctional isocyanate compound (N-1) so as to form a skeleton portion of the compound represented by Formula (X), then, both ends are sealed by a compound represented by $Z^2$—$Y^4$H and a compound represented by $Z^1$—$Y^3$H which are end capping agents, and therefore the compound represented by Formula (X) is manufactured.

Specific examples of the compound (HX-1) which is a raw material will be described below, but the compound (HX-1) is not limited to the following specific examples.

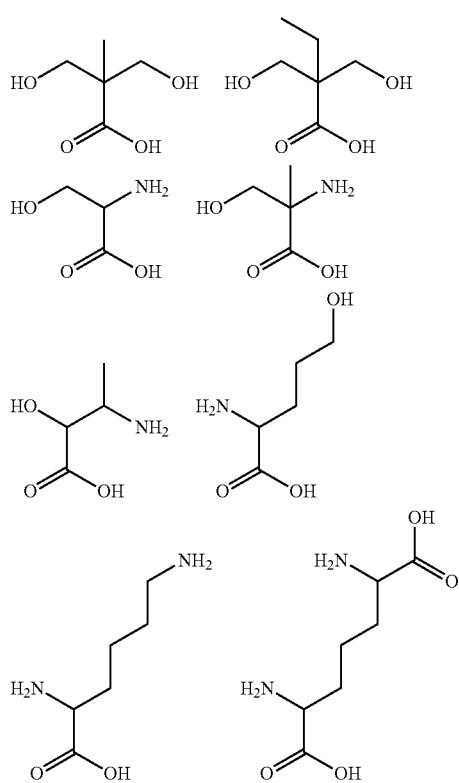

-continued

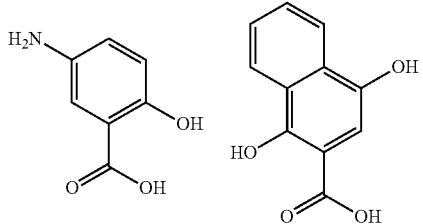

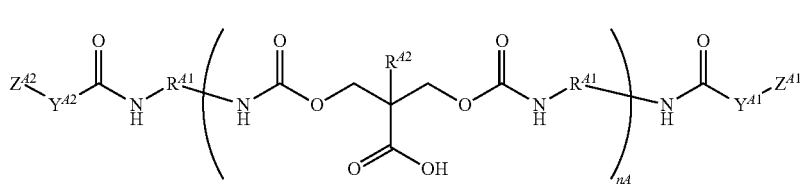

As the above-described compound represented by Formula (X), the compound represented by Formula (A), the compound represented by Formula (B), or the compound represented by Formula (C) is preferable, and the compound represented by Formula (A) is particularly preferable.

Hereinafter, the compounds represented by Formula (A) to Formula (C) will be described, and then a dispersant (compound represented by Formula (D) and the like) other than the compound represented by Formula (X) will be described.

(Compound Represented by Formula (A))

The compound represented by Formula (A) is as below.

Formula (A)

$$Z^{A2}-Y^{A2}\underset{H}{\overset{O}{\|}}\underset{N}{C}-R^{A1}-\underset{H}{\overset{O}{\|}}\underset{N}{C}-O-CH_2-\underset{\underset{C=O}{\underset{|}{R^{A2}}}}{C}-CH_2-O-\underset{H}{\overset{O}{\|}}\underset{N}{C}-N-R^{A1}\Big)_{nA}\underset{H}{\overset{O}{\|}}\underset{N}{C}-Y^{A1}-Z^{A1}$$

-continued

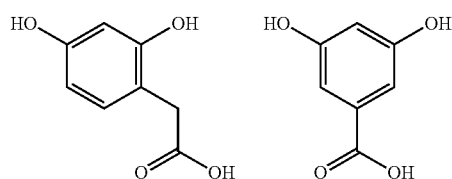

In Formula (A), nA represents an integer that is 1 or more, $R^{A1}$ represents a divalent hydrocarbon group having 1 to 20 carbon atoms which may contain an alicyclic structure or an aromatic ring structure and may have a substituent, $R^{A2}$ represents a hydrogen atom or an alkyl group having 1 to 10 carbon atoms, $Y^{A1}$ represents O, S, NH, or $NZ^{A3}$, $Y^{A2}$ represents O, S, NH, or $NZ^{A4}$, $Z^{A1}$ and $Z^{A2}$ each independently represent a hydrocarbon group having 1 to 30 carbon atoms which may have a substituent, or the group (W1) represented by Formula (W1), and $Z^{A3}$ and $Z^{A4}$ each independently represent a hydrocarbon group having 1 to 30 carbon atoms which may have a substituent, or the group (W1) represented by Formula (W1), and a carboxy group in Formula (A) may be neutralized.

In Formula (A), nA, $R^{A1}$, $Y^{A1}$, $Y^{A2}$, $Z^{A1}$, and $Z^{A2}$ have the same definition as nX, $R^1$, $Y^1$, $Y^2$, $Z^1$, and $Z^2$ in Formula (X), respectively, and preferable aspects thereof are also the same.

In Formula (A), $R^{A2}$ represents a hydrogen atom or an alkyl group having 1 to 10 carbon atoms.

As an alkyl group having 1 to 10 carbon atoms represented by $R^{A2}$, an alkyl group having 1 to 6 carbon atoms is preferable.

As $R^{A2}$, an alkyl group having 1 to 10 carbon atoms is preferable, and an alkyl group having 1 to 6 carbon atoms is preferable.

In a case where the aqueous dispersion of the present disclosure contains the compound represented by Formula (A), a degree of neutralization of a carboxy group of the compound represented by Formula (A) in the aqueous dispersion is preferably 50% to 100% and more preferably 70% to 90%.

Specific examples of the compound represented by Formula (A) include the following Dispersants A-1 to A-24, but the compound represented by Formula (A) is not limited to these specific examples.

| Dispersant | Structure | $R^{A1}$ | $Y^{A1}-Z^{A1}$, $Y^{A2}-Z^{A2}$ |
|---|---|---|---|
| A-1 | NH-R^{A1}-NH-C(O)O-CH2-C(Et)(COOH)-CH2-O-C(O)NH-R^{A1}-[NH-C(O)-Y^{A1}-Z^{A1}]_{nA}) | ![3,3,5-trimethylcyclohexyl] | ![2-methoxyethyl acrylate] |
| A-2 | | | ![AE-400 n=10] |
| A-3 | | | ![AP-400 n=6] |
| A-4 | | | ![n=10 methoxy PEG ether] |
| A-5 | | | ![propoxy-butoxy] |
| A-6 | | | ![benzyloxy] |
| A-7 | | | ![cyclohexylmethoxy] |

-continued

| Dispersant | Structure | |
|---|---|---|
| | $R^{41}$ | $Y^{A1}-Z^{A1}, Y^{A2}-Z^{A2}$ |
| A-8 | | propyl-O-* |
| A-9 | | decyl-O-* |
| A-10 | | tetradecyl-O-* |
| A-11 | | 4-hydroxycarbonylphenyl-O-* |
| A-12 | | di-n-butylamino-* |
| A-13 | | di-n-hexylamino-* |
| A-14 | | di(2-ethylhexyl)amino-* |
| A-15 | | dibenzylamino-* |
| A-16 | | 1,2,3,4-tetrahydroquinolin-1-yl-* |

-continued
| Dispersant | Structure | $R^{A1}$ | $Y^{A1}-Z^{A1}, Y^{A2}-Z^{A2}$ |
|---|---|---|---|
| A-17 | 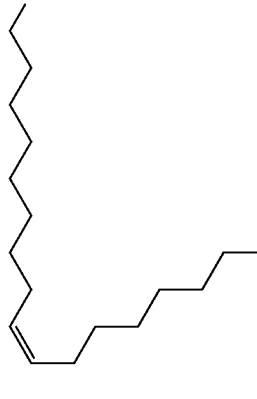 | | |
| A-18 |  | 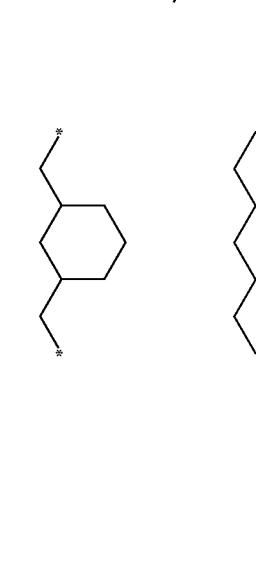 | |
| A-19 |  |  | |
| A-20 | 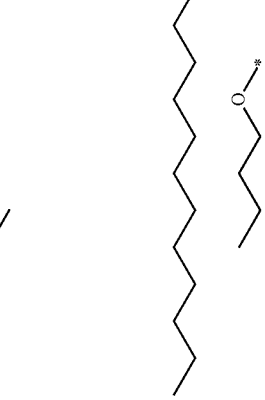 |  | |

-continued

| Dispersant | Structure | $R^{A1}$ | $Y^{A1}-Z^{A1}, Y^{A2}-Z^{A2}$ |
|---|---|---|---|
| A-21 | | | |
| A-22 | | | |
| A-23 | | | |
| A-24 | | | |

(Compound Represented by Formula (B))
The compound represented by Formula (B) is as below.

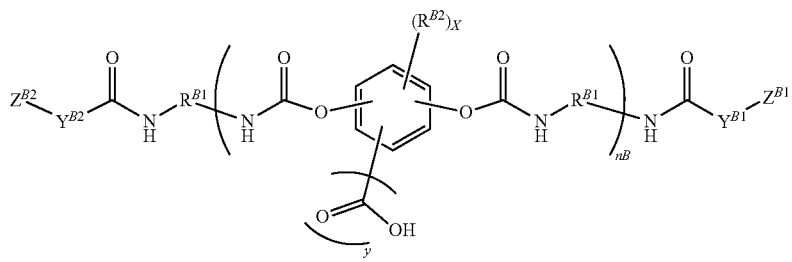

Formula (B)

In Formula (B), nB represents an integer that is 1 or more, x represents an integer from 0 to 3, y represents an integer from 1 to 4, and a total of x and y is an integer from 1 to 4, $R^{B1}$ represents a divalent hydrocarbon group having 1 to 20 carbon atoms which may contain an alicyclic structure or an aromatic ring structure and may have a substituent, $R^{B2}$ represents an alkyl group having 1 to 10 carbon atoms, $Y^{B1}$ represents O, S, NH, or $NZ^{B3}$, $Y^{B2}$ represents O, S, NH, or $NZ^{B4}$, $Z^{B1}$ and $Z^{B2}$ each independently represent a hydrocarbon group having 1 to 30 carbon atoms which may have a substituent, or the group (W1) represented by Formula (W1), $Z^{B3}$ and $Z^{B4}$ each independently represent a hydrocarbon group having 1 to 30 carbon atoms which may have a substituent, or the group (W1) represented by Formula (W1), and a carboxy group in Formula (B) may be neutralized.

In Formula (B), nB, $R^{B1}$, $Y^{B1}$, $Y^{B2}$, $Z^{B1}$, and $Z^{B2}$ have the same definition as nX, $R^1$, $Y^1$, $Y^2$, $Z^1$, and $Z^2$ in Formula (X), respectively, and preferable aspects thereof are also the same.

In Formula (B), $R^{B2}$ represents an alkyl group having 1 to 10 carbon atoms.

As $R^{B2}$, an alkyl group having 1 to 6 carbon atoms is preferable.

In a case where the aqueous dispersion of the present disclosure contains the compound represented by Formula (B), a degree of neutralization of a carboxy group of the compound represented by Formula (B) in the aqueous dispersion is preferably 50% to 100% and more preferably 70% to 90%.

Specific examples of the compound represented by Formula (B) include the following Dispersants B-1 to B-5, but the compound represented by Formula (B) is not limited to these specific examples.

| Dispersant | Structure | $R^{B1}$ | $Y^{B1}$—$Z^{B1}$, $Y^{B2}$—$Z^{B2}$ |
|---|---|---|---|
| B-1 | | | |
| B-2 | | | |
| B-3 | | | |
| B-4 | | | |
| B-5 | | | |

(Compound Represented by Formula (C))

The compound represented by Formula (C) is as below.

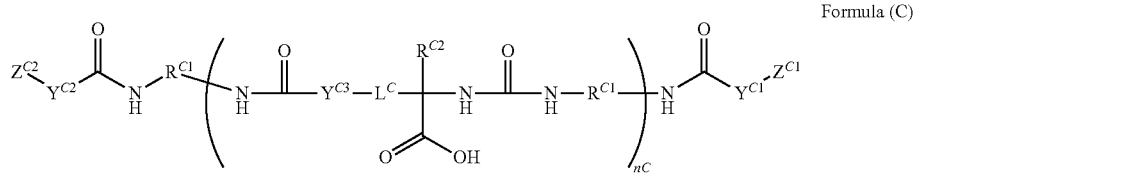

Formula (C)

In Formula (C), nC represents an integer that is 1 or more, $R^{C1}$ and $L^c$ each independently represent a divalent hydrocarbon group having 1 to 20 carbon atoms which may contain an alicyclic structure or an aromatic ring structure and may have a substituent, $R^{C2}$ represents a hydrogen atom or an alkyl group having 1 to 10 carbon atoms, $Y^{C1}$ represents O, S, NH, or $NZ^{C3}$, $Y^{C2}$ represents O, S, NH, or $NZ^{C4}$, $Y^{C3}$ represents O, S, NH, or $NZ^{C5}$, $Z^{C1}$ and $Z^{C2}$ each independently represent a hydrocarbon group having 1 to 30 carbon atoms which may have a substituent, or the group (W1) represented by Formula (W1), $Z^{C3}$ to $Z^{C5}$ each independently represent a hydrocarbon group having 1 to 30 carbon atoms which may have a substituent, or the group (W1) represented by Formula (W1), and a carboxy group in Formula (C) may be neutralized.

In Formula (C), nC, $R^{C1}$, $Y^{C1}$, $Y^{C2}$, $Z^{C1}$, and $Z^{C2}$ have the same definition as nX, $R^1$, $Y^1$, $Y^2$, $Z^1$, and $Z^2$ in Formula (X), respectively, and preferable aspects thereof are also the same.

In Formula (C), $R^{C2}$ represents a hydrogen atom or an alkyl group having 1 to 10 carbon atoms, and a hydrogen atom or an alkyl group having 1 to 6 carbon atoms is preferable, and a hydrogen atom is particularly preferable.

In Formula (C), $L^C$ is the same as $R^1$ in Formula (X), but in $L^C$, an alkylene group having 1 to 10 carbon atoms is particularly preferable.

As $Y^{C3}$, NH is particularly preferable.

In a case where the aqueous dispersion of the present disclosure contains the compound represented by Formula (C), a degree of neutralization of a carboxy group of the compound represented by Formula (C) in the aqueous dispersion is preferably 50% to 100% and more preferably 70% to 90%.

Specific examples of the compound represented by Formula (C) include the following Dispersants C-1 to C-3, but the compound represented by Formula (C) is not limited to these specific examples.

| Dispersant | Structure | $R^{C1}$ | $Y^{C1}$—$Z^{C1}$, $Y^{C2}$—$Z^{C2}$ |
|---|---|---|---|
| C-1 | | | |
| C-2 | | | |
| C-3 | | | |

(Compound Represented by Formula (D))

The compound represented by Formula (D) is a compound having a urethane bond and a urea bond, and a $-(R^{D1}O)_{nD}R^{D2}$ group that is a nonionic group as a hydrophilic group.

Formula (D)

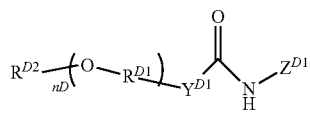

In Formula (D), $R^{D1}$ represents an alkylene group having 2 or 3 carbon atoms, $R^{D2}$ represents a hydrogen atom or a hydrocarbon group having 1 to 30 carbon atoms, nD represents an integer from 2 to 200, $Y^{D1}$ represents O or NH, $Z^{D1}$ represents a hydrocarbon group having 1 to 30 carbon atoms which may have a substituent.

In Formula (D), $R^{D1}$, $Z^{D2}$, and nD have the same definition as $R^{W1}$, $R^{W2}$, and nw in Formula (W1), respectively, and the preferable aspects thereof are also the same.

In Formula (D), a preferable aspect of "a hydrocarbon group having 1 to 30 carbon atoms which may have a substituent" represented by $Z^{D1}$ is the same as the preferable aspect of "a hydrocarbon group having 1 to 30 carbon atoms which may have a substituent" represented by $Z^1$ in Formula (X).

Specific examples of the compound represented by Formula (D) include the following Dispersants D-1 to D-4, but the compound represented by Formula (D) is not limited to these specific examples.

D-1

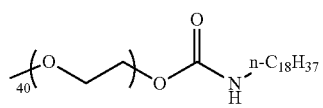

D-2

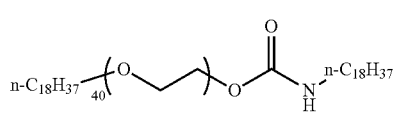

D-3

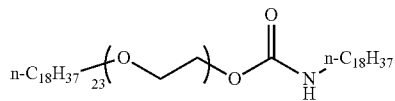

D-4

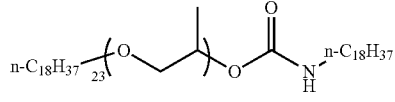

As the dispersant having at least one bond selected from a urethane bond or a urea bond and a hydrophilic group, dispersants other than the compounds represented by Formulas (A) to (D) can also be used.

Examples of the other dispersants include the following Dispersants E-1 to E-4.

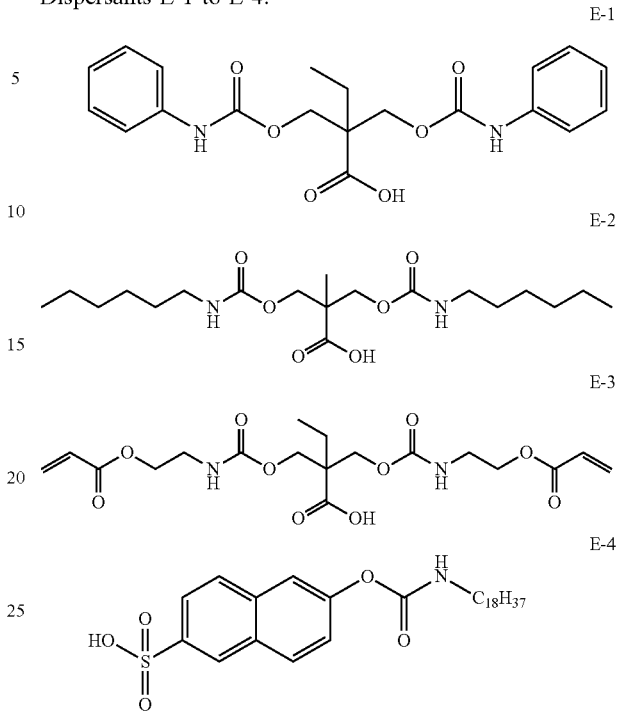

<Microcapsule>

The aqueous dispersion of the present disclosure includes the microcapsule that has the shell having the three-dimensional cross-linked structure containing at least one bond selected from a urethane bond or a urea bond, and includes the core, in which at least one of the shell or the core has the polymerizable group.

The microcapsule in the present disclosure is formed of the outermost shell having the three-dimensional cross-linked structure containing at least one of a urethane bond or a urea bond, and the core which is a region occupying the shell.

Whether a microcapsule is the microcapsule can be checked by coating a support with the aqueous dispersion having the microcapsule and drying so as to obtain a sample for morphological observation, and then cutting the sample so as to observe the cut surface using an electron microscope and the like.

The microcapsule contained in the aqueous dispersion of the present disclosure may be used alone, or two or more kinds thereof may be used.

The microcapsule is a dispersoid in the aqueous dispersion of the present disclosure.

As described above, the aqueous dispersion of the present disclosure contains the microcapsule, thereby improving the hardness of a film to be formed.

Furthermore, as described above, the aqueous dispersion of the present disclosure contains the microcapsule and the above-described dispersant, thereby maintaining excellent dispersion stability.

<Shell of Microcapsule>

In the microcapsule, the shell has the three-dimensional cross-linked structure containing at least one bond selected from a urethane bond or a urea bond.

In the present specification, "three-dimensional cross-linked structure" refers to a three-dimensional network structure formed by cross-linking.

As described above, the three-dimensional cross-linked structure of the shell contributes to improvement of dispersion stability and redispersibility.

Whether the shell of the microcapsule has the three-dimensional cross-linked structure is checked as below. The operation described below is performed under the condition of a liquid temperature of 25° C.

In addition, in a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

A sample is collected from the aqueous dispersion. Tetrahydrofuran (THF) having a mass 100 times the mass of the total solid content in the sample is added to and mixed with the collected sample, thereby preparing a diluted solution. The obtained diluted solution is subjected to centrifugation under the condition of 80,000 rpm and 40 minutes. After the centrifugation, whether there are residues is checked by visual observation. In a case where there are residues, a redispersion liquid is prepared by redispersing the residues in water. For the obtained redispersion liquid, by using a wet-type particle size distribution measurement apparatus (LA-960, manufactured by HORIBA, Ltd.), the particle size distribution is measured by a light scattering method.

In a case where the particle size distribution can be checked by the operation described above, it is determined that the shell of the microcapsule has the three-dimensional cross-linked structure.

In addition, the three-dimensional cross-linked structure contains at least one kind of bond selected from a urethane bond or a urea bond. It is preferable that the three-dimensional cross-linked structure contains both the urethane bond and the urea bond.

A total amount (mmol/g) of the urethane bond and the urea bond contained in 1 g of the shell having the three-dimensional cross-linked structure is preferably 1 mmol/g to 10 mmol/g, more preferably 1.5 mmol/g to 9 mmol/g, and particularly preferably 2 mmol/g to 8 mmol/g.

(Structure (1))

The three-dimensional cross-linked structure of the shell preferably contains Structure (1).

The three-dimensional cross-linked structure may include a plurality of structures (1), and the plurality of structures (1) may be the same as or different from each other.

Structure (1)

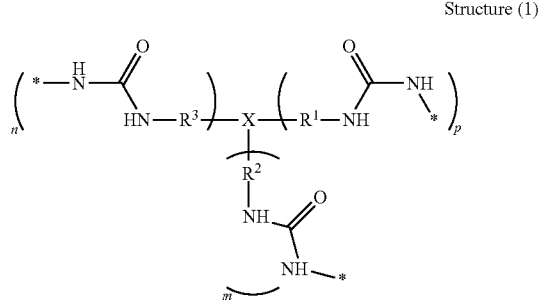

In Structure (1), X represents a (p+m+n)-valent organic group formed by linking at least two groups selected from the group consisting of a hydrocarbon group which may have a ring structure, —NH—, >N—, —C(=O)—, —O—, and —S—.

In Structure (1), $R^1$, $R^2$, and $R^3$ each independently represent a hydrocarbon group having 5 to 15 carbon atoms which may have a ring structure.

In Structure (1), * represents a binding position, each of p, m, and n is equal to or more than 0, and p+m+n equals 3 or more.

The total molecular weight of X, $R^1$, $R^2$, and $R^3$ is preferably less than 2,000, preferably less than 1,500, and more preferably less than 1,000. In a case where the total molecular weight of X, $R^1$, $R^2$, and $R^3$ is less than 2,000, the internal content rate of the compound contained in the interior of the core can be increased.

The hydrocarbon group in the organic group represented by X is preferably a linear or branched hydrocarbon group having 1 to 15 carbon atoms, and more preferably a linear or branched hydrocarbon group having 1 to 10 carbon atoms.

Examples of the ring structure that the hydrocarbon group in the organic group represented by X and the hydrocarbon group represented by $R^1$, $R^2$, and $R^3$ may have an alicyclic structure and an aromatic ring structure.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Structure (1), p is equal to or more than 0, p is preferably 1 to 10, more preferably 1 to 8, even more preferably 1 to 6, and particularly preferably 1 to 3.

In Structure (1), m is equal to or more than 0, m is preferably 1 to 10, more preferably 1 to 8, even more preferably 1 to 6, and particularly preferably 1 to 3.

In Structure (1), n is equal to or more than 0, n is preferably 1 to 10, more preferably 1 to 8, even more preferably 1 to 6, and particularly preferably 1 to 3.

In Structure (1), p+m+n is preferably an integer from 3 to 10, more preferably an integer from 3 to 8, and even more preferably an integer from 3 to 6.

The (p+m+n)-valent organic group represented by X is preferably a group represented by any one of (X-1) to (X-12).

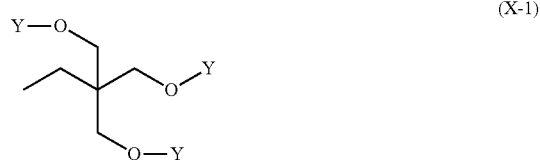

(X-1)

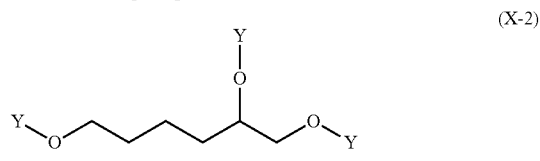

(X-2)

(X-3) 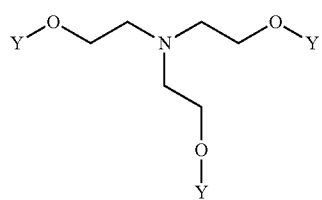
(X-4) 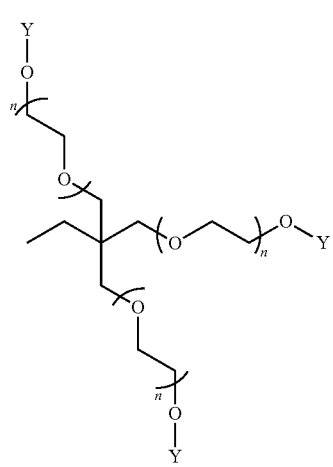
(X-5) 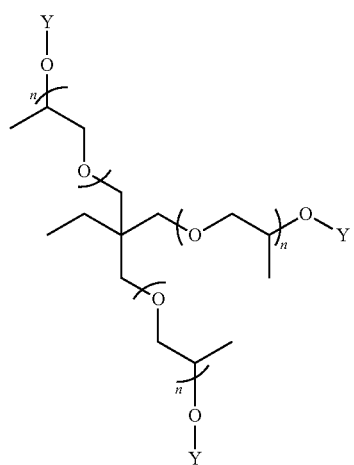
(X-6) 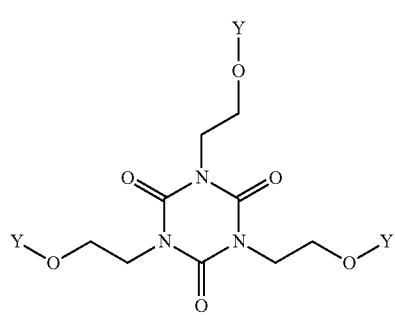
(X-7) 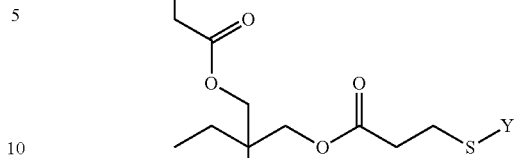
(X-8) 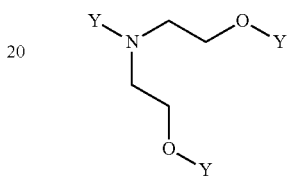
(X-9) 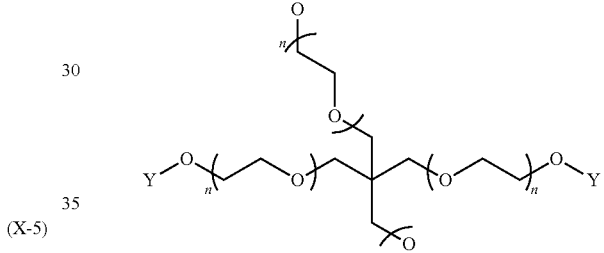
(X-10) 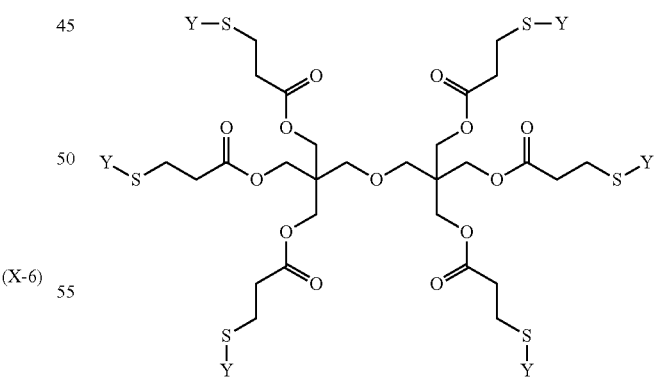
(X-11) 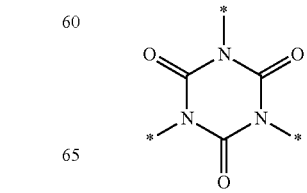

(X-12)

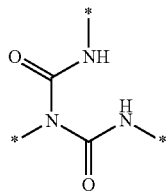

In Formulas (X-1) to (X-12), n represents an integer from 1 to 200, preferably represents an integer from 1 to 50, more preferably represents an integer from 1 to 15, and particularly preferably represents an integer from 1 to 8.

In Formulas (X-11) and (X-12), * represents a binding position.

In Formulas (X-1) to (X-10), Y represents (Y-1).

(Y-1)

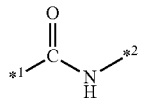

In (Y-1), *$^1$ represents a binding position in which (Y-1) is bonded to S or O in (X-1) to (X-10), and *$^2$ represents a binding position in which (Y-1) is bonded to R$^1$, R$^2$, or R$^3$ in Structure (1).

In Structure (1), R$^1$, R$^2$, and R$^3$ each independently represent a hydrocarbon group having 5 to 15 carbon atoms which may have a ring structure.

The hydrocarbon group represented by R$^1$, R$^2$, and R$^3$ may have a substituent, and examples of the substituent include a hydrophilic group capable of being contained in the shell, which is described below.

R$^1$, R$^2$, and R$^3$ preferably each independently represent a group represented by any one of (R-1) to (R-20). In (R-1) to (R-20), * represents a binding position.

(R-1)

(R-2)

(R-3)

(R-4)

(R-5)

(R-6)
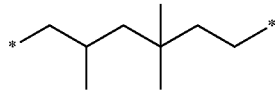

(R-7)
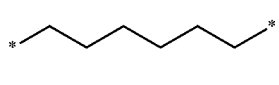

(R-8)
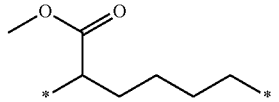

(R-9)
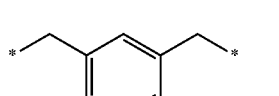

(R-10)

(R-11)
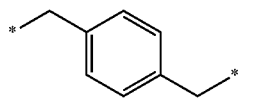

(R-12)
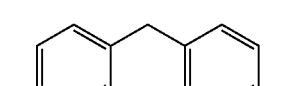

(R-13)
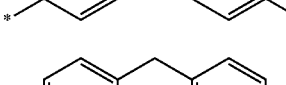

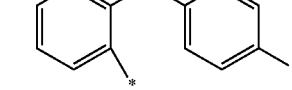

(R-14)
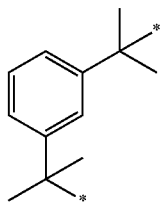

(R-15)
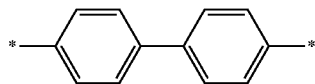

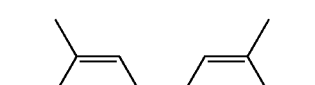

(R-16)
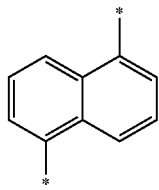

(R-17)
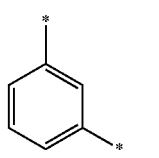
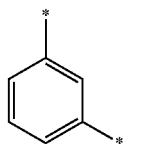

(R-18)

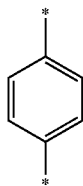

(R-19)

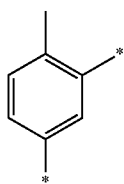

(R-20)

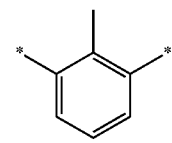

The content rate of Structure (1) in the shell with respect to the total mass of the shell is preferably 8% by mass to 100% by mass, more preferably 25% by mass to 100% by mass, and even more preferably 50% by mass to 100% by mass.

It is preferable that the shell includes, as Structure (1), at least one structure among Structure (2), Structure (3), or Structure (4) shown below.

Structure (2)

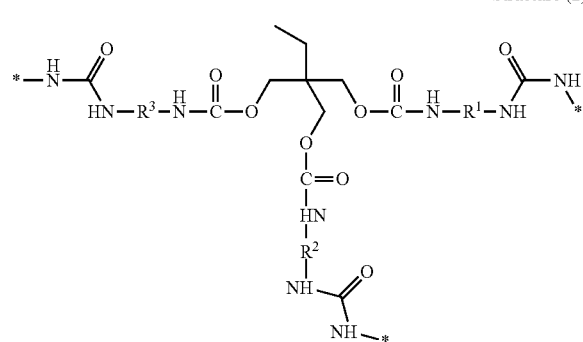

In Structure (2), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (2) has the same definition as each of the hydrocarbon groups represented by $R^1$, $R^2$, and $R^3$ in Structure (1), and the preferable range thereof is also the same.

In Structure (2), * represents a binding position.

Structure (3)

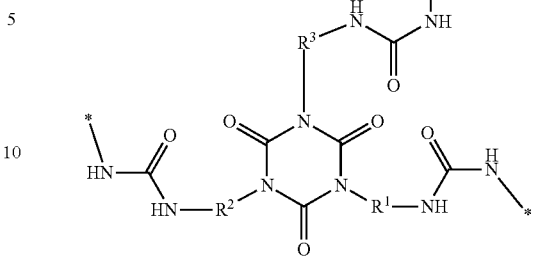

In Structure (3), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (3) has the same definition as each of the hydrocarbon groups represented by $R^1$, $R^2$, and $R^3$ in Structure (1), and the preferable range thereof is also the same.

In Structure (3), * represents a binding position.

Structure (4)

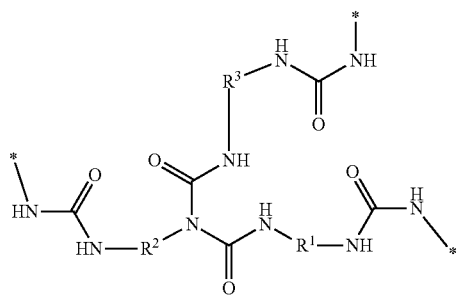

In Structure (4), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (4) has the same definition as each of the hydrocarbon groups represented by $R^1$, $R^2$, and $R^3$ in Structure (1), and the preferable range thereof is also the same.

In Structure (4), * represents a binding position.

Specific examples of Structure (1) to Structure (4) include structures shown in Table 1.

TABLE 1

| | Structure (1) | | | | | | |
|---|---|---|---|---|---|---|---|
| X | $R^1$ | $R^2$ | $R^3$ | p | n | m | Corresponding structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the microcapsule is preferably a product formed by allowing a reaction between a tri- or higher functional isocyanate compound and water.

(Tri- or Higher Functional Isocyanate Compound)

The isocyanate compound having three or more functional groups is a compound having three or more isocyanate groups in a molecule. As this compound, it is possible to use a compound synthesized by a method which will be described later and a known compound. Examples of the isocyanate compound having three or more functional groups include an aromatic isocyanate compound having three or more functional groups, an aliphatic isocyanate compound having three or more functional groups, and the like.

Examples of the compounds known as such a compound include the compounds described in "Polyurethane Resin Handbook" (edited by Keiji Iwata, published from NIK-KAN KOGYO SHIMBUN, LTD. (1987)).

As the isocyanate compound having three or more functional groups, a compound having three or more isocyanate groups in a molecule, specifically, a compound represented by Formula (XA) is preferable.

Formula (XA)

In Formula (XA), $X^1$ represents an n-valent organic group.

In Formula (XA), n is equal to or more than 3. n is preferably 3 to 10, more preferably 3 to 8, and even more preferably 3 to 6.

As the compound represented by Formula (XA), a compound represented by Formula (11) is preferable.

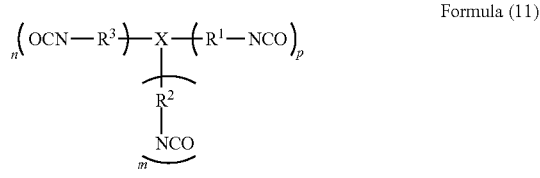
Formula (11)

X, $R^1$, $R^2$, $R^3$, p, m, and n in Formula (11) have the same definition as X, $R^1$, $R^2$, $R^3$, p, m, and n in Structure (1) described above, and the preferable aspect thereof is also the same.

The isocyanate compound having three or more functional groups is preferably a compound derived from a difunctional isocyanate compound (a compound having two isocyanate groups in a molecule).

The isocyanate compound having three or more functional groups is preferably an isocyanate compound derived from at least one kind of compound selected from isophorone diisocyanate, hexamethylene diisocyanate, trimethylhexamethylene diisocyanate, 1,3-bis(isocyanatomethyl)cyclohexane, m-xylylene diisocyanate, or dicyclohexylmethane 4,4'-diisocyanate.

Herein, "derived" means that the above compounds are used as raw materials, and hence the isocyanate compound has a structure derived from the raw materials.

As the isocyanate compound having three or more functional groups, for example, an isocyanate compound (adduct type) caused to have three or more functional groups as an adduct product (adduct) of a difunctional isocyanate compound (a compound having two isocyanate groups in a molecule) and a compound having three or more active hydrogen groups in a molecule such as polyol, polyamine, or polythiol having three or more functional groups, a trimer of a difunctional isocyanate compound (a biuret type or an isocyanurate type), and a compound having three or more isocyanate groups in a molecule such as a formalin condensate of benzene isocyanate are also preferable.

These isocyanate compounds having three or more functional groups are preferably a mixture containing a plurality of compounds. It is preferable that a compound represented by Formula (11A) or Formula (11B) shown below is a main component of this mixture, and other components may also be contained in the mixture.

—Adduct Type—

The adduct-type isocyanate compound having three or more functional groups is preferably a compound represented by Formula (11A) or Formula (11B).

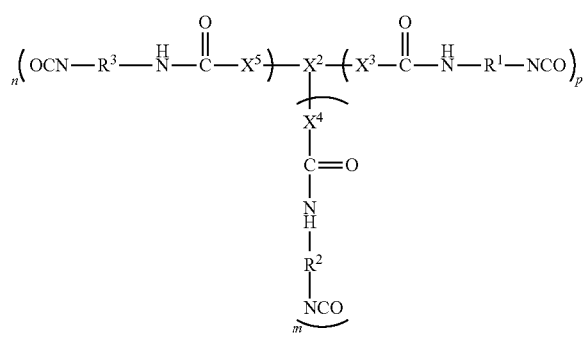
Formula (11A)

-continued

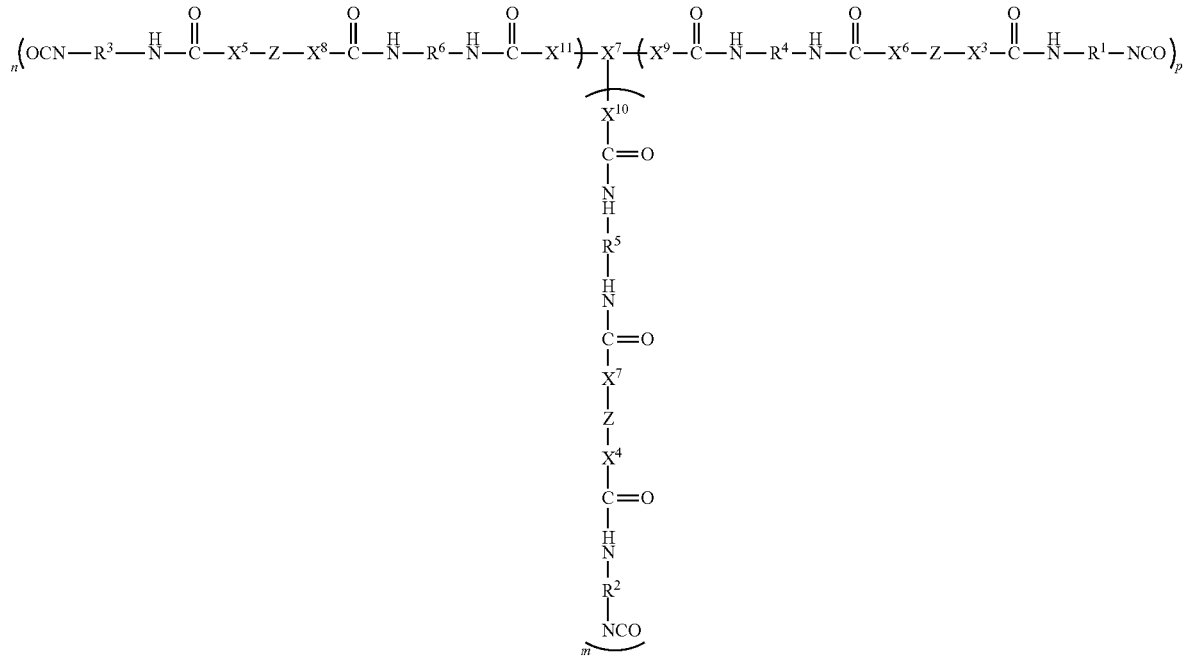

Formula (11B)

In Formula (11A) and Formula (11B), $X^2$ represents a (p+m+n)-valent organic group, each of p, m, and n is 0 or more, and p+m+n equals 3 or more.

In Formula (11A) and Formula (11B), $X^3$ to $X^{11}$ each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group formed by linking at least two groups selected from the group consisting of a hydrocarbon group which may have a ring structure, —NH—, >N—, —C(=O)—, —O—, and —S—.

In Formula (11A) and Formula (11B), p+m+n preferably equals 3 to 10, more preferably equals 3 to 8, and even more preferably equals 3 to 6.

In Formula (11A) and Formula (11B), $X^3$ to $X^{11}$ each independently preferably represent O or S, and more preferably represent O.

In Formula (11A) and Formula (11B), $R^1$ to $R^6$ each independently preferably represent a hydrocarbon group having 5 to 15 carbon atoms which may have a ring structure.

In Formula (11A) and Formula (11B), the preferable aspect of each of $R^1$ to $R^6$ is the same as the preferable aspect of $R^1$ in Structure (1).

In a case where $X^2$ in Formula (11A) and Formula (11B) is a hydrocarbon group that may have a ring structure, examples of the ring structure include an alicyclic structure and an aromatic ring structure.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In a case where each of $R^1$ to $R^6$ in Formula (11A) and Formula (11B) is a hydrocarbon group having 5 to 15 carbon atoms which may have a ring structure, examples of the ring structure include an alicyclic structure and an aromatic ring structure.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Formula (11A) and Formula (11B), the (p+m+n)-valent organic group represented by $X^2$ is preferably a group represented by any one of (X2-1) to (X2-10).

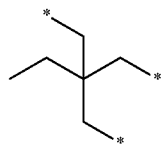

(X2-1)

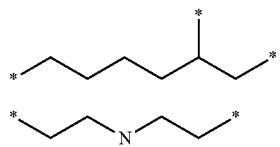

(X2-2)

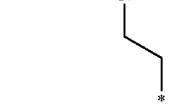

(X2-3)

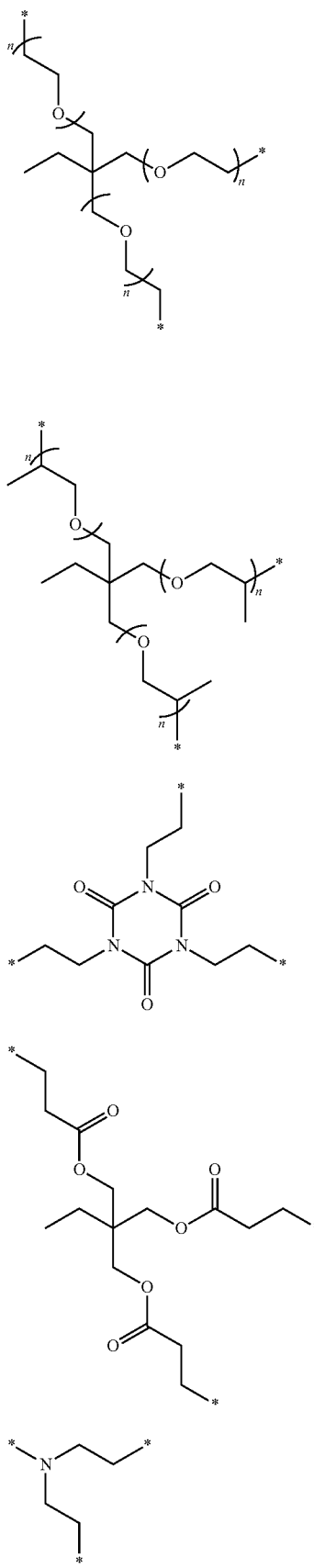
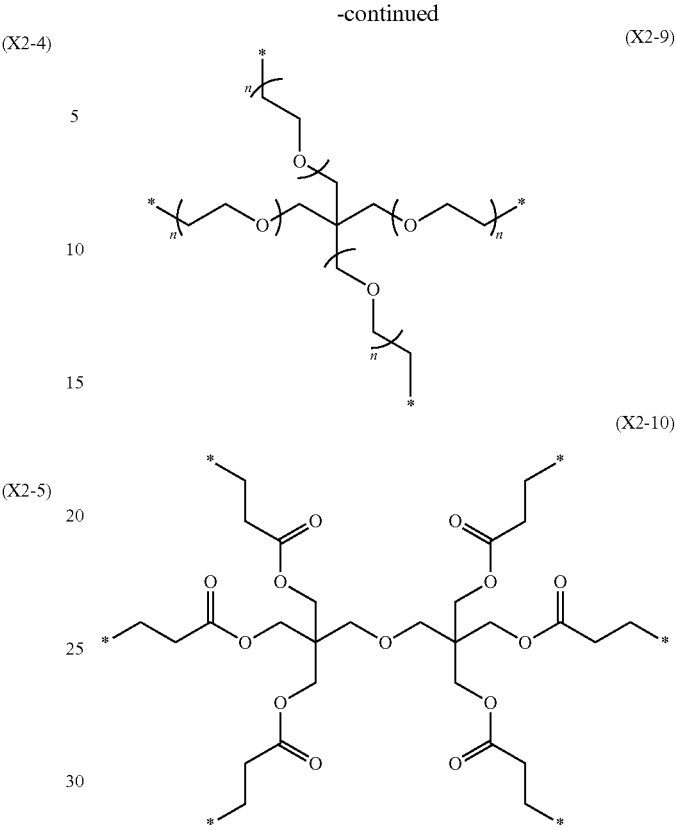

In Formula (X2-1) to Formula (X2-10), n represents an integer from 1 to 200. n preferably represents an integer from 1 to 50, more preferably represents an integer from 1 to 15, and particularly preferably represents an integer from 1 to 8.

In Formula (X2-1) to Formula (X2-10), * represents a binding position.

In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group represented by Z may be a linear hydrocarbon group, a branched hydrocarbon group, or a cyclic hydrocarbon group.

The number of carbon atoms in the hydrocarbon group represented by Z is preferably 2 to 30.

In Formula (11A) and Formula (11B), $R^1$ to $R^6$ each independently preferably represent a group (R-1) to a group (R-20).

In Formula (11A) and Formula (11B), $R^1$ to $R^6$ each independently more preferably represent any one of a group (R-3) derived from isophorone diisocyanate (IPDI), a group (R-7) derived from hexamethylene diisocyanate (HDI), a group (R-5) derived from trimethylhexamethylene diisocyanate (TMHDI), a group (R-9) derived from m-xylylene diisocyanate (XDI), a group (R-1) derived from 1,3-bis(isocyanatomethyl)cyclohexane, and a group (R-2) derived from dicyclohexylmethane 4,4'-diisocyanate.

As the compound represented by Formula (11A), a compound represented by Formula (11A-1) is preferable.

Formula (11A-1)

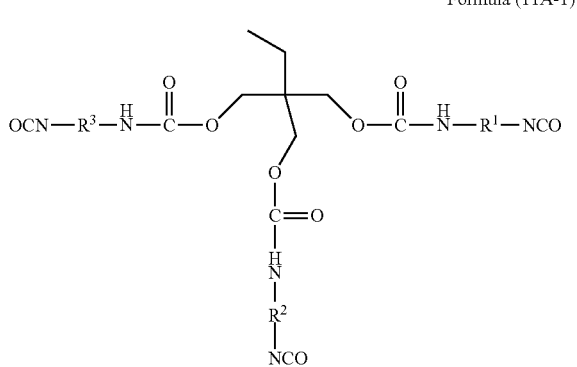

In Formula (11A-1), $R^1$, $R^2$, and $R^3$ have the same definition as $R^1$, $R^2$, and $R^3$ in Formula (11A), and the preferable aspect thereof is also the same.

The adduct-type tri- or higher functional isocyanate compound can be synthesized by allowing a reaction between a compound, which will be described later, having three or more active hydrogen groups in a molecule with a difunctional isocyanate compound which will be described later.

In the present specification, the active hydrogen group means a hydroxyl group, a primary amino group, a secondary amino group, or a mercapto group.

The adduct-type tri- or higher functional isocyanate compound can be obtained by, for example, heating (50° C. to 100° C.) a compound having three or more active hydrogen groups in a molecule and a difunctional isocyanate compound in an organic solvent while stirring, or by stirring the above compounds at a low temperature (0° C. to 70° C.) while adding a catalyst such as stannous octanoate thereto (Synthesis Scheme 1 shown below).

Generally, as the difunctional isocyanate compound reacted with the compound having three or more active hydrogen groups in a molecule, a difunctional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the difunctional isocyanate compound is preferably 60% to 500%, more preferably 60% to 300%, and even more preferably 80% to 200% of the number of moles of the active hydrogen groups.

—Synthesize Scheme 1—

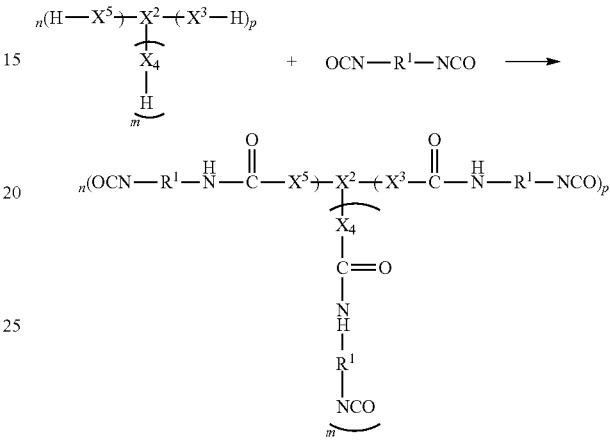

Furthermore, the adduct-type tri- or higher functional isocyanate compound can also be obtained by synthesizing an adduct (a prepolymer; "(PP)" shown in the synthesize scheme below) of a compound having two active hydrogen groups in a molecule and a difunctional isocyanate compound and then allowing the prepolymer to react with a compound having three or more active hydrogen groups in a molecule (Synthesis Scheme 2 shown below).

—Synthesize Scheme 2—

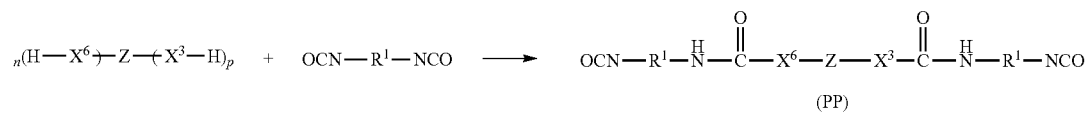

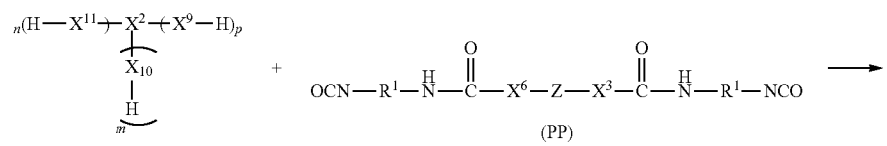

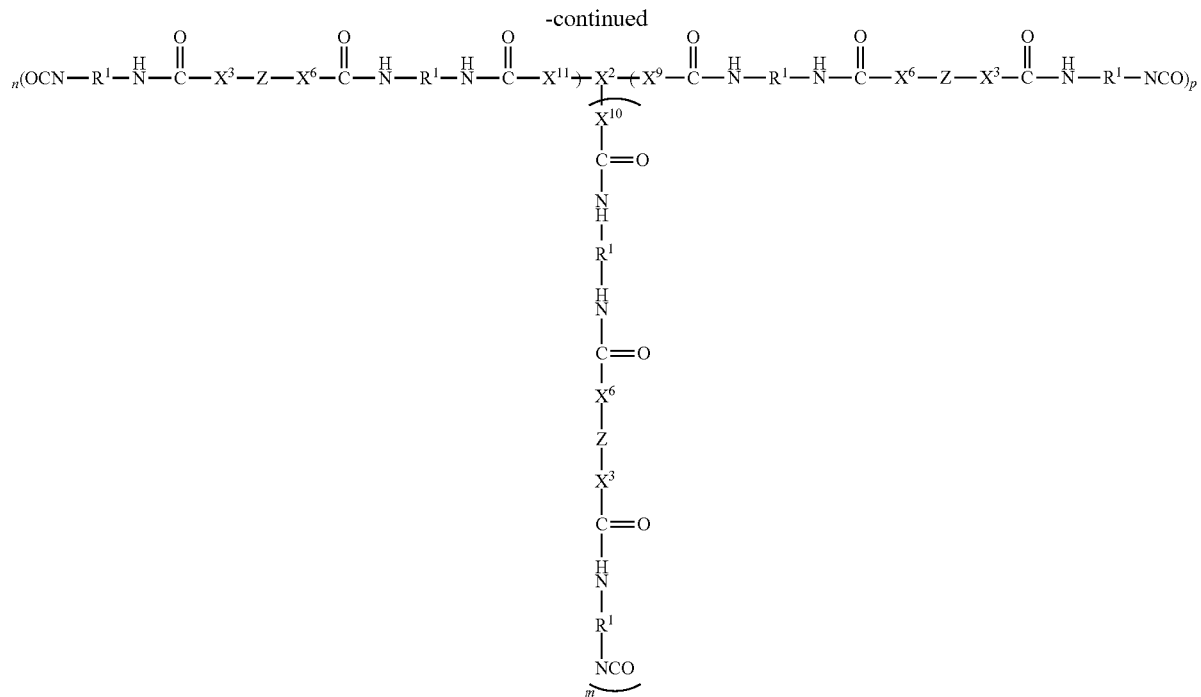

Examples of the difunctional isocyanate compound include a difunctional aromatic isocyanate compound, a difunctional aliphatic isocyanate compound, and the like.

Specific examples of the difunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, 1,3-bis(2-isocyanato-2-propyl)benzene, and the like.

Among these difunctional isocyanate compounds, compounds having structures represented by (I-1) to (I-24) shown below are preferable.

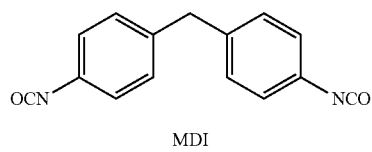

MDI (I-1)

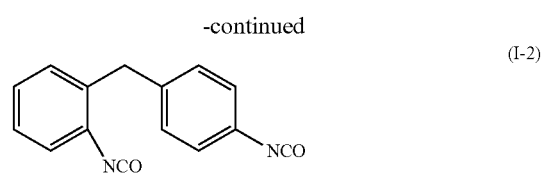

(I-2)

(I-3)

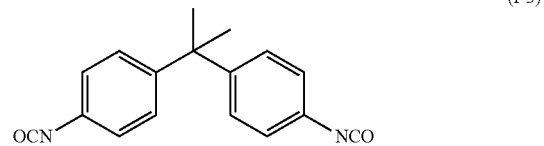

(I-4)

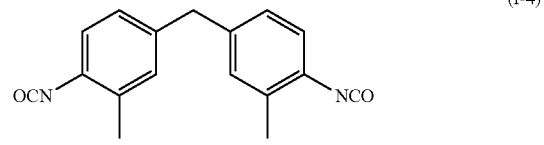

(I-5)

(I-6)

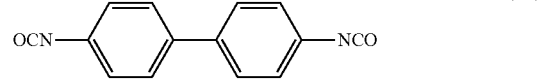

(I-7)

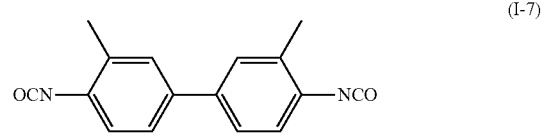

-continued

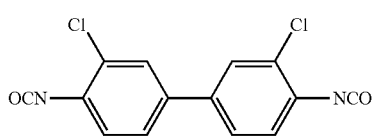
(I-8)

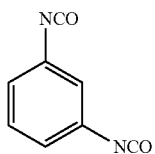
(I-9)

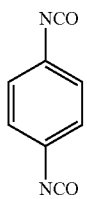
(I-10)

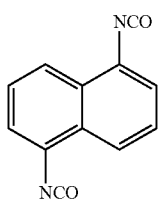
(I-11)

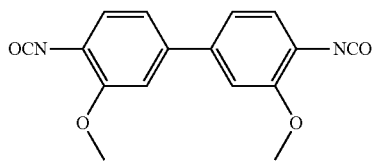
(I-12)

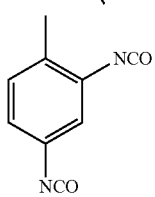
(I-13) (I-14)

One or a mixture of these structures

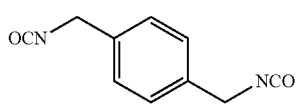
(I-15)

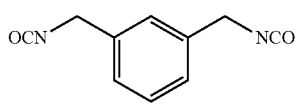
XDI
(I-16)

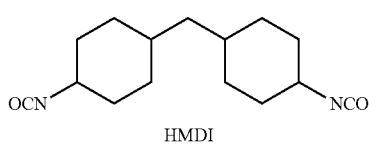
HMDI
(I-17)

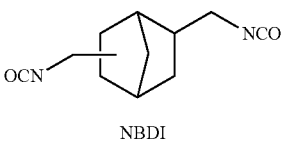
NBDI
(I-18)

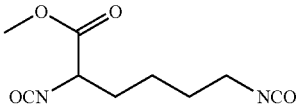
(I-19)

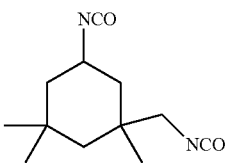
IPDI
(I-20)

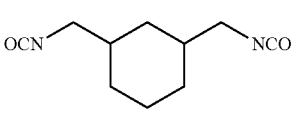
HXDI
(I-21)

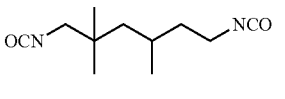 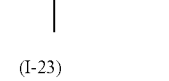
(I-22)   (I-23)

One or a mixture of these structures
TMHDI

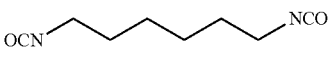
HDI
(I-24)

Among these difunctional isocyanate compounds, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexylmethane-4,4'-diisocyanate (HMDI) are particularly preferable.

As the difunctional isocyanate compound, difunctional isocyanate compounds derived from the above compounds can also be used. Examples thereof include DURANATE (registered trademark) D101, D201, A101 (manufactured by Asahi Kasei Corporation) and the like.

The compound having three or more active hydrogen groups in a molecule is a compound having three or more groups, each of which is at least one kind of group selected from a hydroxyl group, a primary amino group, a secondary amino group, or a mercapto group, in a molecule. Examples of the compound include compounds having structures represented by (H-1) to (H-13) shown below. In the following structures, n represents an integer selected from 1 to 100.

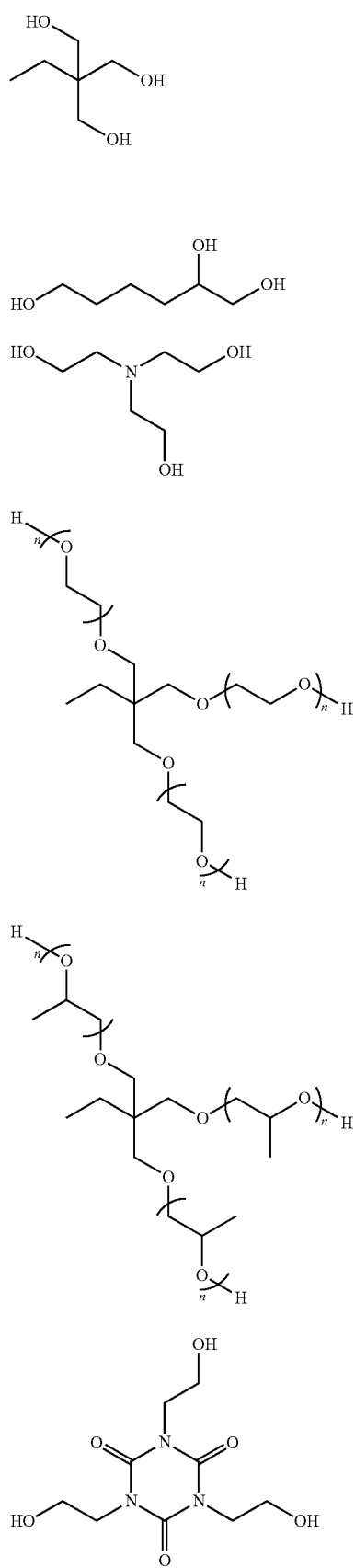
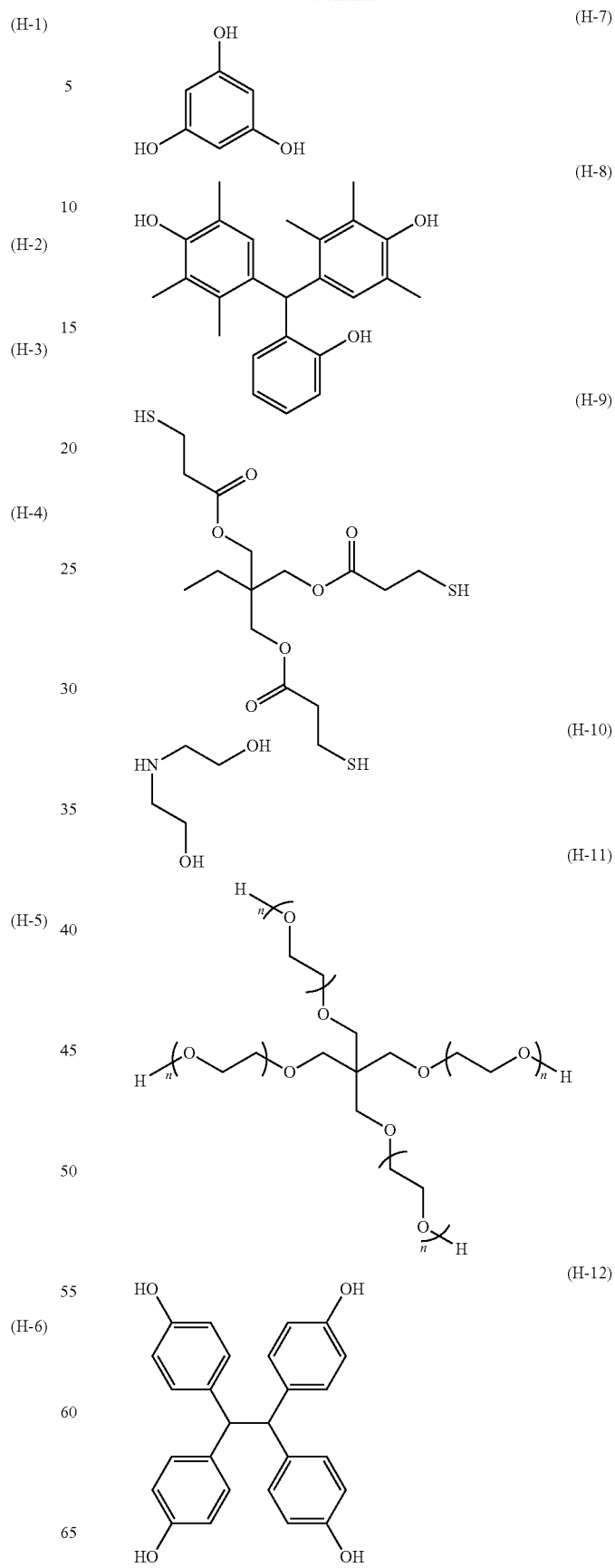

-continued

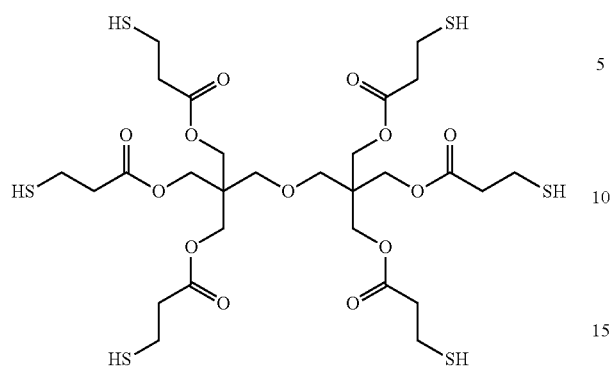

(H-13)

As the adduct-type isocyanate compound having three or more functional groups, it is preferable to use a compound obtained by reacting a compound having two or more active hydrogen groups in a molecule with a difunctional isocyanate compound according to the combination listed in Table 2 shown below.

TABLE 2

| | Polyisocyanate structure | | Composition | |
|---|---|---|---|---|
| | | | Compound having two or more active hydrogen groups (equivalents per mol) | Difunctional isocyanate compound (equivalents per mol) |
| Compound No. | Compound having two or more active hydrogen groups | Difunctional isocyanate compound | | |
| NCO 101 | Trimethylolpropane | 2,4-Tolylene diisocyanate (TDI) | 1 | 4 |
| NCO 102 | | m-Xylylene diisocyanate (XDI) | 1 | 4 |
| NCO 103 | | Hexamethylene diisocyanate (HDI) | 1 | 4 |
| NCO 104 | | 1,3-Bis(isocyanatomethyl)cyclohexane (HXDI) | 1 | 4 |
| NCO 105 | | Isophorone diisocyanate (IPDI) | 1 | 4 |
| NCO 106 | 1,3,5-Trihydroxybenzene | Hexamethylene diisocyanate (HDI) | 1 | 4 |
| NCO 107 | | Isophorone diisocyanate (IPDI) | 1 | 4 |
| NCO 108 | Pentaerythritol ethylene oxide | 1,3-Bis(isocyanatomethyl)cyclohexane (HXDI) | 1 | 5 |
| NCO 109 | | Isophorone diisocyanate (IPDI) | 1 | 5 |

TABLE 2-continued

| | Polyisocyanate structure | | Composition | |
|---|---|---|---|---|
| Compound No. | Compound having two or more active hydrogen groups | Difunctional isocyanate compound | Compound having two or more active hydrogen groups (equivalents per mol) | Difunctional isocyanate compound (equivalents per mol) |
| NCO 110 | | Hexamethylene diisocyanate (HDI) | 1 | 7 |
| NCO 111 | | Isophorone diisocyanate (IPDI) | 1 | 7 |
| | Dipentaerythritol hexakis(3-mercaptopropionate) | | | |
| NCO 112 | | Hexamethylene diisocyanate (HDI) | 1 | 4 |
| NCO 113 | | Isophorone diisocyanate (IPDI) | 1 | 4 |
| | Triethanolamine | | | |

As the adduct-type isocyanate compound having three or more functional groups, among the compounds shown in Table 2, NCO 102 to NCO 105, NCO 107, NCO 108, NCO 111, and NCO 113 are more preferable.

As the adduct-type isocyanate compound having three or more functional groups, commercially available products may also be used, and examples thereof include D-102, D-103, D-103H, D-103M2, P49-75S, D-110, D-120N, D-140N, D-160N (manufactured by Mitsui Chemicals, Inc.), DESMODUR (registered trademark) L75, UL57SP (manufactured by Sumika Bayer Urethane Co., Ltd.), CORONATE (registered trademark) HL, HX, L (manufactured by Nippon Polyurethane Industry Co., Ltd.), P301-75E (manufactured by Asahi Kasei Corporation.), and the like.

Among these adduct-type isocyanate compounds having three or more functional groups, D-110, D-120N, D-140N, and D-160N (manufactured by Mitsui Chemicals, Inc.) are more preferable.

—Isocyanurate Type and Biuret Type—

As the isocyanurate-type isocyanate compound having three or more functional groups, a compound represented by Formula (11C) is preferable.

As the biuret-type isocyanate compound having three or more functional groups, a compound represented by Formula (11D) is preferable.

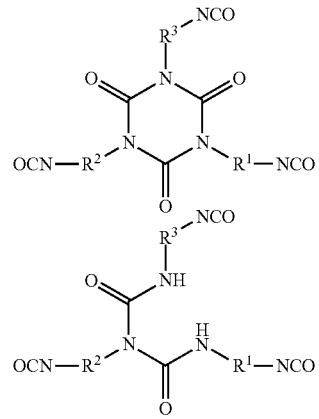

Formula (11C)

Formula (11D)

In Formula (11C) and Formula (11D), $R^1$, $R^2$, and $R^3$ each independently represent a divalent organic group.

In Formula (11C) and Formula (11D), $R^1$, $R^2$, and $R^3$ each independently preferably represent an alkylene group having 1 to 20 carbon atoms which may have a substituent, a cycloalkylene group having 1 to 20 carbon atoms which may have a substituent, or an arylene group having 1 to 20 carbon atoms which may have a substituent.

In Formula (11C) and Formula (11D), $R^1$, $R^2$, and $R^3$ each independently particularly preferably represent a group selected from the groups represented by (R-1) to (R-20) described above.

In Formula (11C) and Formula (11D), $R^1$ to $R^3$ each independently more preferably represent any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

As the isocyanurate-type isocyanate compound having three or more functional groups, commercially available products may also be used. Examples thereof include D-127N, D-170N, D-170HN, D-172N, D-177N (manufactured by Mitsui Chemicals, Inc.), SUMIDUR N3300, DESMODUR (registered trademark) N3600, N3900, Z4470BA (manufactured by Sumika Bayer Urethane Co., Ltd.), CORONATE (registered trademark) HX, HK (manufactured by Nippon Polyurethane Industry Co., Ltd.), DURANATE (registered trademark) TPA-100, TKA-100, TSA-100, TSS-100, TLA-100, TSE-100 (manufactured by Asahi Kasei Corporation.), and the like.

As the biuret-type tri- or higher functional isocyanate compound, commercially available products may also be used. Examples thereof include D-165N and NP 1100 (manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation.), and the like.

Among these isocyanurate-type or biuret-type isocyanate compounds having three or more functional groups, DURANATE (registered trademark) 24A-100 (manufactured by Asahi Kasei Corporation.), D-127 (manufactured by Mitsui Chemicals, Inc.), TKA-100, and TSE-100 (manufactured by Asahi Kasei Corporation.) are more preferable.

The content (unit: mmol/g) of the isocyanate group per 1 g of the tri- or higher functional isocyanate compound is preferably 1 mmol/g to 10 mmol/g, more preferably 1.5 mmol/g to 8 mmol/g, and even more preferably 2 mmol/g to 6 mmol/g.

For obtaining the content of the isocyanate group, the isocyanate compound of interest is dissolved in dehydrated toluene, an excess di-n-butylamine solution is then added thereto so as to cause a reaction, and the remaining di-n-butylamine solution is subjected to back titration by using hydrochloric acid. From the titration amount at an inflection point on the titration curve, the content of the isocyanate group can be calculated.

More specifically, the content of the isocyanate group can be calculated by the method described below.

By using a potentiometric titrator (AT-510, manufactured by KYOTO ELECTRONICS MANUFACTURING CO., LTD.) and a 1 mol/L aqueous hydrochloric acid solution, neutralization titration is performed at 25° C. by the blank measurement and the sample measurement described below. From the obtained titration amounts Z1 and Z2, the content of the isocyanate group can be calculated from Equation (N).

Content of isocyanate group (mmol/g)=$(Z1-Z2)/(W \times Y)$  Equation (N)

In Equation (N), Z1 represents the titration amount of a blank, Z2 represents the titration amount of a sample, W represents the solid content of the sample, and Y represents the mass of the sample.

~Blank Measurement~

10 mL of dehydrated toluene, 10.0 mL of a 2 mol/L di-n-butylamine solution, and 50 mL of isopropyl alcohol are put into a 100 mL beaker and mixed together, thereby preparing a mixed liquid. For the mixed liquid, neutralization titration is performed using a 1 mol/L hydrochloric acid solution. The inflection point on the titration curve is taken as the end point, and the titration amount Z1 (mL) to the end point is determined.

~Sample Measurement~

A sample (an isocyanate compound) Yg with W % by mass of solid content is collected and put into a 100 mL beaker, 20 mL of dehydrated toluene is added to the beaker, and the sample is dissolved, thereby preparing a solution. 10.0 mL of a 2 mol/L di-n-butylamine solution is added to and mixed with the solution, and then the solution is left to stand for 20 minutes or longer. 50 mL of isopropyl alcohol is added to the solution having been left to stand. Thereafter, neutralization titration is performed using a 1 mol/L hydrochloric acid solution, the inflection point on the titration curve is taken as an end point, and the titration amount Z2 (mL) to the end point is determined.

(Water or Compound Having Two or More Active Hydrogen Groups)

The shell of the microcapsule is formed by allowing a reaction between the aforementioned tri- or higher functional isocyanate compound with water or a compound having two or more active hydrogen groups.

As a compound to be reacted with the tri- or higher functional isocyanate compound, generally, water is used. By allowing the tri- or higher functional isocyanate compound to react with water, a three-dimensional cross-linked structure having a urea bond is formed.

In addition, examples of the compound to be reacted with the tri- or higher functional isocyanate compound includes, other than water, a compound having two or more active hydrogen group. As the compound having two or more active hydrogen groups, a polyfunctional alcohol, a polyfunctional phenol, a polyfunctional amine having a hydrogen atom on a nitrogen atom, and a polyfunctional thiol may also be used.

By reacting the isocyanate compound having three or more functional groups with a polyfunctional alcohol or a polyfunctional phenol, a three-dimensional cross-linked structure having a urethane bond is formed.

By reacting the isocyanate compound having three or more functional groups with a polyfunctional amine having a hydrogen atom on a nitrogen atom, a three-dimensional cross-linked structure having a urea bond is formed.

Specific examples of the polyfunctional alcohol include propylene glycol, glycerin, trimethylolpropane, 4,4',4"-trihydroxytriphenylmethane, and the like.

Specific examples of the polyfunctional amine include diethylene triamine, tetraethylene pentamine, and the like.

Specific examples of the polyfunctional thiol include 1,3-propanedithiol, 1,2-ethanedithiol, and the like.

Specific examples of the polyfunctional phenol include bisphenol A and the like.

One kind of these compounds may be used alone, or two or more kinds thereof may be used in combination.

The compound having two or more active hydrogen groups also includes the aforementioned compound having three or more active hydrogen groups in the molecule.

(Hydrophilic Group Capable of Being Contained in Shell)

The shell may have a hydrophilic group.

In the case where the shell has the hydrophilic group, the action of the hydrophilic group of the shell is combined with the action of the hydrophilic group of the dispersant, thereby improving the dispersion stability of the microcapsule.

A preferable aspect of the hydrophilic group capable of being contained in the shell is the same as the preferable aspect of the hydrophilic group of the dispersant.

As the hydrophilic group capable of being contained in the shell, a nonionic group is preferable. According to the above description, the dispersion stability of the microcapsule is further improved.

As the nonionic group as the hydrophilic group, a group having a polyether structure is preferable, a monovalent group containing a polyalkyleneoxy group is preferable, and a group (WS) represented by Formula (WS) is more preferable.

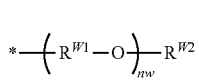

Formula (WS)

In Formula (WS), $R^{W1}$ represents an alkylene group having 1 to 6 carbon atoms that may be branched, $R^{W2}$ represents an alkyl group having 1 to 6 carbon atoms that may be branched, nw represents an integer from 2 to 200, and * represents a binding position.

In Formula (WS), the number of carbon atoms in the alkylene group represented by $R^{W1}$ having 1 to 6 carbon atoms that may be branched is preferably 2 to 4, more preferably 2 or 3, and particularly preferably 2 (that is, $R^{W1}$ is particularly preferably an ethylene group).

In Formula (WS), the number of carbon atoms in the alkyl group represented by $R^{W2}$ having 1 to 6 carbon atoms that may be branched is preferably 1 to 4, and particularly preferably 1 (that is, $R^{W2}$ is particularly preferably a methyl group).

In Formula (WS), nw represents an integer from 2 to 200. nw is preferably an integer from 10 to 200, more preferably an integer from 10 to 150, even more preferably an integer from 20 to 150, and particularly preferably an integer from 20 to 100.

Examples of the hydrophilic group capable of being contained in the shell include, in addition to the above-described nonionic group, an anionic group exemplified as a hydrophilic group in the dispersant (that is, at least one selected from the group consisting of a carboxy group, a salt of a carboxy group, a sulfo group, a salt of a sulfo group, a sulfate group, a salt of a sulfate group, a phosphonic acid group, a salt of a phosphonic acid group, a phosphoric acid group, and a salt of a phosphoric acid group).

The introduction of a hydrophilic group into the shell can be performed by allowing a reaction between the aforementioned tri- or higher functional isocyanate compound, water or a compound having two or more active hydrogen groups, and a compound having a hydrophilic group.

In addition, the introduction of the hydrophilic group into the shell of the microcapsule can be carried out as follows. First, a di- or higher functional isocyanate compound is allowed to react with a compound having a hydrophilic group so as to manufacture an isocyanate compound into which the hydrophilic group is introduced, next, "the isocyanate compound into which the hydrophilic group is introduced" is allowed to react with a compound having two or more active hydrogen groups so as to manufacture a tri- or higher functional isocyanate compound into which the hydrophilic group is introduced, and next, "the tri- or higher functional isocyanate compound into which the hydrophilic group is introduced" is allowed to react with water or a compound having two or more active hydrogen groups.

—Compound Having Hydrophilic Group—

Among the compound having the hydrophilic group, examples of the compound having the anionic group include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Specific examples of the compound having the anionic group, other than the above-described α-amino acid are as below.

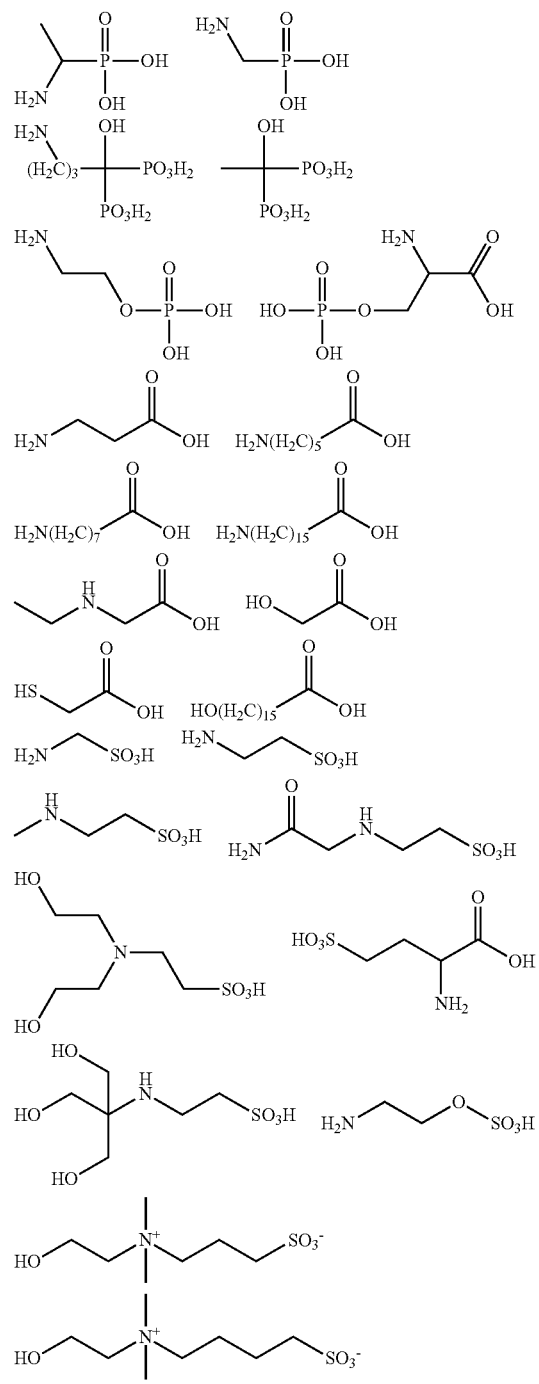

-continued

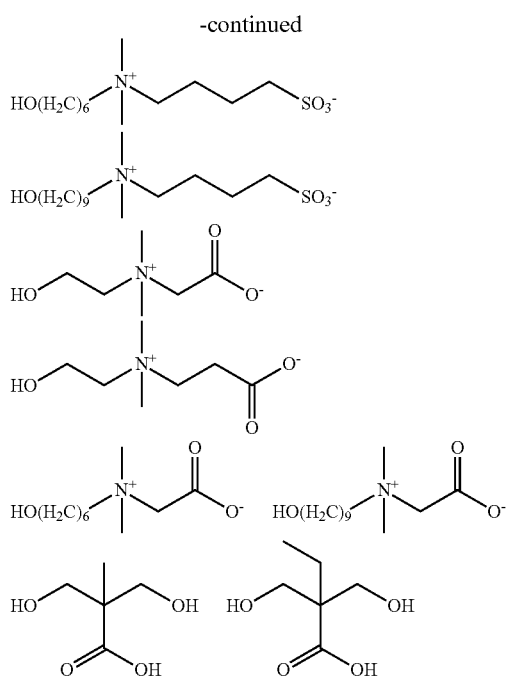

The compound having the anionic group may be used by neutralizing at least some of the anionic group by using an inorganic base such as sodium hydroxide or potassium hydroxide; an organic base such as triethylamine, or the like.

Among the compound having the hydrophilic group, as a compound having a nonionic group, a compound having a polyether structure is preferable, and a compound having a polyoxyalkylene chain is more preferable.

Specific examples of the compound having a polyoxyalkylene chain include polyethylene oxide, polypropylene oxide, polytetramethylene oxide, polystyrene oxide, polycyclohexylene oxide, a polyethylene oxide-polypropylene oxide block copolymer, a polyethylene oxide-polypropylene oxide random copolymer, and the like.

Among these compounds having a polyoxyalkylene chain, polyethylene oxide, polypropylene oxide, and a polyethylene oxide-polypropylene oxide block copolymer are preferable, and polyethylene oxide is more preferable.

Furthermore, as the compound having a polyether structure, a polyethylene oxide monoether compound (examples of the monoether include monomethyl ether, monoethyl ether, and the like) and a polyethylene oxide monoester compound (examples of the monoester include a monoacetic acid ester, a mono(meth)acrylic acid ester, and the like) are also preferable.

—Isocyanate Compound into Which Hydrophilic Group Is Introduced—

In addition, as described above, for introducing a hydrophilic group into the shell, an isocyanate compound into which a hydrophilic group is introduced can also be used.

Examples of the isocyanate compound into which a hydrophilic group is introduced include a reaction product between a compound having a hydrophilic group and a difunctional isocyanate compound (preferably, isophorone diisocyanate (IPDI), hexamethylene diisocyanate (HDI), trimethylhexamethylene diisocyanate (TMHDI), 1,3-bis (isocyanatomethyl)cyclohexane (HXDI), m-xylylene diisocyanate (XDI), or dicyclohexylmethane-4,4'-diisocyanate (HMDI)).

In a case where the group having a polyether structure is introduced into the shell, as the isocyanate compound into which the hydrophilic group (specifically, the group having a polyether structure) is introduced, it is preferable to use an adduct of a compound having two or more active hydrogen groups, a difunctional isocyanate compound, and a compound having a polyether structure.

The preferable aspects of the compound having two or more active hydrogen groups and the difunctional isocyanate compound are as described above.

As the compound having a polyether structure, a compound represented by Formula (WM) is preferable.

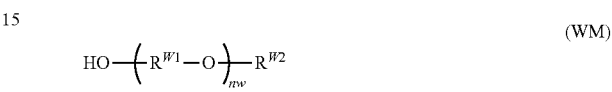

(WM)

In Formula (WM), each of $R^{W1}$, $R^{W2}$, and nw has the same definition as $R^{W1}$, $R^{W2}$, and nw in Formula (WS) described above, and the preferable aspect thereof is also the same.

As the adduct of the compound having two or more active hydrogen groups, the difunctional isocyanate compound, and the compound having a polyether structure, an adduct (for example, TAKENATE (registered trademark) D-116N manufactured by Mitsui Chemicals, Inc.) of trimethylolpropane (TMP), m-xylylene diisocyanate (XDI), and polyethylene glycol monomethyl ether (EO) is preferable.

In a case of introducing a carboxy group or a salt thereof into the shell, as the isocyanate compound into which the hydrophilic group is introduced, it is preferable to use a reaction product (that is, isocyanate compound containing a carboxy group or a salt thereof) between 2,2-bis(hydroxymethyl)propionic acid (DMPA) or a salt of thereof and isophorone diisocyanate (IPDI).

As the salt of a carboxy group, a sodium salt, a potassium salt, a triethylamine salt, or a dimethylethanolamine salt is preferable, and a sodium salt or a triethylamine salt is more preferable.

In a case of using the compound having a hydrophilic group for introducing a hydrophilic group into the shell, an added amount of the compound having a hydrophilic group is preferably 0.1% by mass to 50% by mass, more preferably 0.1% by mass to 45% by mass, even more preferably 0.1% by mass to 40% by mass, even more preferably 1% by mass to 35% by mass, and even more preferably 3% by mass to 30% by mass, with respect to the total solid content of the microcapsule and the total amount of the dispersant.

(Method for Introducing Polymerizable Group into Shell)

As described above, the microcapsule has the polymerizable group in at least one of the core or the shell.

The microcapsule has the polymerizable group, which makes it possible that by irradiation with active energy ray, microcapsules adjacent to each other are bonded to each other so as to form a cross-linked structure, and therefore an image having a high level of cross-linking properties and excellent film hardness can be formed.

The microcapsule may have the polymerizable group by a form in which the polymerizable group is introduced into the three-dimensional cross-linked structure of the shell or may have the polymerizable group by a form in which the polymerizable compound is contained in the core. In addition, the microcapsule may have the polymerizable group by both forms.

In a case where the polymerizable compound is not contained in the core of the microcapsule, the microcapsule has the polymerizable group in the three-dimensional cross-linked structure.

Hereinafter, a method for introducing the polymerizable group into the three-dimensional cross-linked structure of the shell will be described.

The polymerizable compound capable of being contained in the core will be described later.

Examples of the method for introducing the polymerizable group into the three-dimensional cross-linked structure of the shell include:

a method in which in a case of forming the three-dimensional cross-linked structure containing at least one bond selected from a urethane bond or a urea bond, the above-described tri- or higher functional isocyanate compound, water or the above-described compound having two or more active hydrogen groups, and the monomer for introducing the polymerizable group, are allowed to react with each other;

a method in which in a case of manufacturing the above-described tri- or higher functional isocyanate compound, first, the above-described di- or higher functional isocyanate compound and the monomer for introducing the polymerizable group are allowed to react with each other so as to manufacture an isocyanate compound into which the polymerizable group is introduced, and subsequently, the isocyanate compound into which the polymerizable group is introduced is allowed to react with water or the above-described compound having two or more active hydrogen groups;

a method in which in a case of manufacturing the microcapsule, the monomer for introducing the polymerizable group is dissolved in an oil-phase component together with the components constituting the microcapsule, and a water-phase component is added to and mixed with the oil-phase component, followed by emulsification; and the like.

Examples of the monomer for introducing a polymerizable group include a compound which has at least one active hydrogen group and has an ethylenically unsaturated bond on at least one terminal thereof.

The compound which has at least one active hydrogen group and has an ethylenically unsaturated bond on at least one terminal thereof can be represented by Formula (ma).

$$L^1 Lc_m Z_n \qquad (ma)$$

In Formula (ma), $L^1$ represents an (m+n)-valent linking group, m and n each independently represent an integer selected from 1 to 100, Lc represents a monovalent ethylenically unsaturated group, and Z represents an active hydrogen group.

$L^1$ is preferably an aliphatic group having a valency of 2 or higher, an aromatic group having a valency of 2 or higher, a heterocyclic group having a valency of 2 or higher, —O—, —S—, —NH—, —N<, —CO—, —SO—, —SO$_2$—, or a combination of these.

m and n each independently preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, a methacryloyl group, and the like.

Z is preferably OH, SH, NH, or NH$_2$, more preferably OH or NH$_2$, and even more preferably OH.

Examples of the compound which has at least one active hydrogen group and has an ethylenically unsaturated bond on at least one terminal thereof will be shown below, but the present invention is not limited to the structures. n in the compounds (a-3) and (a-14) represents an integer selected from 1 to 90, for example.

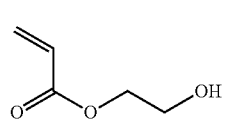
(a-1)

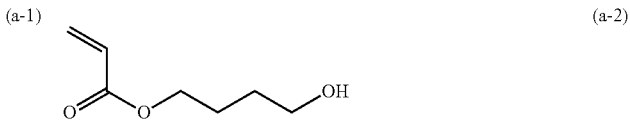
(a-2)

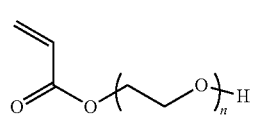
(a-3)

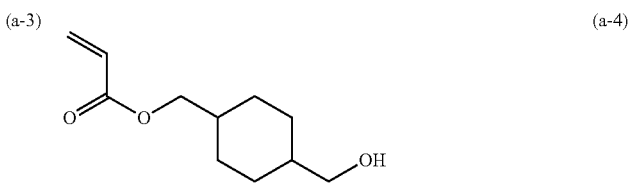
(a-4)

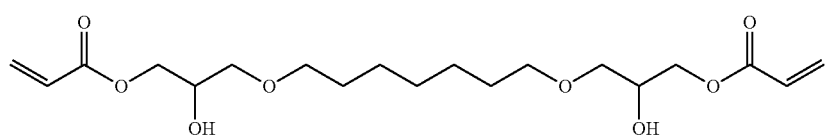
(a-5)

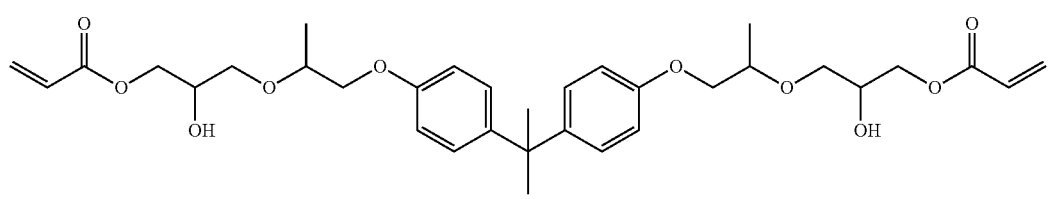
(a-6)

-continued
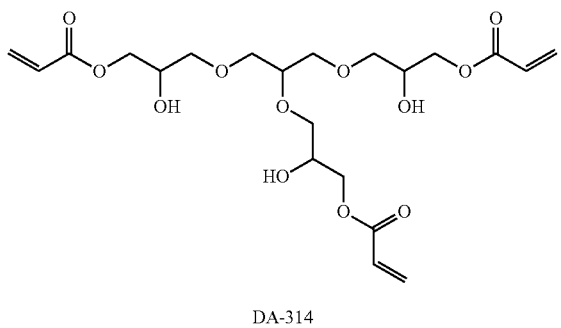
DA-314
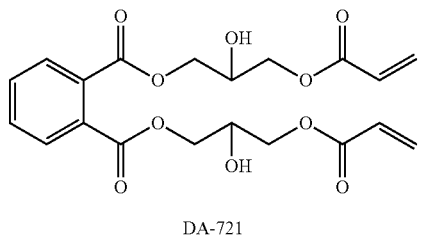
DA-721
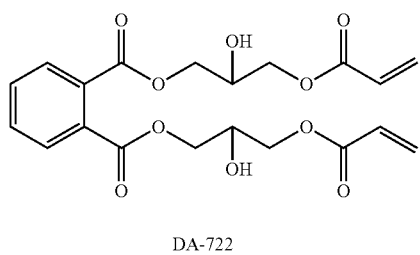
DA-722
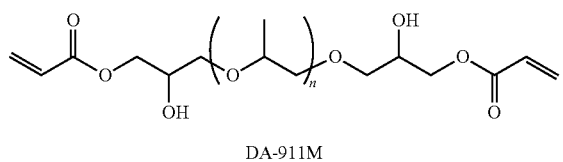
DA-911M
n = 1
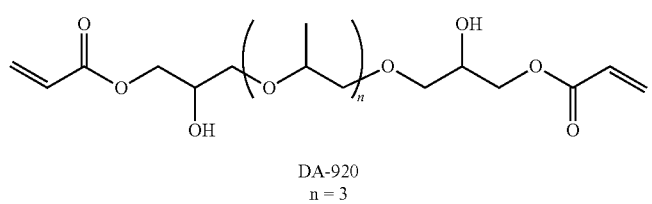
DA-920
n = 3
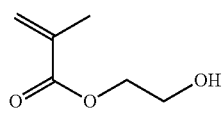
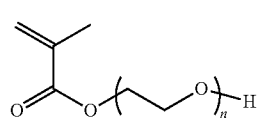
DA-931
n = 11
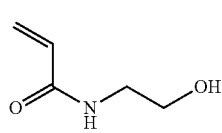
A-TMM-3L
SR399E

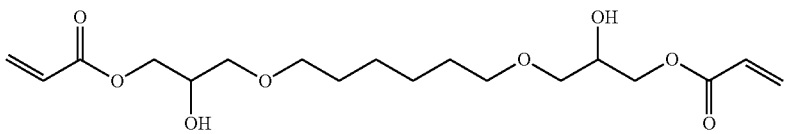

(a-18)

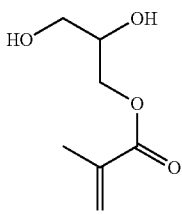

(a-19)

As the compound which has at least one active hydrogen group and has an ethylenically unsaturated bond on at least one terminal thereof, commercially available products may also be used. Examples thereof include acrylates such as hydroxyethyl acrylate (manufactured by OSAKA ORGANIC CHEMICAL INDUSTRY LTD), 4-hydroxybutyl acrylate, 1,4-cyclohexanedimethanol monoacrylate (manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), AP-800 (n=13) (manufactured by NOF CORPORATION), and DENACOL (registered trademark) ACRYLATE DA-212, DA-250, DA-314, DA-721, DA-722, DA-911M, DA-920, DA-931 (manufactured by Nagase ChemteX Corporation), methacrylates such as 2-hydroxyethyl methacrylate (manufactured by KYOEISHA CHEMICAL Co., LTD), and BLEMMER (registered trademark) PE-90 (n=2), PE-200 (n=4.5), PE-350 (n=8), PP-1000 (N=4 to 6), PP-500 (n=9), PP-800 (n=13) (manufactured by NOF CORPORATION), acrylamide (manufactured by KJ Chemicals Corporation), A-TMM-3L (manufactured by SHIN-NAKAMURA CHEMICAL CO., LTD.), SR-399E (manufactured by Sartomer Arkema Inc.), and the like.

Among these compounds which have at least one active hydrogen group and have an ethylenically unsaturated bond on at least one terminal thereof, hydroxyethyl acrylate (manufactured by OSAKA ORGANIC CHEMICAL INDUSTRY LTD), AE-400 (n=10), AP-400 (n=6) (manufactured by NOF CORPORATION), DENACOL (registered trademark) ACRYLATE DA-212 (manufactured by Nagase ChemteX Corporation), PP-500 (n=9) (manufactured by NOF CORPORATION), A-TMM-3L (manufactured by SHIN-NAKAMURA CHEMICAL CO., LTD.), or SR-399E (manufactured by Sartomer Arkema Inc.) is preferable.

The introduction of the polymerizable group into the shell can be carried out by allowing a reaction between, for example, an isocyanate compound into which the polymerizable group is introduced, and the above-described compound having two or more active hydrogen groups.

The isocyanate compound into which the polymerizable group is introduced can be manufactured by allowing a reaction between, for example, isocyanate groups of a tri- or higher functional isocyanate compound (hereinafter, will also be referred to as "polyisocyanate") and an active hydrogen group of the monomer for introducing a polymerizable group, as shown in Synthesize Scheme 3.

—Synthesize Scheme 3—

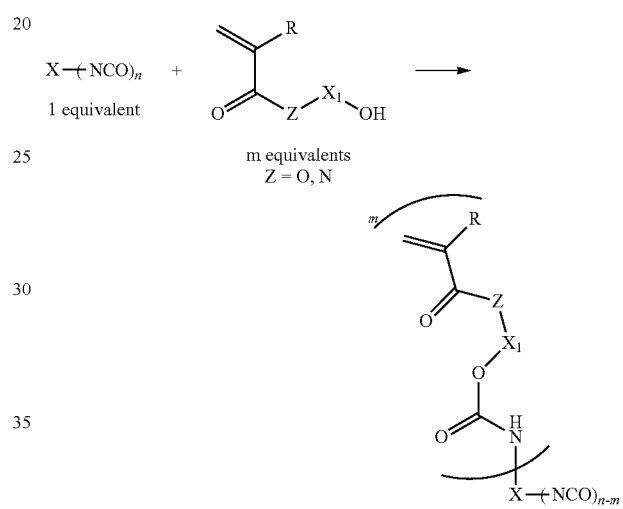

As the isocyanate compound into which the polymerizable group is introduced, a compound obtained by allowing a reaction between polyisocyanate (that is, a tri- or higher functional isocyanate compound), and the monomer for introducing a polymerizable group according to combinations shown in Table 3, is preferably used.

TABLE 3

| Compound No. | Polyisocyanate structure | | Composition Amount of active hydrogen group of monomer for introducing polymerizable group with respect to NCO group of polyisocyanate (mol %) |
|---|---|---|---|
| | Polyisocyanate | Monomer for introducing polymerizable group | |
| NCO 201 | NCO 104 | Hydroxybutyl acrylate | 15 |
| NCO 202 | NCO 104 | BLEMMER AP-400 | 15 |
| NCO 203 | NCO 104 | BLEMMER AE-400 | 15 |
| NCO 204 | NCO 104 | BLEMMER PP-500 | 15 |
| NCO 205 | NCO 104 | DA212 | 15 |
| NCO 206 | NCO 104 | DA920 | 15 |
| NCO 207 | DURANATE 24A-100 | BLEMMER AP-400 | 15 |
| NCO 208 | D-127 | BLEMMER AP-400 | 15 |
| NCO 209 | SUMIDUR | BLEMMER AP-400 | 15 |

TABLE 3-continued

| Compound No. | Polyisocyanate structure | | Composition Amount of active hydrogen group of monomer for introducing polymerizable group with respect to NCO group of polyisocyanate (mol %) |
|---|---|---|---|
| | Polyisocyanate | Monomer for introducing polymerizable group | |
| NCO 210 | N3300 DURANATE TKA-100 | BLEMMER AP-400 | 15 |
| NCO 211 | DURANATE TSE-100 | BLEMMER AP-400 | 15 |

One kind of monomer for introducing a polymerizable group may be used alone, or two or more kinds thereof may be used in combination.

At the time of manufacturing the isocyanate compound into which a polymerizable group is introduced, the polyisocyanate (that is, the isocyanate compound having three or more functional groups) and the monomer for introducing the polymerizable group are reacted with each other, such that the number of moles of the active hydrogen group of the monomer for introducing the polymerizable group preferably becomes 1% to 30% (more preferably becomes 2% to 25% and even more preferably becomes 3% to 20%) of the number of moles of the isocyanate group of the polyisocyanate.

In the isocyanate compound into which a polymerizable group is introduced, the average number of functional groups of the isocyanate group is equal to or smaller than 3 in some cases. However, even in these cases, as long as the raw materials for forming the shell contain at least one tri- or higher functional isocyanate compound, the shell having the three-dimensional cross-linked structure can be formed.

<Core of Microcapsule>

Components to be contained in the core of the microcapsule are not particularly limited.

The core may contain for example, a polymerizable compound, a photopolymerization initiator, a sensitizer, and the like. In addition, the core may contain other components of the aqueous dispersion which will be described below.

(Polymerizable Compound)

The core of the microcapsule preferably contains the polymerizable compound.

According to this aspect, curing sensitivity of a film and hardness of the film are further improved.

Hereinafter, the core of the microcapsule containing the polymerizable compound will also be referred to as the microcapsule containing the polymerizable compound in the interior thereof, and the polymerizable compound contained in the core will also be referred to as "internal polymerizable compound".

As described above, the term "polymerizable compound" (internal polymerizable compound) referred herein means the polymerizable compound contained in the core. The concept of the term "polymerizable compound" (internal polymerizable compound) does not include the term "isocyanate compound into which the polymerizable group is introduced" described above which is the compound for introducing the polymerizable group into the shell.

In a case where the core contains the polymerizable compound, the polymerizable compound contained in the core (internal polymerizable compound) may be used alone, or two or more kinds thereof may be used.

In a case where the core contains the polymerizable compound, a polymerizable group of the polymerizable compound functions as a polymerizable group of the core.

In the aspect in which the core of the microcapsule contains the polymerizable compound, not only the core but also the shell has the polymerizable group.

As the polymerizable compound capable of being contained in the core of the microcapsule, a photopolymerizable compound that is polymerized and cured by irradiation with active energy rays (will also be simply referred to as "light"), or a thermally polymerizable compound that is polymerized and cured by heating or irradiation with infrared rays, is preferable. As the photopolymerizable compound, a radical polymerizable compound which is capable of radical polymerization and has an ethylenically unsaturated bond is preferable.

The polymerizable compound capable of being contained in the core of the microcapsule may any one of a polymerizable monomer, a polymerizable oligomer, and a polymerizable polymer, but is preferably a polymerizable monomer from the viewpoints of improving the curing sensitivity of a film and hardness of the film. Among these, more preferable polymerizable compound is a polymerizable monomer having photocuring properties (photopolymerizable monomer), and a polymerizable monomer having thermosetting properties (thermally polymerizable monomer).

The content of the polymerizable compound (total content in a case of containing two or more kinds thereof) capable of being contained in the core of the microcapsule (preferably a polymerizable monomer, hereinafter, the same shall be applied) is preferably 10% by mass to 70% by mass, more preferably 20% by mass to 60% by mass, and even more preferably 30% by mass to 55% by mass, with respect to the total solid content of the microcapsule, from the viewpoint of improving curing sensitivity of a film and hardness of the film.

In a case where the core of the microcapsule contains the polymerizable compound, the core may contain only one kind of the polymerizable compound or may contain two or more kinds thereof.

The core of the microcapsule preferably contains a di- or lower functional polymerizable compound (preferably a di- or lower functional polymerizable monomer, hereinafter, the same shall be applied) and a tri- or higher functional polymerizable compound (preferably a tri- or higher functional polymerizable monomer, hereinafter, the same shall be applied). According to the aspect in which the core of the microcapsule contains a di- or lower functional polymerizable compound and a tri- or higher functional polymerizable compound, a film having excellent hardness and having excellent adhesiveness to a substrate can be formed. In the above aspect, it is considered that the di- or lower functional polymerizable compound contributes to the adhesiveness of the film to the substrate, and the tri- or higher functional polymerizable compound contributes to the hardness of the film.

In the case where the polymerizable compound contains the di- or lower functional polymerizable compound and the tri- or higher functional polymerizable compound, a ratio of the tri- or higher functional polymerizable compound is preferably 10% by mass to 90% by mass, more preferably 20% by mass to 70% by mass, and even more preferably 30% by mass to 55% by mass, with respect to a total mass of the di- or lower functional polymerizable compound and the tri- or higher functional polymerizable compound.

The molecular weight of the polymerizable compound is, in terms of a weight-average molecular weight, preferably 100 to 100,000, more preferably 100 to 30,000, even more preferably 100 to 10,000, still more preferably 100 to 4,000, yet more preferably 100 to 2,000, much more preferably 100 to 1,000, far more preferably 100 to 900, far more preferably 100 to 800, and particularly preferably 150 to 750.

The weight-average molecular weight of the polymerizable compound is a value measured by gel permeation chromatography (GPC). A measure method is as described above.

—Polymerizable Monomer—

Examples of the polymerizable monomer capable of being contained in the core of the microcapsule include a photopolymerizable monomer that is polymerized and cured by irradiation with light, or a thermally polymerizable monomer that is polymerized and cured by heating or irradiation with infrared rays.

In a case of containing the photopolymerizable monomer as the polymerizable compound, an aspect in which a photopolymerization initiator to be described later is contained is preferable. In addition, in a case of containing the thermally polymerizable monomer as the polymerizable compound, the photothermal conversion agent, the thermal curing accelerator, or an aspect in which the photothermal conversion agent and the thermal curing accelerator are contained, which will be described later is preferable.

<Photopolymerizable Monomer>

The photopolymerizable monomer can be selected from a polymerizable monomer having a radical polymerizable ethylenically unsaturated bond (that is, a radical polymerizable monomer) and a polymerizable monomer having a cationic polymerizable group that can be cationically polymerized (that is, a cationic polymerizable monomer).

Examples of the radical polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

As the radical polymerizable monomer, a compound having an ethylenic unsaturated group and an ethylenically unsaturated group is preferable.

In a case where the core of the microcapsule contains the radical polymerizable monomer, the core may contain only one or two or more radical polymerizable monomers.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxyethylhydrophthalic acid, ethoxy di ethylene glycol acrylate, methoxydiethyleneglycol acrylate, methoxypolyethylene glycol acrylate, methoxypropylene glycol acrylate, 2-hydroxy-3-phenoxypropyl acrylate, vinyl ether acrylate, 2-acryloyloxyethyl succinic acid, 2-acryloyloxy phthalic acid, 2-acryloxyethyl-2-hydroxyethyl phthalic acid, lactone modified acrylate, acryloyl morpholine, acrylamide, and substituted acrylamides (for example, N-methylol acrylamide and diacetone acrylamide);

difunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate;

tri- or higher functional acrylate compounds such as trimethylolpropane triacrylate, pentaerythritol triacrylate, dipentaerythritol tetraacrylate, ethoxylated isocyanuric acid triacrylate, ε-caprolactone modified tri s-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate; and the like.

Examples of the methacrylate compound include monofunctional methacrylate compounds such as methyl methacrylate, n-butyl methacrylate, allyl methacrylate, glycidyl methacrylate, benzyl methacrylate, dimethylaminoethyl methacrylate, methoxypolyethylene glycol methacrylate, methoxytriethylene glycol methacrylate, hydroxyethyl methacrylate, phenoxyethyl methacrylate, and cyclohexyl methacrylate;

difunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate; and the like.

Examples of the styrene compound include styrene, p-methylstyrene, p-methoxy styrene, β-methyl styrene, p-methyl-β-methyl styrene, α-methyl styrene, p-methoxy-β-methylstyrene, and the like.

Examples of the vinylnaphthalene compound include 1-vinylnaphthalene, methyl-1-vinylnaphthalene, β-methyl-1-vinylnaphthalene, 4-methyl-1-vinylnaphthalene, 4-methoxy-1-vinylnaphthalene, and the like.

Examples of the N-vinyl heterocyclic compound include N-vinylcarbazole, N-vinylpyrrolidone, N-vinyl ethylacetamide, N-vinylpyrrole, N-vinylphenothiazine, N-vinylacetanilide, N-vinyl succinic acid imide, N-vinylphthalimide, N-vinylcaprolactam, N-vinylimidazole, and the like.

Examples of other radical polymerizable monomers include N-vinyl amides such as allyl glycidyl ether, diallyl phthalate, triallyl trimellitate, and N-vinylformamide, and the like.

Among these radical polymerizable monomer, as the di- or lower functional radical polymerizable monomer, at least one kind selected from 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, or polypropylene glycol diacrylate, is preferable.

In addition, as the tri- or higher functional radical polymerizable monomer, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, or propoxylated trimethylolpropane triacrylate, is preferable.

As a combination of the di- or lower functional radical polymerizable monomer and the tri- or higher functional radical polymerizable monomer, a combination of a di- or lower functional acrylate compound and a tri- or higher functional acrylate compound is preferable, a combination of a difunctional acrylate compound and a tri- or higher functional acrylate compound is even more preferable, a combination of a difunctional acrylate compound and a tri- to octa-acrylate compound is still more preferable, and a combination of a difunctional acrylate compound and a tri- to hexa-acrylate compound is yet more preferable.

Furthermore, the most preferable combination thereof is a combination of, as a difunctional acrylate compound, at least one kind selected from 1,6-hexanediol diacrylate (HDDA), 1,9-nonanediol diacrylate (NDDA), 1,10-decanediol diacrylate (DDDA), 3-methylpentadiol diacrylate (3 MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, or polypropylene glycol diacrylate, and, as a tri- to hexa-acrylate compound, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, or propoxylated trimethylolpropane triacrylate.

Examples of the cationic polymerizable monomer include an epoxy compound, a vinyl ether compound, and an oxetane compound.

As the cationic polymerizable monomer, a compound having at least one olefin, thioether, acetal, thioxane, thietane, aziridine, N-heterocyclic ring, O-heterocyclic ring, S-heterocyclic ring, P-heterocyclic ring, aldehyde, lactam, or a cyclic ester group is preferable.

Examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, alicyclic diepoxide, and the like.

Examples of the alicyclic diepoxide include a copolymer of an epoxide and a compound containing a hydroxyl group, such as glycol, polyol, and vinyl ether, and the like. Specifical examples thereof include 3,4-epoxycyclohexylmethyl-3',4'-epoxycycloethylcarboxylate, bis(3,4-epoxyhexylmethyl)adipate, limonene diepoxide, diglycidyl ester of hexahydrophthalic acid, and the like.

In addition, examples of other epoxy compounds include tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene, and the like.

Examples of the vinyl ether compound include di- or lower functional vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexane dimethanol monovinyl ether, phenyl vinyl ether, p-methylphenyl vinyl ether, p-methoxyphenyl vinyl ether, methyl vinyl ether, β-methyl vinyl ether, β-chloro iso vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexane dimethanol divinyl ether, 4-(vinyloxy)butyl benzoate, bis[4-(vinyloxy)butyl] adipate, bis[4-(vinyloxy)butyl] succinate, 4-(vinyloxymethyl)cyclohexylmethyl benzoate, bis[4-(vinyloxy)butyl] isophthalate, bis[4-(vinyloxymethyl)cyclohexylmethyl] glutarate, 4-(vinyloxy)butyl steatite, bis[4-(vinyloxy)butyl] hexadiyl dicarbamate, bis[4-(vinyloxy)methyl]cyclohexyl] methyl] terephthalate, bis[4-(vinyloxy)methyl]cyclohexyl] methyl] isophthalate, bis[4-(vinyloxy)butyl] (4-methyl-1,3-phenylene)-biscarbamate, bis[4-vinyl oxy)butyl] (methylenedi-4,1-phenylene)biscarbamate, and 3-amino-1-propanol vinyl ether; and tri- or higher functional vinyl ether compounds such as tris[4-(vinyloxy)butyl] trimellitate.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, 3,3-dimethyl-2-(p-methoxyphenyl)-oxetane, and the like.

In addition to the radical polymerizable monomers exemplified above, it is possible to use the commercially available products described in "Cross-linking Agent Handbook" edited by Shinzo Yamashita (1981, TAISEI-SHUPPAN CO., LTD.); "UV•EB Curing Handbook (raw materials)" edited by Kiyomi Kato (1985, Kobunshi Kankokai); "Application and Market of UV•EB Curing Technology" edited by RadTech Japan, p. 79, (1989, CMC); "Polyester Resin Handbook" written by Eichiro Takiyama, (1988, NIKKAN KOGYO SHIMBUN, LTD.) and to use radical polymerizable and cross-linkable monomers known in the technical field.

Furthermore, in addition to the cationic polymerizable monomers exemplified above, it is possible to use the compounds described in "Advances in Polymer Science" by J. V. Crivello et al., 62, pages 1 to 47 (1984), "Handbook of Epoxy Resins" by Lee et al., McGraw Hill Book Company, New York (1967), and "Epoxy Resin Technology" by P. F. Bruins et al. (1968).

In addition, as the photopolymerizable monomer, for example, the photocurable polymerizable monomers used in photopolymerizable compositions described in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A, and the like are known. These monomers can also be suitably applied as the polymerizable monomer capable of being contained in the core of the microcapsule.

As the photopolymerizable monomer, a commercially available product on the market may be used.

Examples of the commercially available product of the photopolymerizable monomer include AH-600 (difunctional), AT-600 (difunctional), UA-306H (hexafunctional), UA-306T (hexafunctional), UA-306I (hexafunctional), UA-510H (decafunctional), UF-8001G (difunctional), DAUA-167 (difunctional), LIGHT ACRYLATE NPA (difunctional), and LIGHT ACRYLATE 3EG-A (difunctional) (all of which are manufactured by KYOEISHA CHEMICAL Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (all of which are manufactured by Sartomer Arkema Inc.), A-NOD-N(NDDA, difunctional), A-DOD-N (DDDA, difunctional), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (all of which are manufactured by Shin-Nakamura Chemical Co., Ltd.), UV-7510B (trifunctional) (manufactured by Nippon Synthetic Chemical Industry Co., Ltd.), KAYARAD DCPA-30 (hexafunctional) and KAYARAD DPEA-12 (hexafunctional) (all of which are manufactured by Nippon Kayaku Co., Ltd.), and the like.

In addition, as the polymerizable monomer, it is possible to suitably use the commercially available products such as neopentyl glycol propylene oxide adduct diacrylate (NPG-PODA), SR531, SR285, and SR256 (all of which are manufactured by Sartomer Arkema Inc.), A-DHP (dipentaerythritol hexaacrylate, SHIN-NAKAMURA CHEMICAL CO., LTD.), ARONIX (registered trademark) M-156 (manufactured by TOAGOSEI CO., LTD.), V-CAP (manufactured by BASF SE), VISCOAT #192 (manufactured by OSAKA ORGANIC CHEMICAL INDUSTRY LTD), and the like.

<Thermally Polymerizable Monomer>

The thermally polymerizable monomer can be selected from the group of the polymerizable monomers capable of polymerization by heating or irradiation with infrared rays. Examples of thermally polymerizable monomer include compounds such as epoxy, oxetane, aziridine, azetidine, ketone, aldehyde, or blocked isocyanate.

Among the above examples, examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, and alicyclic diepoxide;

tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene; and the like.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, 3,3-dimethyl-2-(p-methoxyphenyl)-oxetane, and the like.

Examples of the blocked isocyanate compound include a compound obtained by inactivating an isocyanate compound with a blocking agent (active hydrogen-containing compound).

As the isocyanate compound, for example, commercially available isocyanates such as hexamethylene diisocyanate, isophorone diisocyanate, toluyl diisocyanate, xylylene diisocyanate, hexamethylene diisocyanate trimer, trimethylhexylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and Bayhydur (registered trademark; Bayer AG), or a di- or higher functional isocyanate obtained by combination thereof is preferable.

Examples of the blocking agent include lactam [for example, ε-caprolactam, δ-valerolactam, γ-butyrolactam, and the like], oxime [for example, acetoxime, methyl ethyl ketoxime (MEK oxime), methyl isobutyl ketoxime (MIBK oxime), cyclohexanone oxime, and the like], amines [for example, aliphatic amines (dimethylamine, diisopropylamine, di-n-propylamine, diisobutylamine, and the like), alicyclic amines (methylhexylamine, dicyclohexylamine, and the like), aromatic amines (aniline, diphenylamine, and the like)], aliphatic alcohols [for example, methanol, ethanol, 2-propanol, n-butanol, and the like], phenol and alkylphenol [for example, phenol, cresol, ethylphenol, n-propylphenol, isopropylphenol, n-butylphenol, octylphenol, nonylphenol, xylenol, diisopropylphenol, di-t-butylphenol, and the like], imidazole [for example, imidazole, 2-methylimidazole, and the like], pyrazole [for example, pyrazole, 3-methylpyrazole, 3,5-dimethylpyrazole, and the like], imine [for example, ethyleneimine, polyethyleneimine, and the like], active methylene [for example, dimethyl malonate, diethyl malonate, diisopropyl malonate, acetylacetone, methyl acetoacetate, ethyl acetoacetate, and the like], blocking agents disclosed in JP2002-309217A and JP2008-239890A, and a mixture of two or more kinds thereof. Among these, as the blocking agent, oxime, lactam, pyrazole, active methylene, and amine are preferable.

As the blocked isocyanate compound, commercially available products on the market may be used, and for example, Trixene (registered trademark) BI7982, BI7641, BI7642, BI7950, BI7960, BI7991, and the like (Baxenden Chemicals ltd), and Bayhydur (registered trademark; Bayer AG) are suitably used. In addition, the group of compounds described in paragraph 0064 of WO2015/158654A is suitably used.

In a case of manufacturing the microcapsule, the polymerizable monomer is dissolved as an oil-phase component together with the components constituting the microcapsule, and a water-phase component is added to and mixed with the oil-phase component, followed by emulsification, and therefore the polymerizable monomer can be incorporated into the core of the microcapsule.

The molecular weight of the polymerizable monomer is, in terms of a weight-average molecular weight, preferably 100 to 4,000, more preferably 100 to 2,000, even more preferably 100 to 1,000, still more preferably 100 to 900, yet more preferably 100 to 800, and particularly preferably 150 to 750.

The weight-average molecular weight of the polymerizable monomer is a value measured by gel permeation chromatography (GPC). A measure method is as described above.

—Polymerizable Oligomer and Polymerizable Polymer—

An aspect in which the polymerizable compound is a polymerizable oligomer or a polymerizable polymer is advantageous in that cure shrinkage of a film is decreased and a deterioration in adhesiveness of the film to a substrate is suppressed. In a case of containing the polymerizable oligomer or polymerizable polymer, which have photocuring properties, as the polymerizable compound, an aspect in which a photopolymerization initiator to be described later is contained is preferable. In addition, in a case of containing the polymerizable oligomer or polymerizable polymer, which have thermosetting properties, as the polymerizable compound, the photothermal conversion agent, the thermal curing accelerator, or an aspect in which the photothermal conversion agent and the thermal curing accelerator are contained, which will be described later is preferable.

Examples of the polymerizable oligomer or the polymerizable polymer include oligomers or polymers such as an acrylic resin, a urethane resin, polyester, polyether, polycarbonate, an epoxy resin, and polybutadiene.

In addition, as the polymerizable oligomer or the polymerizable polymer, resins such as epoxy acrylate, aliphatic urethane acrylate, aromatic urethane acrylate, and polyester acrylate may be used.

Among these, as the polymerizable oligomer or the polymerizable polymer, from the viewpoint of decreasing cure shrinkage, a resin which has a hard segment and a soft segment in combination and is capable of stress relaxation in a case of curing is preferable, and particularly, at least one oligomer or polymer selected from the group consisting of a urethane resin, a polyester resin, or an epoxy resin is more preferable.

As the polymerizable group having the polymerizable oligomer or the polymerizable polymer, an ethylenically unsaturated group such as a (meth)acrylic group, a vinyl group, an allyl group, and a styryl group, an epoxy group, and the like are preferable, and from the viewpoint of polymerization reactivity, at least one group selected from the group consisting of a (meth)acrylic group, a vinyl group, and a styryl group is more preferable, and a (meth)acrylic group is particularly preferable.

In a case where the core of the microcapsule contains the polymerizable oligomer or the polymerizable polymer as the polymerizable compound, the polymerizable oligomer or the polymerizable polymer may have only one or two or more polymerizable groups.

These polymerizable groups can be introduced into polymers or oligomers by polymer reaction or copolymerization.

For example, by using a reaction between a polymer or an oligomer having a carboxy group on a side chain, and glycidyl methacrylate, or a reaction between a polymer or an oligomer having an epoxy group, and an ethylenically unsaturated group-containing carboxylic acid such as a methacrylic acid, the polymerizable groups can be introduced into polymers or oligomers.

As the polymerizable oligomer and the polymerizable polymer, a commercially available product on the market may be used.

Examples of the commercially available product of the polymerizable oligomer and the polymerizable polymer include acrylic resins such as (ACA) Z200M, (ACA) Z230AA, (ACA) Z251, and (ACA) Z254F (all of which are manufactured by DAICEL-ALLNEX LTD.), and HA7975D (Hitachi Chemical Co., Ltd.);

urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, and KRM 8528 (all of which are manufactured by DAICEL-ALLNEX LTD.), CN964, CN9012, CN968, CN996, CN975, and CN9782 (all of which are manufactured by Sartomer Arkema Inc.), UV-6300B, UV-7600B, UV-7605B, UV-7620EA, and UV-7630B (all of which are manufactured by Nippon Synthetic Chemical Industry Co., Ltd.), U-6HA, U-15HA, U-108A, U-200PA, and UA-4200 (all of which are manufactured by Shin-Nakamura Chemical Co., Ltd.), TL2300, HA4863, TL2328, TL2350, and HA7902-1 (all of which are manufactured by Hitachi Chemical Co., Ltd.), and 8UA-017, 8UA-239, 8UA-239H, 8UA-140, 8UA-585H, 8UA-347H, and 8UX-015A (all of which are manufactured by TAISEI FINE CHEMICAL CO., LTD.);

polyester resins such as CN294, CN2254, CN2260, CN2271E, CN2300, CN2301, CN2302, CN2303, and CN2304 (all of which are manufactured by Sartomer Arkema Inc.), and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are manufactured by DAICEL-ALLNEX LTD.);

polyether resins such as BLEMMER (registered trademark) ADE-400A and BLEMMER (registered trademark) ADP-400 (all of which are manufactured by NOF CORPORATION);

polycarbonate resins such as polycarbonate diol diacrylate (UBE INDUSTRIES, LTD.);

epoxy resins such as EBECRYL (registered trademark) 3708 (DAICEL-ALLNEX LTD.), CN120, CN120B60, CN120B80, and CN120E50 (all of which are manufactured by Sartomer Arkema Inc.), HA7851 (Hitachi Chemical Co., Ltd.), and EPICLON (registered trademark) 840 (DIC CORPORATION); and polybutadiene resins such as CN301, CN303, and CN307 (all of which are manufactured by Sartomer Arkema Inc.).

(Photopolymerization Initiator)

The core of the microcapsule may contain at least one photopolymerization initiator. That is, the microcapsule may contain at least one photopolymerization initiator in the interior thereof.

In a case where the polymerizable group of the microcapsule is a photopolymerizable group (preferably a radical polymerizable group) (particularly, in a case where the core contains a photopolymerizable compound (more preferably a radical polymerizable compound)), the core of the microcapsule preferable contains at least one photopolymerization initiator.

In the case where the core of the microcapsule contains the photopolymerization initiator, sensitivity with respect to active energy rays increases, thereby by obtaining a film (for example, an image) in which hardness is excellent and adhesiveness to a substrate is also excellent.

In more detail, the microcapsule in the aqueous dispersion of the present disclosure has the polymerizable group in at least one of the shell or the core. In the case where the core of the microcapsule contains the photopolymerization initiator, one microcapsule has both the polymerizable group and the photopolymerization initiator. Therefore, a distance between the polymerizable group and the photopolymerization initiator becomes closer, and thus curing sensitivity (hereinafter, will also be simply referred to as "sensitivity") of the film is improved compared to the case of using the photocurable composition of the related art. As a result, a film having excellent hardness, and excellent adhesiveness to a substrate is formed.

In addition, in the case where the core of the microcapsule contains the photopolymerization initiator, it is possible to use a photopolymerization initiator which is highly sensitive but was difficult to use in the related art due to low dispersibility or low solubility in water (for example, a photopolymerization initiator exhibiting solubility equal to or lower than 1.0% by mass in water at 25° C.). As a result, a range of choice of the photopolymerization initiator to be used broadens, and hence a range of choice of the light source to be used also broadens. Accordingly, the curing sensitivity can be further improved compared to the related art.

Specific examples of the above-described photopolymerization initiator which is highly sensitive but was difficult to use due to low dispersibility or low solubility in water, include a carbonyl compound and an acylphosphine oxide compound to be described later, and the acylphosphine oxide compound is preferable.

As above, in the aqueous dispersion of the present disclosure, the substance which exhibits low solubility in water can be contained in the aqueous dispersion which is an aqueous composition by being contained in the core of the microcapsule. This is one of the advantageous of the aqueous dispersion of the present disclosure.

In addition, in the aqueous dispersion of the aspect in which the core of the microcapsule contains the photopolymerization initiator, storage stability is excellent compared to the photocurable composition of the related art. It is considered that the reason thereof is because the photopolymerization initiator being contained in the core of the microcapsule suppresses the aggregation or precipitation of the photopolymerization initiator. Furthermore, it is considered that the core containing the photopolymerization initiator is covered by the shell, which suppresses bleeding out of the photopolymerization initiator, and therefore the dispersion stability of the microcapsule is improved.

As the photopolymerization initiator capable of being contained in the interior of the core of the microcapsule (hereinafter, referred to as an internal photopolymerization initiator as well), known photopolymerization initiators can be appropriately selected so as to be used.

The internal photopolymerization initiator is a compound generating a radical, which is a polymerization initiating species, by absorbing light (that is, active energy rays).

Known compounds can be used as the internal photopolymerization initiator. Examples of preferable internal photopolymerization initiators include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

As the internal photopolymerization initiator, one kind of the compounds (a) to (m) may be used singly, or two or more kinds thereof may be used in combination.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77~117, and the like.

More preferable examples of the compounds include the α-thiobenzophenone compound described in JP1972-6416B (JP-S47-6416B), the benzoin ether compound described in JP1972-3981B (JP-S47-3981B), the α-substituted benzoin compound described in JP1972-22326B (JP-S47-22326B), the benzoin derivative described in JP1972-23664B (JP-S47-23664B), the aryolphosphonic acid ester described in JP1982-30704A (JP-S57-30704A), the dialkoxybenzophenone described in JP1985-26483B (JP-S60-26483B), the benzoin ethers described in JP1985-26403B (JP-S60-26403B) and JP1987-81345A (JP-S62-81345A), the α-aminobenzophenones described in JP1989-34242B (JP-H01-34242B), U.S. Pat. No. 4,318,791A, and EP0284561A1, the p-di(dimethylaminobenzoyl)benzene described in JP1990-211452A (JP-H02-211452A), the thio-substituted aromatic ketone described in JP1986-194062A (JP-S61-194062A), the acylphosphine sulfide described in JP1990-9597B (JP-H02-9597B), the acylphosphine described in JP1990-9596B (JP-H02-9596B), the thioxanthones described in JP1988-61950B (JP-S63-61950B), the coumarins described in JP1984-42864B (JP-S59-42864B), and the like.

Furthermore, the polymerization initiator described in JP2008-105379A or JP2009-114290A is also preferable.

Examples of the commercially available product of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO (all of which are manufactured by BASF SE), ESACURE (registered trademark) KT037, KT046, KIP150, and EDB (all of which are manufactured by Lamberti S.p.A.), H-Nu (registered trademark) 470 and 470X (all of which are manufactured by Spectra Group Limited, Inc.), Omnipol TX and 9210 (all of which are manufactured by IGM Resins B. V), SPEEDCURE 7005, 7010, and 7040 (all of which are manufactured by Lambson Limited), and the like.

Among these internal photopolymerization initiators, (a) carbonyl compound or (b) acylphosphine oxide compound is more preferable. Specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2,4,6-trimethylbenzoyl-diphenyl-phosphine oxide (for example, DAROCUR (registered trademark) TPO, LUCIRIN (registered trademark) TPO (all manufactured by BASF SE)), and the like.

Among these, from the viewpoint of improving sensitivity and from the viewpoint of suitability for LED light, as the internal photopolymerization initiator, (b) acylphosphine oxide compound is preferable, and a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide) is more preferable.

The wavelength of the LED light is preferably 355 nm, 365 nm, 385 nm, 395 nm, or 405 nm.

In addition, as the internal photopolymerization initiator, a polymer-type photopolymerization initiator is preferable from the viewpoint of suppressing the migration.

Examples of the polymer-type photopolymerization initiator include Omnipol TX, 9210; SPEEDCURE 7005, 7010, and 7040 described above.

In a case of manufacturing the microcapsule, the internal photopolymerization initiator is dissolved as an oil-phase component together with the components constituting the microcapsule, a water-phase component is added to and mixed with the oil-phase component, followed by emulsification, and therefore the internal photopolymerization initiator can be incorporated into the core of the microcapsule.

The content of the internal photopolymerization initiator with respect to the total solid content of the microcapsule and the total amount of the dispersant is preferably 0.1% by mass to 25% by mass, more preferably 0.5% by mass to 20% by mass, and even more preferably 1% by mass to 15% by mass.

—Internal Content Rate—

In the aqueous dispersion of the present disclosure, from the viewpoint of the curing sensitivity of a film, an internal content rate (% by mass) of the photopolymerization initiator is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass.

In a case where the aqueous dispersion contains two or more kinds of photopolymerization initiators, it is preferable that the internal content rate of at least one kind of photopolymerization initiator is within the aforementioned preferable range.

The internal content rate (% by mass) of the photopolymerization initiator means the amount of the photopolymerization initiator contained in the core of the microcapsule (that is, the polymerizable compound contained in the interior of the microcapsule) with respect to the total amount of the photopolymerization initiator in the aqueous dispersion in a case where the aqueous dispersion is prepared, and refers to a value obtained as below.

—Method for Measuring Internal Content Rate (% by mass) of Photopolymerization Initiator—

The operation described below is performed under the condition of a liquid temperature of 25° C.

In a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

First, from the aqueous dispersion, two samples (hereinafter, referred to as "sample 1" and "sample 2") of the same mass are collected.

Tetrahydrofuran (THF) having a mass 500 times the mass of the total solid content in the sample 1 is added to and mixed with the sample 1, thereby preparing a diluted solution. The obtained diluted solution is subjected to centrifugation under the condition of 80,000 rpm and 40 minutes. The supernatant (hereinafter, referred to as "supernatant 1") generated by the centrifugation is collected. It is considered that by this operation, all of the photopolymerization initiators contained in the sample 1 is extracted into the supernatant 1. The mass of the photopolymerization initiator contained in the collected supernatant 1 is measured by liquid chromatography (for example, a liquid chromatography device manufactured by Waters Corporation). The obtained mass of the photopolymerization initiator is taken as "total amount of photopolymerization initiator".

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the photopolymerization initiator that was not contained in the interior of the microcapsule in the sample 2 (that is, the free photopolymerization initiator) is extracted into the supernatant 2. The mass of the photopolymerization initiator contained in the collected supernatant 2 is measured by liquid chromatography (for example, a liquid chromatography device manufactured by Waters Corporation). The obtained mass of the photopolymerization initiator is taken as "amount of the free photopolymerization initiator".

Based on "total amount of photopolymerization initiator" and "amount of free photopolymerization initiator" described above, the internal content rate (% by mass) of the photopolymerization initiator is calculated according to the equation shown below.

Internal content rate (% by mass) of photopolymerization initiator=((total amount of photopolymerization initiator−amount of free photopolymerization initiator)/total amount of photopolymerization initiator)×100

In a case where the aqueous dispersion contains two or more kinds of photopolymerization initiators, by using the total amount of the two or more kinds of photopolymerization initiators as "total amount of photopolymerization initiators" and using the total amount of the two or more kinds of free photopolymerization initiators as "amount of free photopolymerization initiators", the total internal content rate of the two or more kinds of photopolymerization initiators may be determined. Alternatively, by using the amount of one kind of photopolymerization initiator as "total amount of photopolymerization initiator" and using the amount of the other one kind of free photopolymerization initiator as "amount of free photopolymerization initiator", the internal content rate of any one kind of photopolymerization initiator may be determined.

Whether or not the components (for example, the above-described polymerizable compound) other than the photopolymerization initiator are contained in the interior of the microcapsule (that is, whether the components are contained in the core of the microcapsule) can be checked by the same method as the method for investigating whether or not the photopolymerization initiator is contained in the interior of the microcapsule.

For a compound having a molecular weight equal to or more than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

The measurement conditions by GPC in the present specification are as described above.

In the present specification, the mass of a compound is measured by the gel permeation chromatography (GPC), by using HLC (registered trademark)-8020 GPC (manufactured by Tosoh Corporation) as a measurement device, three columns of TSKgel (registered trademark) Super Multipore HZ-H (4.6 mm ID×15 cm, manufactured by Tosoh Corporation) as columns, and tetrahydrofuran (THF) as an eluent. Furthermore, GPC is performed using an RI detector under the measurement conditions of a sample concentration of 0.45% by mass, a flow rate of 0.35 ml/min, a sample injection amount of 10 µl, and a measurement temperature of 40° C.

A calibration curve is prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

(Sensitizer)

The core of the microcapsule may contain at least one sensitizer.

In a case where the core contains at least one photopolymerization initiator, the core preferably contains at least one sensitizer.

In a case where the core of the microcapsule contains the sensitizer, the decomposition of the photopolymerization initiator by the irradiation with active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acylcoumarin derivative, terphenyl, styryl ketone, 3-(aroylmethylene)thiazolyl, camphorquinone, eosin, rhodamine, erythrosine, and the like.

Furthermore, as the sensitizer, the compound represented by General Formula (i) described in JP2010-24276A or the compound represented by General Formula (I) described in JP1994-107718A (JP-H06-107718A) can also be suitably used.

Among the above compounds, as the sensitizer, from the viewpoint of the suitability for LED light and the reactivity with the photopolymerization initiator, at least one kind of compound selected from thioxanthone, isopropylthioxanthone, or benzophenone is preferable, at least one kind of compound selected from thioxanthone or isopropylthioxanthone is more preferable, and isopropylthioxanthone is even more preferable.

In a case where the core of the microcapsule includes the sensitizer, the core may include one kind of the sensitizer or may include two or more kinds thereof.

In a case where the core of the microcapsule contains the sensitizer, a content of the sensitizer is preferably 0.1% by mass to 20% by mass, more preferably 0.2% by mass to 15% by mass, and even more preferably 0.3% by mass to 10% by mass, with respect to the total solid content of the microcapsule and the total amount of the dispersant.

(Photothermal Conversion Agent)

In the case where the core of the microcapsule contains the thermally polymerizable compound as a polymerizable compound (preferably a thermally polymerizable monomer), the core may contain at least one photothermal conversion agent.

The photothermal conversion agent is a compound which absorbs light such as infrared rays (that is, active energy rays) and generates heat so as to polymerize and cure the thermally polymerizable compound. As the photothermal conversion agent, a known compound can be used.

As the photothermal conversion agent, an infrared ray absorbent is preferable. Examples of the infrared ray absorbent include polymethylindolium, indocyanine green, a polymethine coloring agent, a croconium coloring agent, a cyanine coloring agent, a merocyanine coloring agent, a squarilium coloring agent, a chalcogenopyrylo arylidene coloring agent, a metal thiolate complex coloring agent, a bis(chalcogenopyrylo)polymethine coloring agent, an oxyindolizine coloring agent, a bisaminoallyl polymethine coloring agent, an indolizine coloring agent, a pyrylium coloring agent, a quinoid coloring agent, a quinone coloring agent, a phthalocyanine coloring agent, a naphthalocyanine coloring agent, an azo coloring agent, an azomethine coloring agent, carbon black, and the like.

In a case of manufacturing the microcapsule, the photothermal conversion agent is dissolved as an oil-phase component together with the components constituting the microcapsule, a water-phase component is added to and mixed with the oil-phase component so as to emulsify the obtained mixture, and therefore the photothermal conversion agent can be incorporated into the core of the microcapsule.

The photothermal conversion agent may be used alone or two or more kinds thereof may be used in combination.

The content of the photothermal conversion agent is preferably 0.1% by mass to 25% by mass, more preferably 0.5% by mass to 20% by mass, and even more preferably 1% by mass to 15% by mass, with respect to the total solid content of the microcapsule.

An internal content rate (% by mass) of the photothermal conversion agent and a method for measuring an internal content rate are based on an internal content rate of the photopolymerization initiator and a method for measuring an internal content rate.

(Thermal Curing Accelerator)

In the case where the core of the microcapsule contains the thermally polymerizable compound as a polymerizable compound (preferably a thermally polymerizable monomer), the core may contain at least one thermal curing accelerator.

The thermal curing accelerator is a compound that catalytically promotes the thermal curing reaction of the thermally polymerizable compound (preferably a thermally polymerizable monomer).

As the thermal curing accelerator, a known compound can be used. As the thermal curing accelerator, an acid or a base, and a compound that generates an acid or a base by heating are preferable, and examples thereof include a carboxylic acid, a sulfonic acid, a phosphoric acid, an aliphatic alcohol, phenol, aliphatic amine, aromatic amine, imidazole (for example, 2-methylimidazole), pyrazole, and the like.

In a case of manufacturing the microcapsule, the thermal curing accelerator is mixed with the components constituting the microcapsule and dissolved as an oil-phase, a water-phase is added to and mixed with the oil-phase so as to emulsify the obtained mixture, and therefore the thermal curing accelerator can be incorporated into the core of the microcapsule.

The thermal curing accelerator may be used alone, or two or more kinds thereof may be used in combination.

The content of the thermal curing accelerator is preferably 0.1% by mass to 25% by mass, more preferably 0.5% by mass to 20% by mass, and even more preferably 1% by mass to 15% by mass, with respect to the total solid content of the microcapsule.

An internal content rate (% by mass) of the thermal curing accelerator and a method for measuring an internal content rate are based on an internal content rate of the photopolymerization initiator and a method for measuring an internal content rate.

<Water>

The aqueous dispersion of the present disclosure contains water as a dispersion medium.

The content of water in the aqueous dispersion of the present disclosure is not particularly limited. However, the content of water with respect to the total amount of the aqueous dispersion is preferably 10% by mass to 99% by mass, more preferably 20% by mass to 95% by mass, even more preferably 30% by mass to 90% by mass, and particularly preferably 50% by mass to 90% by mass.

<Colorant>

The aqueous dispersion of the present disclosure may contain at least one kind of colorant.

In a case where the aqueous dispersion contains a colorant, it is preferable that the aqueous dispersion contains the colorant in the exterior of the microcapsule.

The colorant is not particularly limited and can be used by being arbitrarily selected from known colorants such as a pigment, a water-soluble dye, and a dispersed dye. It is more preferable that the aqueous dispersion contains a pigment among the above colorants, because the pigment has high weather fastness and excellent color reproducibility.

The pigment is not particularly limited and can be appropriately selected according to the purpose. Examples thereof include known organic pigments and inorganic pigments, resin particles stained with a dye, commercially available pigment dispersions, and surface-treated pigments (for example, those obtained by dispersing a pigment in water, a liquid compound, an insoluble resin, or the like as a dispersion medium and pigments of which the surface is treated with a resin, a pigment derivative, or the like).

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In addition, examples of the pigment include surface-treated pigments (those obtained by treating pigment surfaces with a dispersant such as a resin, a pigment derivative, and the like, and a self-dispersing pigment having a hydrophilic group on a particle surface, and the like). Furthermore, as the pigment, pigment dispersions on the market may be used.

Among these, as the pigment, a pigment of which a pigment surface is treated with a resin having a hydrophilic group, and a self-dispersing pigment having a hydrophilic group on a particle surface are preferably used. As the hydrophilic group, an anionic group (a carboxy group, a phosphoric acid group, a sulfo group, and the like) is preferable.

In the present specification, the term "self-dispersing pigment" refers to a pigment and the like which is obtained by, to a pigment surface, directly linking or indirectly bonding a plurality of hydrophilic functional groups and/or a salt thereof (hereinafter will also be referred to as "dispersibility imparting group") via an alkyl group, an alkyl ether group, an aryl group, and the like, and which exhibits at least one of water dispersibility or water solubility under absence of a dispersant for dispersing the pigment and the like so as to be able to maintain a dispersion state in the aqueous dispersion (for example, an ink).

For example, generally, an ink containing the self-dispersing pigment as a colorant does not necessarily contain a dispersant that is to be contained to disperse the pigment, and therefore is advantageous in that foaming caused by deterioration of an anti-foaming property due to the dispersant occurs less, leading to easy preparation of an ink having excellent jetting stability.

Examples of the dispersibility imparting group bonded to the surface of the self-dispersing pigment include —COOH, —CO, —OH, —SO$_3$H, —PO$_3$H$_2$, and quaternary ammonium, and salts thereof. In regard to the bonding of the dispersibility imparting group, the pigment subjected to a physical treatment or a chemical treatment so as to bond (graft) an active species having the dispersibility imparting group or the dispersibility imparting group to the pigment surface. Examples of the physical treatment include a vacuum plasma treatment and the like. Examples of the chemical treatment include a wet oxidation method in which the pigment surface is oxidized with an oxidizing agent in water, a method in which a carboxy group is bonded via a phenyl group by bonding p-aminobenzoic acid to the pigment surface, and the like.

Preferable examples of the self-dispersing pigment include a self-dispersing pigment which is surface-treated by oxidation treatment using a hypohalous acid and/or a salt of a hypohalous acid as an oxidizing agent or oxidation treatment using ozone as an oxidizing agent.

As the self-dispersing pigment, a commercially available product may be used.

Examples of the commercially available product of the self-dispersing pigment include MICROJET CW-1 (trade name; Orient Chemical Industries Co., Ltd.), CAB-O-JET (registered trademark) 200, CAB-O-JET (registered trademark) 300, and CAB-O-JET (registered trademark) 450C (trade name; Cabot Corporation), and the like.

In a case where a pigment is used as a colorant, a pigment dispersant may be used in a case of preparing pigment particles as necessary.

Regarding the colorant such as a pigment and the pigment dispersant, paragraphs "0180" to "0200" in JP2014-040529A can be referred to as appropriate.

<Other Components>

If necessary, the aqueous dispersion of the present disclosure may contain other components in addition to the components described above.

The other components may be contained in the interior of the microcapsule or may be contained in the exterior of the microcapsule.

(Organic Solvent)

The aqueous dispersion of the present disclosure may contain an organic solvent.

In a case where the aqueous dispersion of the present disclosure contains an organic solvent, the adhesiveness between the film and the substrate can be further improved.

In a case where the aqueous dispersion of the present disclosure contains the organic solvent, a content of the organic solvent is preferably 0.1% by mass to 10% by mass and more preferably 0.1% by mass to 5% by mass with respect to the total amount of the aqueous dispersion.

Specific examples of the organic solvent are as below.

Alcohols (for example, methanol, ethanol, propanol, isopropanol, butanol, isobutanol, sec-butanol, tert-butanol, pentanol, hexanol, cyclohexanol, benzyl alcohol, and the like)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methylpropanediol, and the like)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like)

Amines (for example, ethanolamine, diethanolamine, triethanolamine, N-methyldiethanolamine, N-ethyldiethanolamine, morpholine, N-ethylmorpholine, ethylenediamine, diethylenediamine, tri ethylenetetramine, tetraethylenepentamine, polyethyleneimine, pentamethyldiethylenetriamine, tetramethylpropylenediamine, and the like)

Amides (for example, formamide, N,N-dimethylformamide, N,N-dimethylacetamide, and the like)

Heterocyclic rings (for example, 2-pyrrolidone, N-methyl-2-pyrrolidone, cyclohexyl pyrrolidone, 2-oxazolidone, 1,3-dimethyl-2-imidazolidinone, γ-butyrolactone, and the like)

Sulfoxides (for example, dimethyl sulfoxide, and the like)

Sulfones (for example, sulfolane, and the like)

Others (urea, acetonitrile, acetone, and the like)

(Surfactant)

The aqueous dispersion of the present disclosure may contain at least one surfactant.

In a case where the aqueous dispersion of the present disclosure contains the surfactant, wettability of the aqueous dispersion to a substrate is improved.

The surfactant referred herein means a surfactant other than the "dispersant having at least one bond selected from a urethane bond or a urea bond and a hydrophilic group" described above.

Examples of the surfactant include a higher fatty acid salt, alkyl sulfate, alkyl ester sulfate, alkyl sulfonate, alkylbenzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, amine oxide, and the like.

Among these, as a surfactant, at least one kind of surfactant selected from alkyl sulfate, alkyl sulfonate, and alkylbenzene sulfonate is preferable, or alkyl sulfate is particularly preferable.

From the viewpoint of the dispersibility of the microcapsule, the surfactant is preferably alkyl sulfate having an alkyl chain length of 8 to 18, more preferably at least one kind of surfactant selected from sodium dodecyl sulfate (SDS, alkyl chain length: 12) or sodium cetyl sulfate (SCS, alkyl chain length: 16), and even more preferably sodium cetyl sulfate (SCS).

In addition, examples of surfactants other than the above-described surfactant include those described in JP1987-173463A (JP-S62-173463A) and JP1987-183457A (JP-S62-183457A). Examples of other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

In addition, examples of the surfactant include an organic fluoro compound.

The organic fluoro compound is preferably hydrophobic. Examples of the organic fluoro compound include a fluorine-based surfactant, an oil-like fluorine-based compound (for example, fluorine oil), a solid-like fluorine compound resin (for example tetrafluoroethylene resin), and those described in JP1982-9053B (JP-S57-9053B) (the eighth column to the seventeenth column) and JP1987-135826A (JP-S62-135826A).

The aqueous dispersion of the present disclosure contains the "dispersant having at least one bond selected from a urethane bond or a urea bond and a hydrophilic group" described above, and thus is capable of substantially not to contain the anionic surfactant (that is, an anionic surfactant other than the "dispersant having at least one bond selected from a urethane bond or a urea bond and a hydrophilic group").

The phrase "substantially not to contain" means that the content of the anionic surfactant is less than 1% by mass (preferably less than 0.1% by mass) with respect to the total amount of the aqueous dispersion.

The aspect in which the aqueous dispersion substantially does not contain the anionic surfactant is advantageous in that foaming of the aqueous dispersion can be suppressed, that that the water resistance of the coated film can be improved, that the whitening due to bleeding out after the coated film is formed can be suppressed, and the like. In addition, a case where a pigment dispersion having an anionic dispersing group is combined with the microcapsule dispersion liquid, is particularly advantageous in that an increase in an ion concentration in a system due to the anionic surfactant, leading to a decrease in a degree of ionization of the anionic pigment dispersant and thus a decrease in the dispersibility of the pigment, can be suppressed.

(Polymerization Inhibitor)

The aqueous dispersion of the present disclosure may contain a polymerization inhibitor.

In a case where the aqueous dispersion of the present disclosure contains a polymerization inhibitor, the storage stability of the aqueous dispersion can be further improved.

Examples of the polymerization inhibitor include p-methoxyphenol, quinones (for example, hydroquinone, benzoquinone, methoxybenzoquinone, and the like), phenothiazine, catechols, alkyl phenols (for example, dibutylhydroxytoluene (BHT) and the like), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2, 6,6-tetramethylpiperidin-1-oxyl (TEMPO), 2,2,6,6-tetramethyl-4-hydroxypiperidin-1-oxyl (TEMPOL), cupferron A1, a tris(N-nitroso-N-phenylhydroxylamine)aluminum salt, and the like.

Among these, at least one kind of compound selected from p-methoxyphenol, catechols, quinones, alkyl phenols, TEMPO, TEMPOL, cupferron A1, or a tris(N-nitroso-N-phenylhydroxylamine)aluminum salt is preferable, and at least one kind of compound selected from p-methoxyphenol, hydroquinone, benzoquinone, BHT, TEMPO, TEMPOL, cupferron A1, or a tris(N-nitroso-N-phenylhydroxylamine) aluminum salt is more preferable.

(Ultraviolet Absorber)

The aqueous dispersion of the present disclosure may contain an ultraviolet absorber.

In a case where the aqueous dispersion of the present disclosure contains an ultraviolet absorber, the weather fastness of the film can be further improved.

Examples of the ultraviolet absorber include known ultraviolet absorbers such as a benzotriazole-based compound, a benzophenone-based compound, a triazine-based compound, a benzoxazole-based compound, and the like.

In addition, the aqueous dispersion of the present disclosure may contain, in the exterior of the microcapsule, a photopolymerization initiator, a polymerizable compound, a water-soluble resin, a water-dispersible resin, or the like as necessary, from the viewpoint of controlling film properties, adhesiveness, and jetting properties.

The phrase "aqueous dispersion contains a photopolymerization initiator in the exterior of the microcapsule" means that the aqueous dispersion contains a photopolymerization initiator that is not contained in the interior of the microcapsule. The same applied to a case in which a polymerizable compound, a water-soluble resin, a water-dispersible resin, or the like is contained in the exterior of the microcapsule.

(Photopolymerization Initiator Capable of Being Contained in the Exterior of Microcapsule)

Examples of the photopolymerization initiator capable of being contained in the exterior of the microcapsule include the same photopolymerization initiator described above (photopolymerization initiator contained in the interior of the microcapsule). As the photopolymerization initiator capable of being contained in the exterior of the microcapsule, a water-soluble or water-dispersible photopolymerization initiator is preferable. From this viewpoint, preferable examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, and IRGACURE (registered trademark) 500 (all of which are manufactured by BASF SE), and the like.

The term "water-soluble" used for the photopolymerization initiator capable of being contained in the exterior of the microcapsule refers to a property in which in a case where the resin is dried for 2 hours at 105° C., the amount of the resin dissolving in 100 g of distilled water having a temperature of 25° C. is more than 1 g.

Furthermore, the term "water-dispersible" used for the photopolymerization initiator capable of being contained in the exterior of the microcapsule refers to a property in which the resin is water-insoluble but is dispersed in water. Herein, "water-insoluble" refers to a property in which in a case where the resin is dried for 2 hours at 105° C., the amount of the resin dissolving in 100 g of distilled water with a temperature of 25° C. is equal to or smaller than 1 g.

(Polymerizable Compound Capable of Being Contained in the Exterior of Microcapsule)

Examples of the polymerizable compound capable of being contained in the exterior of the microcapsule include radical polymerizable compounds such as a compound having an ethylenically unsaturated group, acrylonitrile, styrene, unsaturated polyester, unsaturated polyether, unsaturated polyamide, and unsaturated urethane.

Among these, as the polymerizable compound capable of being contained in the exterior of the microcapsule, a compound having an ethylenically unsaturated group is preferable, and a compound having a (meth)acryloyl group is particularly preferable. Furthermore, as the polymerizable compound capable of being contained in the exterior of the microcapsule, a water-soluble or a water-dispersible polymerizable compound is preferable.

The term "water-soluble" used for the water-soluble polymerizable compound has the same meaning as the term "water-soluble" used for the "water-soluble photopolymerization initiator" described above, and the term "water-dispersible" used for the water-dispersible polymerizable compound has the same meaning as the term "water-dispersible" used for the "water-dispersible photopolymerization initiator" described above.

From the viewpoint of the water solubility or the water dispersibility, as the aforementioned polymerizable compound, a compound having at least one kind of structure selected from the group consisting of an amide structure, a polyethylene glycol structure, a polypropylene glycol structure, a carboxy group, or a salt of a carboxy group is preferable.

From the viewpoint of the water solubility or the water dispersibility, as the polymerizable compound capable of being contained in the exterior of the microcapsules, for example, at least one kind of compound selected from (meth)acrylic acid, sodium (meth)acrylate, potassium (meth)acrylate, N,N-dimethylacrylamide, N,N-diethylacrylamide, morpholine acrylamide, N-2-hydroxyethyl (meth) acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethylene)methyl] acrylamide, diethylene glycol bis(3-acryloylaminopropyl) ether, polyethylene glycol di(meth)acrylate, polypropylene glycol di(meth)acrylate, compounds represented by General Formulas (a) to (d), or ethoxylated trimethylolpropane triacrylate (for example, SR9035 manufactured by Sartomer Arkema Inc.) is preferable, and at least one kind of compound selected from (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl] acrylamide, diethylene glycol bis(3-acryloylaminopropyl)ether, polyethylene glycol di(meth)acrylate, polypropylene glycol di(meth)acrylate, compounds represented by General Formulas (a) to (d), or ethoxylated trimethylolpropane triacrylate (for example, SR9035 manufactured by Sartomer Arkema Inc.) is more preferable.

General Formula (a)

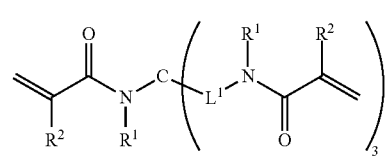

General Formula (b)

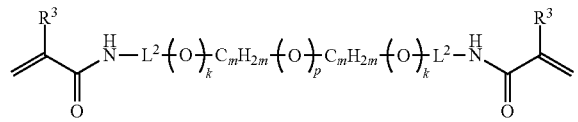

General Formula (c)

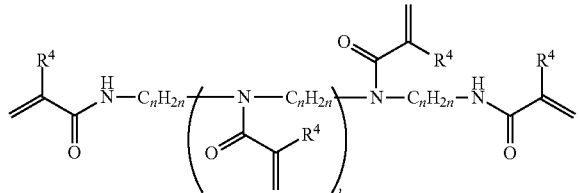

General Formula (d)

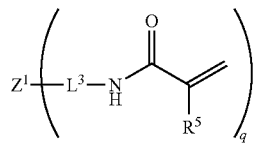

In General Formula (a), a plurality of $R^1$'s each independently represent a hydrogen atom, an alkyl group, an aryl group or a heterocyclic group, a plurality of $R^2$'s each independently represent a hydrogen atom or a methyl group, and a plurality of $L^1$'s each independently represent a single bond or a divalent linking group.

In General Formula (b), a plurality of $R^3$'s each independently represent a hydrogen atom or a methyl group, a plurality of $L^2$'s each independently represent an alkylene group having 1 to 8 carbon atoms, a plurality of k's and p each independently represent 0 or 1, and a plurality of m's each independently represent an integer from 0 to 8, provided that at least one of k's or p is 1.

In General Formula (c), a plurality of $R^4$'s each independently represent a hydrogen atom or a methyl group, a plurality of n's each independently represent an integer from 1 to 8, 1 represents an integer from 0 or 1.

In General Formula (d), $Z^1$ represents a residue obtained by removing q hydrogen atoms from the hydroxyl group of the polyol, q represents an integer from 3 to 6, a plurality of $R^5$'s each independently represent a hydrogen atom or a methyl group, and a plurality of $L^3$'s each independently represent an alkylene group having 1 to 8 carbon atoms.

Specific examples of the compounds represented by General Formula (a) to General Formula (d) include compounds represented by the following AM-1 to AM-4.

AM-1

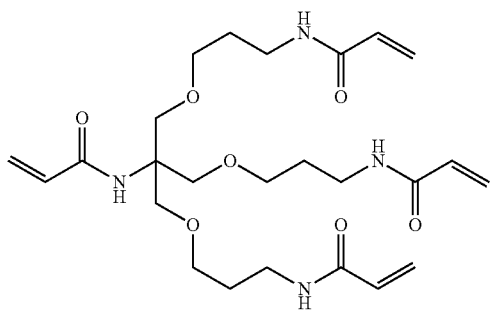

AM-2

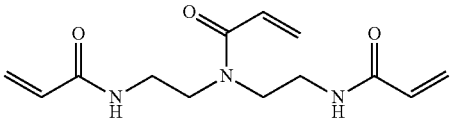

AM-3

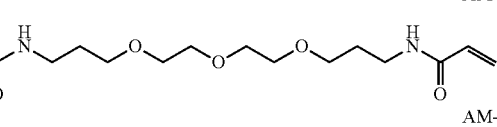

AM-4

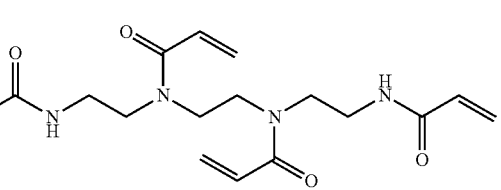

The above AM-1 to AM-4 can be synthesized by a method described in JP5591858B.

(Water-Soluble Resin or Water-Dispersible Resin Capable of Being Contained in the Exterior of Microcapsule)

A structure of the water-soluble resin or the water-dispersible resin capable of being contained in the exterior of the microcapsule is not particularly limited and may be an arbitrary structure. Examples of the structure of the water-soluble resin or the water-dispersible resin capable of being contained in the exterior of the microcapsule include structures such as a chain structure, a branched structure, a star structure, a cross-linked structure, and a network structure. The water-soluble resin or the water-dispersible resin capable of being contained in the exterior of the microcapsule is different from the dispersant of the present disclosure.

The term "water-soluble" used for the water-soluble resin capable of being contained in the exterior of the microcapsule has the same meaning as the term "water-soluble" used for the "photopolymerization initiator capable of being contained in the exterior of the microcapsule" described above, and the term "water-dispersible" used for the water-dispersible resin capable of being contained in the exterior of the microcapsule has the same meaning as the term "water-dispersible" used for the "photopolymerization initiator capable of being contained in the exterior of the microcapsule" described above.

In addition, the water-soluble resin or the water-dispersible resin is preferably a resin having a functional group selected from a carboxy group, a salt of a carboxy group, a sulfo group, a salt of a sulfo group, a sulfate group, a salt of a sulfate group, a phosphonic acid group, a salt of a phosphonic acid group, a phosphoric acid group, a salt of a phosphoric acid group, an ammonium base, a hydroxyl group, a carboxylic acid amide group, and an alkyleneoxy group.

As a countercation of the aforementioned salt, an alkali metal cation such as sodium or potassium, an alkali earth metal cation such as calcium or magnesium, an ammonium cation, or a phosphonium cation is preferable, and an alkali metal cation is particularly preferable.

As an alkyl group contained in the ammonium group of the ammonium base, a methyl group or an ethyl group is preferable.

As a counteranion of the ammonium base, a halogen anion such as chlorine or bromine, a sulfate anion, a nitrate anion, a phosphate anion, a sulfonate anion, a carboxylate anion, or a carbonate anion is preferable, and a halogen anion, a sulfonate anion, or a carboxylate anion is particularly preferable.

As a substituent on a nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain formed of repeating alkyleneoxy groups. The number of alkyleneoxy groups contained in the alkyleneoxy chain is preferably 2 or more, and particularly preferably 4 or more.

<Preferable Physical Properties of Aqueous Dispersion>

In a case where the temperature of the aqueous dispersion of the present disclosure is within a range of 25° C. to 50° C., the viscosity of the aqueous dispersion is preferably 3 mPa·s to 15 mPa·s, and more preferably 3 mPa·s to 13 mPa·s. Particularly, in a case where the temperature of the aqueous dispersion of the present disclosure is 25° C., the viscosity of the aqueous dispersion is preferably equal to or lower than 50 mPa·s. In a case where the viscosity of the aqueous dispersion is within the above range, and in a case of using the aqueous dispersion as an ink, higher jetting properties can be realized.

The viscosity of the aqueous dispersion is a value measured using a viscometer (VISCOMETER TV-22, manufactured by TOKI SANGYO CO., LTD).

[Method for Manufacturing Aqueous Dispersion]

The above-described method for manufacturing an aqueous dispersion of the present disclosure is not particularly limited, and as shown below, the method for manufacturing an aqueous dispersion of the present embodiment is suitable.

That is, the method for manufacturing the aqueous dispersion of the present embodiment (hereinafter, will also be referred to as "the manufacture method of the present embodiment") includes a microcapsule-forming step of mixing an oil-phase component containing an organic solvent, the above-described dispersant (that is, the dispersant having at least one bond selected from a urethane bond or a urea bond and a hydrophilic group), a tri- or higher functional isocyanate compound, and at least one of an isocyanate compound into which a polymerizable group is introduced or a polymerizable compound, with a water-phase component containing water, followed by emulsification, so as to form the above-described microcapsule.

The oil-phase component used in the microcapsule-forming step contains an organic solvent, the dispersant, a tri- or higher functional isocyanate compound, and at least one of an isocyanate compound into which a polymerizable group is introduced or a polymerizable compound.

As described above, the polymerizable compound is a compound having the polymerizable group (excluding an isocyanate compound into which the polymerizable group is introduced).

All of the polymerizable group in the isocyanate compound into which the polymerizable group is introduced, and the polymerizable group in the polymerizable compound may be the photopolymerizable groups (for example, radical polymerizable groups), or may be the thermally polymerizable groups.

The oil-phase component preferably contains at least one of the isocyanate compound into which the photopolymerizable group (for example, the radical polymerizable group) is introduced, or the photopolymerizable compound (for example, the radical polymerizable compound), or contains at least one of the isocyanate compound into which the thermally polymerizable group is introduced, or the thermally polymerizable compound.

In the case where the oil-phase component preferably contains at least one of the isocyanate compound into which the photopolymerizable group (for example, the radical polymerizable group) is introduced, or the photopolymerizable compound (for example, the radical polymerizable compound), the oil-phase component preferably further contains the photopolymerization initiator.

The water-phase component used in the microcapsule-forming step contains water.

In the microcapsule-forming step, the oil-phase component is mixed with the water-phase component, the obtained mixture is emulsified, and therefore the microcapsule in which the shell having the three-dimensional cross-linked structure is formed is formed so as to surround the core. Therefore, the microcapsule containing the shell and the core is formed. The formed microcapsule functions as a dispersoid in the manufactured aqueous dispersion.

Water in the water-phase component functions as a dispersion medium in the aqueous dispersion.

The dispersant in the oil-phase component interacts with the shell of the formed microcapsule, thereby contributing to the dispersion of the microcapsules (dispersoid) to water (dispersion medium).

In more detail regarding the formation of the shell, the shell having the three-dimensional cross-linked structure containing a urea bond is formed by a reaction between a tri- or higher functional isocyanate compound and water.

A case in which the tri- or higher functional isocyanate compound has a urethane bond means that a urethane bond is also contained in the three-dimensional cross-linked structure of the shell.

In addition, in a case where at least one of the oil-phase component or the water-phase component contains the above-described compound having two or more active hydrogen groups, the shell having the three-dimensional cross-linked structure containing a urethane bond is formed by a reaction between a tri- or higher functional isocyanate compound and the compound having two or more active hydrogen groups.

Furthermore, in a case where the oil-phase component contains the isocyanate compound into which the polymerizable group is introduced, the isocyanate compound into which the polymerizable group is introduced also relates to the reaction for forming the shell, and therefore the polymerizable group is introduced into the shell (that is, the shell having the polymerizable group is formed).

Furthermore, the case where the oil-phase component contains the polymerizable compound, means that the polymerizable compound is contained in the core.

Examples of the organic solvent contained in the oil-phase component include ethyl acetate, methyl ethyl ketone, and the like.

It is preferable that at least some of the organic solvent is removed during the formation process of the microcapsule or after the formation of the microcapsule.

Preferable aspects of each component of the dispersant, the tri- or higher functional isocyanate compound, and the like contained in the oil-phase component are as described in the above section of the "Aqueous Dispersion".

The components contained in the oil-phase component need to be simply mixed together. All of the components may be mixed together at the same time, or the components may be mixed together by being divided into several groups.

The oil-phase component may contain each component described in the section of the "Aqueous Dispersion".

For examples, the oil-phase component may contain the photopolymerization initiator. Therefore, the photopolymerization initiator can be contained in the core of the microcapsule.

In addition, the oil-phase component may contain the sensitizer. Therefore, the sensitizer can be contained in the core of the microcapsule.

Furthermore, the oil-phase component may contain the above-described compound having the hydrophilic group (preferably, the above-described isocyanate compound into which the hydrophilic group is introduced). Therefore, the hydrophilic group can be introduced into the shell of the microcapsule.

The water-phase component is not particularly limited as long as water is contained therein and may be only water.

The water-phase component may contain the surfactant. The term "surfactant" referred herein does not include the above-described dispersant.

Examples of the surfactant include a surfactant having a relatively long-chain hydrophobic group.

For example, as the surfactant, the surfactants described in "Surfactant Handbook" (Ichiro Nishi et al., published from Sangyo Tosho Publishing Co., Ltd. (1980)), specifically, an alkali metal salt such as alkyl sulfate, alkyl sulfonate, or alkyl benzene sulfonic acid is preferable, and an alkyl sulfate salt is more preferable. From the viewpoint of the dispersion stability, the alkyl chain length (that is, the number of carbon atoms in the alkyl chain) of the alkyl sulfate salt is preferably equal to or more than 12, and more preferably equal to or more than 16.

The dispersant contained in the present embodiment, and therefore an aspect in which the water-phase component substantially does not contain the surfactant may be adopted.

The phrase "water-phase component substantially does not contain the surfactant" means that the content of the surfactant is less than 1% by mass (preferably less than 0.1% by mass) with respect to the total amount of the water-phase component.

The advantage of the aspect in which the water-phase component substantially does not contain the surfactant is the same as the advantage of the above—described aspect in which the aqueous dispersion substantially does not contain the anionic surfactant.

In addition, in the manufacture method of the present embodiment, a total amount obtained by subtracting an amount of the organic solvent and the water from an amount of the oil-phase component and the water-phase component, corresponds to a total solid content of the microcapsule and the total amount of the dispersant in the manufactured aqueous dispersion.

In regard to a preferable range of an amount used of each component of the tri- or higher functional isocyanate compound and the like, which are used in the manufacture method of the present embodiment, it is possible to refer to the section of "Aqueous Dispersion" described above. In a case of referring to this section, the term "content" and the term "total solid content of the microcapsule and the total amount of the dispersant" in the section of "Aqueous Dispersion" described above are replaceable with the term "amount used" and the term "total amount obtained by subtracting an amount of the organic solvent and the water from an amount of the oil-phase component and the water-phase component", respectively.

For example, the description that "the content of the internal photopolymerization initiator with respect to the total solid content of the microcapsule and the total amount of the dispersant is preferably 0.1% by mass to 25% by mass, more preferably 0.5% by mass to 20% by mass, and even more preferably 1% by mass to 15% by mass." in the section of "Aqueous Dispersion" described above, is replaceable with, in the manufacturing method of the present embodiment, the description that "an amount used of the internal photopolymerization initiator is preferably 0.1% by mass to 25% by mass, more preferably 0.5% by mass to 20% by mass, and even more preferably 1% by mass to 15% by mass with respect to the total amount obtained by subtracting an amount of the organic solvent and the water from an amount of the oil-phase component and the water-phase component."

In the microcapsule-forming step, a method for mixing the oil-phase component with the water-phase component is not particularly limited, and examples thereof include mixing by stirring.

In the microcapsule-forming step, a method for emulsifying is not particularly limited, and examples thereof include emulsification by an emulsification device (for example, a disperser) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

The emulsification during the microcapsule-forming step may be carried out while heating.

By carrying out the emulsification while heating, the reaction for forming the microcapsule by the emulsification can further effectively proceed.

In addition, by carrying out the emulsification while heating, at least some of the organic solvent in the oil-phase component can be easily removed from the mixture.

The heating temperature in the case of carrying out the emulsification while heating is preferably 35° C. to 70° C. and more preferably 40° C. to 60° C.

In addition, the microcapsule-forming step may have an emulsification stage of emulsifying a mixture (at a temperature of lower than 35° C., for example), and a heating stage of heating the emulsion obtained in the emulsification stage (at a temperature of 35° C. or higher, for example).

In the aspect of including the emulsification stage and the heating stage, particularly in the heating stage, the reaction for forming the microcapsule can further effectively proceed.

In addition, in the aspect of including the emulsification stage and the heating stage, particularly in the heating stage, at least some of the organic solvent in the oil-phase component can be easily removed from the mixture.

The heating temperature in the heating stage is preferably 35° C. to 70° C. and more preferably 40° C. to 60° C.

The heating time in the heating step is preferably 6 hours to 50 hours, more preferably 12 hours to 40 hours, and even more preferably 15 hours to 35 hours.

In addition, the manufacture method of the present embodiment may include steps other than the microcapsule-forming step as necessary.

Examples of those other steps include a step of adding other components (pigment and the like) to the aqueous dispersion in the microcapsule-forming step.

Those other components (pigment and the like) to be added are as described above as other components that can be contained in the aqueous dispersion.

[Image Forming Method]

The image forming method of the present embodiment includes an application step of applying the aqueous dispersion of the present disclosure described above to the recording medium, and a curing step of curing the aqueous dispersion applied to the recording medium.

If necessary, the image forming method of the present embodiment may include other steps.

According to the image forming method of the present embodiment, an image having excellent hardness is formed on the recording medium. The image also exhibits excellent adhesiveness with respect to a recording medium.

In addition, in the image forming method of the present embodiment, the jetting properties of the aqueous dispersion from an ink jet head is excellent, and the storage stability of the aqueous dispersion is excellent.

(Application Step)

The application step is a step of applying the aqueous dispersion of the present disclosure to a recording medium.

As the aspect in which the aqueous dispersion is applied to the recording medium, an aspect is particularly preferable in which the aqueous dispersion (that is, an ink jet ink) is applied to the recording medium by an ink jet method by using the aqueous dispersion as the ink jet ink.

As the recording medium, it is possible to use the substrate exemplified above as "substrate for forming a film by using the aqueous dispersion of the present disclosure".

The application of the aqueous dispersion by an ink jet method can be performed using a known ink jet recording device.

The ink jet recording device is not particularly limited, and a known ink jet recording device that can achieve intended resolution can be appropriately selected and used. That is, any of known ink jet recording devices including commercially available products can jet the aqueous dispersion to a recording medium in the image forming method.

Examples of the ink jet recording device include a device including an ink supply system, a temperature sensor, and heating means.

The ink supply system includes, for example, a base tank containing the ink jet ink as the aqueous dispersion of the present disclosure, supply piping, an ink supply tank disposed immediately before an ink jet head, a filter, and a piezo-type ink jet head. The piezo-type ink jet head can be driven such that it can jet multi-sized dots preferably having a size of 1 pl to 100 pl and more preferably having a size of 8 pl to 30 pl, preferably at a resolution of 320 dots per inch (dpi)×320 dpi to 4,000 dpi×4,000 dots per inch (dpi), more preferably at a resolution of 400 dpi×400 dpi to 1,600 dpi×1,600 dpi, and even more preferably at a resolution of 720 dpi×720 dpi. dpi represents the number of dots per 2.54 cm (1 inch).

(Curing Step)

The curing step is a step of curing the aqueous dispersion applied to the recording medium.

By the curing step, the cross-linking reaction between the microcapsules in the aqueous dispersion proceeds, the image is fixed, and hence the film hardness of the image and the like can be improved.

As the curing step, a step of curing the aqueous dispersion by radiating active energy rays (light) thereto (hereinafter, "curing step A") is preferable in a case where the aqueous dispersion contains the photopolymerizable compound (and preferably the photopolymerization initiator), and a step of curing the aqueous dispersion by radiating heat or infrared rays thereto (hereinafter, "curing step B") is preferable in a case where the aqueous dispersion contains the thermally polymerizable compound as a curing component.

(Curing Step A)

The curing step A is a step of irradiating the aqueous dispersion applied to the recording medium with active energy rays so as to cure the aqueous dispersion.

In the curing step A, by irradiating the aqueous dispersion applied to the recording medium with active energy rays, the cross-linking reaction between the microcapsules in the aqueous dispersion proceeds, the image is fixed, and hence the film hardness of the image and the like can be improved.

Examples of the active energy rays that can be used in the curing step A include ultraviolet rays (UV light), visible rays, electron beams, and the like. Among these, UV light is preferable.

The peak wavelength of the active energy rays (light) is preferably 200 nm to 405 nm, more preferably 220 nm to 390 nm, and even more preferably 220 nm to 385 nm.

Furthermore, the peak wavelength is preferably 200 nm to 310 nm or 200 nm to 280 nm.

At the time of the irradiation of the active energy rays (light), the illuminance of the exposure surface is 10 mW/cm$^2$ to 2,000 mW/cm$^2$ for example, and preferably 20 mW/cm$^2$ to 1,000 mW/cm$^2$.

As the source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting device.

Among the semiconductor ultraviolet light-emitting devices, a light emitting diode (LED) and a laser diode (LD) are expected to be good light sources because they are compact, have long service life and high efficiency, and incur low costs.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where a sensitizer and a photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having wavelength of 355 nm, 365 nm, 385 nm, 395 nm, or 405 nm is most preferable.

In the curing step A, the time for which the aqueous dispersion applied to the recording medium is irradiated with the active energy rays is 0.01 seconds to 120 seconds for example, and preferably 0.1 seconds to 90 seconds.

As the irradiation conditions and the basic irradiation method, the irradiation conditions and the irradiation method disclosed in JP1985-132767A (JP-S60-132767A) can also be applied.

Specifically, as the irradiation method of the active energy rays, a method, in which a light source is provided on both sides of a head unit including an ink jet device and the head unit as well as the light source are scanned by a so-called shuttle method, or a method, in which the irradiation of the active energy rays is performed by a separate light source that is not driven, is preferable.

It is preferable that the irradiation of the active energy rays is performed at a certain time interval (for example, 0.01 seconds to 120 seconds and preferably 0.01 seconds to 60 seconds) after the aqueous dispersion lands and is dried by heating.

(Curing Step B)

The curing step B is a step of heating or irradiating the aqueous dispersion applied to the recording medium with infrared rays so as to cure the aqueous dispersion.

By radiating heat or infrared rays to the aqueous dispersion applied to the recording medium so as to curing the same, the cross-linking reaction of the thermally polymerizable group in the microcapsules in the aqueous dispersion proceeds, the image is fixed, and hence the film hardness of the image and the like can be improved.

As heating means for carrying out the heating is not particularly limited, and examples thereof include a heat drum, hot air, an infrared lamp, an infrared LED, an infrared heater, a heat oven, a heat plate, an infrared laser, an infrared dryer, and the like. Among these, from the viewpoint of being able to thermally curing the aqueous dispersion efficiently, a light emitting diode (LED) having an emission wavelength in near infrared rays to far infrared rays, which has a maximum absorption wavelength in a wavelength range of 0.8 µm to 1.5 µm or 2.0 µm to 3.5 µm, a heater radiating near infrared rays to far infrared rays, a laser having an oscillation wavelength in near infrared rays to far infrared rays, or a dryer radiating near infrared rays to far infrared rays is preferable.

The heating temperature in a case of heating is preferably 40° C. or higher, more preferably 40° C. to 200° C., and even more preferably 100° C. to 180° C. The heating temperature refers to a temperature of the aqueous dispersion on the recording medium and can be measured by a thermograph using an infrared thermographic apparatus H2640 (manufactured by Nippon Avionics Co., Ltd.).

The heating time can be appropriately set in consideration of the heating temperature, the compositions of the aqueous dispersion, a printing rate, and the like.

In addition, the curing step B for taking charge of thermally curing the aqueous dispersion applied to the recording medium may have a heating and drying step in combination, which will be described below.

(Heating and Drying step)

If necessary, the image forming method may additionally include a heating and drying step between the application step and the curing step.

In the heating and drying step, it is preferable that water and an organic solvent that is used in combination if necessary, are evaporated from the aqueous dispersion jetted to the recording medium by using heating means, such that the image is fixed.

The heating means only needs to be able to dry water and the organic solvent which is used in combination if necessary. The heating means is not particularly limited, and examples thereof include a heat drum, hot air, an infrared lamp, a heating oven, heating by a heat plate, and the like.

The heating temperature is preferably equal to or higher than 40° C., more preferably about 40° C. to 150° C., and even more preferably about 40° C. to 80° C.

The heating time can be appropriately set in consideration of the composition of the aqueous dispersion and the printing rate.

If necessary, the aqueous dispersion fixed by heating is further optically fixed by being irradiated with the active energy rays in the curing step.

EXAMPLES

Hereinafter, the present invention will be more specifically described based on examples, but the present invention is not limited to the following examples. Hereinafter, unless otherwise specified, "part" represents parts by mass.

[Synthesize of Dispersant]

The synthesize of the following dispersant having at least one bond selected from a urethane bond or a urea bond and a hydrophilic group was carried out.

Dispersants A-1, A-4, A-5, A-8, A-11, A-12, A-17, and A-23 are specific examples of the compound represented by Formula (A), Dispersant B-3 is a specific example of the compound represented by Formula (B), Dispersant C-3 is a specific example of the compound represented by Formula (C), and Dispersant D-2 is a specific example of the compound represented by Formula (D).

| Dispersant | Structure | $R^{A1}$ | $Y^{A1}-Z^{A1}, Y^{A2}-Z^{A2}$ |
|---|---|---|---|
| A-1 | | | |
| A-4 | | | n = 12 |
| A-5 | | | n = 4 |
| A-8 | | | |

-continued

| Dispersant | Structure | $R^{A1}$ | $Y^{A1}-Z^{A1}, Y^{A2}-Z^{A2}$ |
|---|---|---|---|
| A-11 | | | 4-hydroxycarbonyl phenoxy group (HOOC-C6H4-O-*) |
| A-12 | | | dibutylamino group ((C4H9)2N-*) |
| A-17 | | | oleylamino group (NH-* with C18 chain containing double bond) |
| A-23 | $Z^{A2}-Y^{A2}-\overset{O}{\underset{H}{C}}-N\underset{H}{-}R^{A1}\left(\underset{H}{N}-\overset{O}{C}-O-CH_2-\underset{COOH}{\overset{CH_3}{C}}-CH_2-O-\overset{O}{C}-N\underset{H}{-}R^{A1}\right)_{nA}\underset{H}{N}-\overset{O}{C}-Y^{A1}-Z^{A1}$ | isophorone (trimethylcyclohexyl) | dodecyloxy group (C12H25-O-*) |

| Dispersant | Structure | $R^{B1}$ | $Y^{B1}-Z^{B1}, Y^{B2}-Z^{B2}$ |
|---|---|---|---|
| B-3 | $Z^{B2}-Y^{B2}-\overset{O}{\underset{H}{C}}-N\underset{H}{-}R^{B1}\left(\underset{H}{N}-\overset{O}{C}-O-\text{(5-carboxy-1,3-phenylene)}-O-\overset{O}{C}-N\underset{H}{-}R^{B1}\right)_{nB}\underset{H}{N}-\overset{O}{C}-Y^{B1}-Z^{B1}$ | isophorone | butoxy group (C4H9-O-*) |

| Dispersant | Structure | $R^{C1}$ | $Y^{C1}-Z^{C1}, Y^{C2}-Z^{C2}$ |
|---|---|---|---|
| C-3 | $\underset{Z^{C4}}{Z^{C2}-Y^{C2}}-\overset{O}{\underset{H}{C}}-N\underset{H}{-}R^{C2}\left(\underset{H}{N}-\overset{O}{C}-NH-\text{(lysine residue, COOH)}-HN-\overset{O}{C}-N\underset{H}{-}R^{C1}\right)_{nC}\underset{H}{N}-\overset{O}{C}-Y^{C1}-\underset{Z^{C2}}{Z^{C1}}$ | isophorone | oleyloxy group |

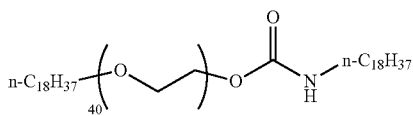
D-2

<Synthesize of Dispersant A-1>

30 g of 2,2-bis(hydroxymethyl)butyric acid (hereinafter, will also be referred to as "DMBA"), 67.51 g of isophorone diisocyanate (hereinafter will also be referred to as "IPDI"), and 97.51 g of ethyl acetate were added to a three-neck flask, and the obtained mixture was heated to 70° C., and then 0.242 g of NEOSTANN U-600 (inorganic bismuth catalyst, manufactured by NITTO KASEI CO., LTD., hereinafter will also be referred to as "U-600") was added thereto and stirred at 70° C. for 3 hours.

To the mixture after stirring, 23.51 g of 2-hydroxyethyl acrylate (hereinafter, will also be referred to as "HEA"), 0.002 g of 2-tert-butyl-1,4-benzoquinone (hereinafter, will also be referred to as "t-Bu benzoquinone"), and 23.51 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-1 was obtained.

Ethyl acetate was distilled off from the obtained solution of Dispersant A-1, and Fourier transform infrared spectroscopy (FT-IR) measurement using KBr was carried out, and it was confirmed that the isocyanate peak at 2260 cm$^{-1}$ was completely eliminated.

The same confirmation was carried out with respect to the synthesis of Dispersant A-4 and the following dispersants.

<Synthesize of Dispersant A-4>

DMBA 15 g, IPDI 33.76 g, and ethyl acetate 48.76 g were added to a three-neck flask, and the obtained mixture was heated to 70° C., and then 0.209 g of U-600 was added thereto and stirred at 70° C. for 3 hours.

To the mixture after stirring, 55.68 g of polyethylene glycol monomethyl ether (number of repetitions of ethyleneoxy units n=12) and 55.68 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-4 was obtained.

<Synthesize of Dispersant A-5>

DMBA 21 g, IPDI 47.26 g, and ethyl acetate 68.26 g were added to a three-neck flask, and the obtained mixture was heated to 70° C., and then 0.233 g of U-600 was added thereto and stirred at 70° C. for 3 hours.

To the mixture after stirring, 48.19 g of polypropylene glycol monobutyl ether (number of repetitions of propyleneoxy units n=4) and 48.19 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-5 was obtained.

<Synthesize of Dispersant A-8>

DMBA 30 g, IPDI 67.51 g, and ethyl acetate 97.51 g were added to a three-neck flask, and the obtained mixture was heated to 70° C., and then 0.225 g of U-600 was added thereto and stirred at 70° C. for 3 hours.

To the mixture after stirring, 15.01 g of 1-butanol and 15.01 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-8 was obtained.

<Synthesize of Dispersant A-11>

DMBA 30 g, IPDI 67.51 g, and ethyl acetate 97.51 g were added to a three-neck flask, and the obtained mixture was heated to 70° C., and then 0.248 g of U-600 was added thereto and stirred at 70° C. for 3 hours.

To the mixture after stirring, 26.35 g of 4-hydroxybenzoic acid and 26.35 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-11 was obtained.

<Synthesize of Dispersant A-12>

DMBA 30 g, IPDI 67.51 g, and ethyl acetate 97.51 g were added to a three-neck flask, and the obtained mixture was heated to 70° C., and then 0.247 g of U-600 was added thereto and stirred at 70° C. for 3 hours.

To the mixture after stirring, 26.17 g of dibutylamine and 26.17 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-12 was obtained.

<Synthesize of Dispersant A-17>

DMBA 30 g, IPDI 67.51 g, and ethyl acetate 97.51 g were added to a three-neck flask, and the obtained mixture was heated to 70° C., and then 0.303 g of U-600 was added thereto and stirred at 70° C. for 3 hours.

To the mixture after stirring, 54.16 g of oleylamine and 54.16 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-17 was obtained.

<Synthesize of Dispersant A-23>2,2-bis(hydroxymethyl) propionic acid (DMPA) 30 g, IPDI 74.57 g, and ethyl acetate 104.57 g were added to a three-neck flask, and the obtained mixture was heated to 70° C., and then 0.292 g of U-600 was added thereto and stirred at 70° C. for 3 hours.

To the mixture after stirring, 41.68 g of 1-dodecanol and 41.68 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant A-23 was obtained.

<Synthesize of Dispersant B-3>3,5-dihydroxybenzoic acid 30 g, IPDI 64.90 g, and ethyl acetate 94.90 g were added to a three-neck flask, and the obtained mixture was heated to 70° C., and then 0.219 g of U-600 was added thereto and stirred at 70° C. for 3 hours.

To the mixture after stirring, 14.43 g of 1-butanol and 14.43 g of ethyl acetate were further added, the mixture was then reacted by heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant B-3 was obtained.

<Synthesize of Dispersant C-3>

IPDI 30.41 g, ethyl acetate 40.41 g, and U-600 0.154 g were added to a three-neck flask, and the temperature of the obtained mixture was adjusted to 0° C. 10 g of lysine was slowly added thereto, and the mixture was stirred at 0° C. for 3 hours. The mixture was then warmed to room temperature and further stirred for 2 hours. Subsequently, 36.73 g of oleyl alcohol and 36.73 g of ethyl acetate were added thereto, and the mixture was then reacted by heating the mixture to 70° C. and heating at 70° C. for 24 hours.

After completion of the reaction, the reactant was allowed to cool to room temperature, and then the concentration thereof was adjusted with ethyl acetate, and therefore a 50% by mass ethyl acetate solution of Dispersant C-3 was obtained.

<Synthesize of Dispersant D-2>100 g of polyethylene glycol octadecyl ether (number of repetitions of ethyleneoxy units n=40), 12.85 g of octadecyl isocyanate, and 112.85 g of ethyl acetate were added to a three-neck flask, and the obtained mixture was heated to 70° C. 0.242 g of U-600 was added thereto, the mixture was then reacted by stirring at 70° C. for 24 hours.

After completion of the reaction, the reactant was allowed to cool to room temperature, and then the concentration thereof was adjusted with ethyl acetate, and therefore a 50% by mass ethyl acetate solution of Dispersant D-2 was obtained.

A weight-average molecular weight (Mw), a value (a) (mmol/g), and a value (U) (mmol/g) of the dispersant synthesized as above are shown in Table 4, respectively.

Mw is a measurement value, and the value (U) is the calculation value.

In Table 4, the weight-average molecular weight (Mw) is simply described as "molecular weight".

It was estimated that from the molecular weight of each dispersant, nA in Formula (A) is about 6 for Dispersant A-1, about 6 for Dispersant A-4, about 6 for Dispersant A-5, about 6 for Dispersant A-8, about 6 for Dispersant A-11, about 6 for Dispersant A-12, about 6 for Dispersant A-17, and about 6 for Dispersant A-23.

In addition, nB in Formula (B) was estimated to be about 6 for Dispersant B-3. In addition, nC in Formula (C) was estimated to be about 6 for Dispersant C-3.

In addition, the value (a) (mmol/g) is the millimolar number of the anionic group contained in 1 g of the dispersant, and in detail, is a value obtained by neutralization titration as follows.

—Measurement of Neutralization Titration of Dispersant Value (a) (mmol/g)—

Approximately 0.5 g of the dispersant was weighed in a container and weighed value W (g) was recorded. Subsequently, a mix solution of 54 mL of tetrahydrofuran (THF) and 6 mL of distilled water was added thereto, and the weighed dispersant was diluted so as to obtain a sample for measurement of value (a).

Titration was performed on the obtained sample for measurement of value (a) by using 0.1 N (=0.1 mol/L) aqueous solution of sodium hydroxide as a titrant, and a titrant volume required up to the equivalent point was recorded as F (mL). In a case where a plurality of equivalent points were obtained in the titration, a maximum value among a plurality of titrant volumes required up to a plurality of equivalent points was taken as F (mL). The product of F (mL) and the normality of the aqueous solution of sodium hydroxide (0.1 mol/L) corresponds to the millimolar number of the anionic group (for example, —COOH) contained in the dispersant.

Based on the measurement value of F1 (mL), the value (a) (mmol/g) of the dispersant was determined according to the following equation.

Value (a) of dispersant (mmol/g)=$F$ (mL)×normality of aqueous solution of sodium hydroxide (0.1 mol/L)/$W$ (g)

Example 1

<Manufacture of Aqueous Dispersion Having Microcapsule>

(Preparation of Oil-Phase Component)

44 g of an oil-phase component having a concentration of solid contents of 36% by mass was prepared by using a total solid content shown in the following "Composition of Total Solid Content of Oil-Phase Component" and ethyl acetate as an organic solvent.

The composition of the total solid content (a total of 100% by mass) of the oil-phase component is as follows.

In this oil-phase component, a mass ratio of the dispersant (hereinafter, will also be referred to as "mass ratio [dispersant/MC solid content]") was 0.100 (calculation formula: 9.1% by mass/90.9% by mass=0.100) with respect to the total solid content of the microcapsules (hereinafter, will also be referred to as "MC solid content").

—Composition of Total Solid Content of Oil-Phase Component (Total of 100% by Mass)—

| | |
|---|---|
| Dispersant A-1 (dispersant) | 9.1% by mass |
| Solid content of TAKENATE (registered trademark) D-120N of Mitsui Chemicals, Inc. (trifunctional isocyanate compound) (raw material of shell) | 43.9% by mass |
| SR-833S manufactured by Sartomer Arkema Inc. (tricyclodecanedimethanol diacrylate; difunctional polymerizable monomer) (core) | 26.4% by mass |
| SR-399E manufactured by Sartomer Arkema Inc. (dipentaerythritol pentaacrylate; pentafunctional polymerizable monomer) (core) | 17.6% by mass |
| IRGACURE (registered trademark) 819 manufactured by BASF SE (bis(2,4,6-trimethylbenzoyl)-phenylphosphine oxide; photopolymerization initiator) (core) | 3% by mass |

(Preparation of Water-Phase Component)

As the water-phase component, sodium hydroxide was added to 45 g of distilled water by an amount such that a degree of neutralization of the dispersant became 90%.

The specific amount of sodium hydroxide was determined by the following calculation formula.

Amount (g) of sodium hydroxide=total amount of oil-phase component (g)×(concentration of solid contents of oil-phase component (% by mass)/100)×(content of dispersant with respect to total solid content of oil-phase component (% by mass)/100)×value (a) of dispersant (mmol/g)× 0.9×molecular weight of sodium hydroxide (g/mol)/1000

(Microcapsule-Forming Step)

The oil-phase component was mixed with the water-phase component, the obtained mixture was emulsified at room temperature (25° C., the same applies hereinafter) for 10 minutes at 12,000 rpm by using a homogenizer, and therefore an emulsion was obtained.

The obtained emulsion was added to 25 g of distilled water, and the obtained liquid was stirred at room temperature for 30 minutes. Subsequently, the liquid was heated to 50° C. and stirred for 3 hours at 50° C. so as to distill off ethyl acetate from the liquid. The liquid in which the ethyl acetate was distilled off was further stirred at 50° C. for 24 hours, and therefore a microcapsule was formed in the liquid.

Subsequently, the liquid containing microcapsules was diluted with distilled water so that the solid content (that is, a total amount of the solid content of microcapsule and the content of dispersant) became 20% by mass, and therefore an aqueous dispersion having the microcapsule was obtained.

<Manufacture of Ink Jet Ink>

Each of the components shown in the following composition were mixed so as to prepare an ink jet ink.

The manufactured ink jet ink is also one aspect of the aqueous dispersion having the microcapsule. In the present example, the ink jet ink manufactured herein is referred to as "ink" so as to be distinguished from the aqueous dispersion having the microcapsule which was manufactured above (that is, one of the raw materials of the ink manufactured herein).

—Composition of Ink—

| | |
|---|---|
| Aqueous dispersion having the microcapsule | 82 parts |
| Pigment dispersion liquid (Pro-jet Cyan APD1000 (FUJIFILM Imaging Colorants, Inc), pigment concentration: 14% by mass) | 13 parts |
| Fluorine-based surfactant (manufactured by DuPont, Capstone FS-31, solid content: 25% by mass) | 0.3 parts |
| 2-Methylpropanediol | 4.7 parts |

<Evaluation>

The following evaluation was carried out using the ink obtained above.

The results are shown in Table 4.

(Pencil Hardness of Cured Film)

By applying the ink on a substrate, a coated film having a thickness of 12 μm was formed on the substrate. A polystyrene (PS) sheet ("falcon hi impact polystyrene" manufactured by Robert Horne Company) was used as the substrate.

In addition, a No. 2 bar of K HAND COATER manufactured by RK PrintCoat Instruments Ltd was for the application.

Subsequently, the obtained coated film was dried at 60° C. for 3 minutes.

Subsequently, the coated film after the drying was irradiated with ultraviolet rays (UV) so as to cure the coated film, and therefore a cured film was obtained.

For the irradiation with ultraviolet rays (UV), as an exposure light source, an experimental UV mini conveyor device CSOT (manufactured by Yuasa Power Supply Ltd.) was used which was equipped with an ozoneless metal halide lamp MAN 250L and in which a conveyor speed was set to be 35 m/min and an exposure intensity was set to be 2.0 W/cm$^2$.

With respect to the cured film, the pencil hardness was measured based on JIS K5600-5-4 (1999).

As a pencil used for the measurement of the pencil hardness, UNI (registered trademark) manufactured by MITSUBISHIPENCIL CO., LTD was used.

The acceptable range of the pencil hardness is equal to or higher than HB, and it is preferable that the pencil hardness is equal to or higher than H. The cured film having a pencil hardness of equal to or lower than B is not preferable, because in a case of being handled, there is a possibility that scratches are generated.

(Gloss of Cured Film)

A cured film was formed in the same procedure as the evaluation of the pencil hardness.

The glossiness of the obtained cured film was measured at a measurement angle of 60° using a gloss meter "GM-268 Plus" manufactured by Konica Minolta, Inc. Based on the measurement results, the gloss of the cured film was evaluated according to the following standards. GU is the abbreviation for Gross Unit in the following.

—Evaluation Standard of Gloss—

A: The glossiness is 85 GU (Gross Unit) or more
B: The glossiness is 75 GU or more and less than 85
C: The glossiness is less than 75 GU (Jetting Properties of Ink)

The ink obtained as above (within a day at room temperature after the preparation) was jetted from a head of an ink jet printer (SP-300V, manufactured by Roland DG Corporation) for 30 minutes, and then the jetting was stopped.

Five minutes after the jetting was stopped, the ink was jetted again from the aforementioned head onto the aforementioned substrate, thereby forming a 5 cm×5 cm solid image.

By visually observing the image, whether or not dead pixels occurred due to defective nozzles and the like was checked, and the jetting properties of the ink were evaluated according to the evaluation standards described below.

In the following evaluation standards, "A" shows that the jetting properties of the ink are most excellent.

—Evaluation Standard of Jetting Properties—

A: The dead pixels occurring due to defective nozzles and the like were not observed, and an excellent image was obtained.

B: Although a small number of dead pixels occurring due to defective nozzles and the like were observed, the dead pixels were unproblematic for practical use.

C: Dead pixels occurred due to defective nozzles and the like, and the image was inappropriate for practical use.

D: The ink could not be jetted from the head.

(Redi spersibility of Ink)

By performing the following operation under yellow light, the redispersibility of the ink was evaluated.

By using the No. 2 bar of K HAND COATER manufactured by RK PrintCoat Instruments Ltd, the ink was applied onto an aluminum plate, and therefore a coated film having a thickness of 12 μm was formed. The obtained coated film was dried by being heated for 3 minutes at 60° C. The surface of the dried coated film was rubbed with sponge impregnated with water.

For each of the coated film not yet being rubbed with the sponge and the coated film having been rubbed with the sponge, Fourier transform infrared spectroscopy (FT-IR) was performed. Based on the obtained results, a residual rate of the microcapsules was calculated based on the following equation.

Residual rate of microcapsules=(peak intensity resulting from microcapsules in coated film having been rubbed with sponge/peak intensity resulting from microcapsules in coated film not yet being rubbed with sponge)×100

The microcapsule peak is a urea bond peak.

—Evaluation Standards of Redispersibility of Ink—
A: The residual rate of the microcapsules was equal to or lower than 1%, and the redispersibility was excellent.
B: The residual rate of the microcapsules was higher than 1% and equal to or lower than 5%, and the redispersibility was within an acceptable range for practical use.
C: The residual rate of the microcapsules was higher than 5% and equal to or lower than 10%, and the redispersibility was outside an acceptable range for practical use.
D: The residual rate of the microcapsules was higher than 10%, and the redispersibility was extremely poor.

(Storage Stability of Ink)

The above ink was sealed in a container and 2 weeks elapsed at 60° C.

With respect to the ink after a lapse of 2 weeks, an evaluation that is the same as the evaluation on the jetting properties was carried out, and the storage stability of the ink was evaluated according to the same evaluation standards.

In the evaluation standards, "A" shows that the storage stability of the ink is most excellent.

(Adhesiveness of Cured Film)

A cured film was formed in the same manner as the cured film in the evaluation of the pencil hardness.

The obtained cured film was subjected to a crosshatch test based on ISO 2409 (2013) (cross-cut method) and evaluated according to the evaluation standards described below.

During the crosshatch test, cuts were made at an interval of 1 mm, and in this way, 25 square lattices having a size of 1 mm×1 mm were formed.

In the evaluation standards below, 0 or 1 is an acceptable level for practical use. In the evaluation standards below, the proportion (%) of peeled lattices is a value obtained by the following equation. The total number of lattices in the following equation is 25.

Proportion (%) of peeled lattices=[(number of peeled lattices)/(total number of lattices)]×100

—Evaluation Standards of Adhesiveness of Cured Film—
0: The proportion (%) of peeled lattices was 0%.
1: The proportion (%) of peeled lattices was higher than 0% and equal to or lower than 5%.
2: The proportion (%) of peeled lattices was higher than 5% and equal to or lower than 15%.
3: The proportion (%) of peeled lattices was higher than 15% and equal to or lower than 35%.
4: The proportion (%) of peeled lattices was higher than 35% and equal to or lower than 65%.
5: The proportion (%) of peeled lattices was higher than 65%.

Examples 2 to 11

The same operation as in Example 1 was performed, except that the type of the dispersant was changed as shown in Table 4.

The results are shown in Table 4.

Examples 12 and 13

The same operation as in Examples 3 and 6 was performed, except that a part of the polymerizable monomers (SR-833S and SR-399E) was replaced with a sensitizer (ITX: 2-isopropylthioxanthone) while maintaining a mass ratio of SR-833S and SR-399E, which are polymerizable monomers, constant.

The results are shown in Table 4.

In Examples 12 and 13, the content of the sensitizer with respect to the total solid content of the oil-phase component was adjusted to be 0.6% by mass.

Examples 14 to 20

The same operation as in Example 3 was performed, except that the mass ratio (dispersant/MC solid content) was changed as shown in Table 4 by changing the mass ratio of the dispersant to the shell component, while maintaining a total amount of the dispersant and the shell component (solid content of D-120N), constant.

The results are shown in Table 4.

Examples 21 to 33

The same operation as in Examples 1 to 13 was performed, except that the some of the shell component (solid content of D-120N) was replaced with the following solid content of D-116N.

The results are shown in Table 4.

In Examples 21 to 33, a total amount of the solid content of D-116N with respect to the total solid content of the oil-phase component was adjusted to be 5% by mass, and a total amount of the solid content of D-120N with respect to the total solid content of the oil-phase component was adjusted to be 38.9% by mass.

Comparative Examples 1 to 3

The same operation as in Example 1 was performed, except that Dispersant A-1 was changed to the dispersant of the same mass, which is shown in Table 4.

The results are shown in Table 4.

Dispersant "F1" in Comparative Example 1 is a comparative dispersant, and specifically, is sodium polyacrylate (YS100 manufactured by NIPPON SHOKUBAI CO., LTD.).

Dispersant "F2" in Comparative Example 2 is a comparative dispersant, and specifically, is phthalated gelatin (#801 manufactured by Nitta Gelatin Inc.).

Dispersant "F3" in Comparative Example 3 is a comparative dispersant, and specifically, is PVA (polyvinyl alcohol) (PVA-102, manufactured by KURARAY CO., LTD.).

TABLE 4

| | MC solid content | | | | | | | Dispersant | | | | |
|---|---|---|---|---|---|---|---|---|---|---|---|---|
| | Shell material | | | | | | | | | | | |
| | Tri- or higher functional NCO compound | Hydrophilic group-introduced NCO compound | Shell Bond (U) | Core | | | | | | Hydro- | | |
| | | | | Polymerizable compound | | Initiator | Sensi-tizer | Type | Molecular weight | Bond (U) | philic group | Value (U) (mmol/g) | Value (a) (mmol/g) |
| Example 1 | 120N | — | Y | SR833 | SR399E | IRG819 | — | A-1 | 2800 | Y | Y | 5.0 | 1.67 |
| Example 2 | 120N | — | Y | SR833 | SR399E | IRG819 | — | A-4 | 3600 | Y | Y | 2.9 | 0.97 |
| Example 3 | 120N | — | Y | SR833 | SR399E | IRG819 | — | A-5 | 3200 | Y | Y | 3.6 | 1.21 |
| Example 4 | 120N | — | Y | SR833 | SR399E | IRG819 | — | A-8 | 2700 | Y | Y | 5.4 | 1.80 |

TABLE 4-continued

| | | | | | | | | | | | | | |
|---|---|---|---|---|---|---|---|---|---|---|---|---|---|
| Example 5 | 120N | — | Y | SR833 | SR399E | IRG819 | — | A-11 | 2800 | Y | Y | 4.9 | 3.26 |
| Example 6 | 120N | — | Y | SR833 | SR399E | IRG819 | — | A-12 | 2800 | Y | Y | 4.9 | 1.63 |
| Example 7 | 120N | — | Y | SR833 | SR399E | IRG819 | — | A-17 | 3100 | Y | Y | 4.0 | 1.33 |
| Example 8 | 120N | — | Y | SR833 | SR399E | IRG819 | — | A-23 | 2900 | Y | Y | 4.6 | 1.53 |
| Example 9 | 120N | — | Y | SR833 | SR399E | IRG819 | — | B-3 | 2700 | Y | Y | 5.3 | 1.78 |
| Example 10 | 120N | — | Y | SR833 | SR399E | IRG819 | — | C-3 | 3000 | Y | Y | 3.5 | 0.88 |
| Example 11 | 120N | — | Y | SR833 | SR399E | IRG819 | — | D-2 | 2500 | Y | Y | 0.4 | 0.00 |
| Example 12 | 120N | — | Y | SR833 | SR399E | IRG819 | ITX | A-5 | 3200 | Y | Y | 3.6 | 1.21 |
| Example 13 | 120N | — | Y | SR833 | SR399E | IRG819 | ITX | A-12 | 2800 | Y | Y | 4.9 | 1.63 |
| Example 14 | 120N | — | Y | SR833 | SR399E | IRG819 | — | A-5 | 3200 | Y | Y | 3.6 | 1.21 |
| Example 15 | 120N | — | Y | SR833 | SR399E | IRG819 | — | A-5 | 3200 | Y | Y | 3.6 | 1.21 |
| Example 16 | 120N | — | Y | SR833 | SR399E | IRG819 | — | A-5 | 3200 | Y | Y | 3.6 | 1.21 |
| Example 17 | 120N | — | Y | SR833 | SR399E | IRG819 | — | A-5 | 3200 | Y | Y | 3.6 | 1.21 |
| Example 18 | 120N | — | Y | SR833 | SR399E | IRG819 | — | A-5 | 3200 | Y | Y | 3.6 | 1.21 |
| Example 19 | 120N | — | Y | SR833 | SR399E | IRG819 | — | A-5 | 3200 | Y | Y | 3.6 | 1.21 |
| Example 20 | 120N | — | Y | SR833 | SR399E | IRG819 | — | A-5 | 3200 | Y | Y | 3.6 | 1.21 |
| Example 21 | 120N | 116N | Y | SR833 | SR399E | IRG819 | — | A-1 | 2800 | Y | Y | 5.0 | 1.67 |
| Example 22 | 120N | 116N | Y | SR833 | SR399E | IRG819 | — | A-4 | 3600 | Y | Y | 2.9 | 0.97 |
| Example 23 | 120N | 116N | Y | SR833 | SR399E | IRG819 | — | A-5 | 3200 | Y | Y | 3.6 | 1.21 |
| Example 24 | 120N | 116N | Y | SR833 | SR399E | IRG819 | — | A-8 | 2700 | Y | Y | 5.4 | 1.80 |
| Example 25 | 120N | 116N | Y | SR833 | SR399E | IRG819 | — | A-11 | 2800 | Y | Y | 4.9 | 3.26 |
| Example 26 | 120N | 116N | Y | SR833 | SR399E | IRG819 | — | A-12 | 2800 | Y | Y | 4.9 | 1.63 |
| Example 27 | 120N | 116N | Y | SR833 | SR399E | IRG819 | — | A-17 | 3100 | Y | Y | 4.0 | 1.33 |
| Example 28 | 120N | 116N | Y | SR833 | SR399E | IRG819 | — | A-23 | 2900 | Y | Y | 4.6 | 1.53 |
| Example 29 | 120N | 116N | Y | SR833 | SR399E | IRG819 | — | B-3 | 2700 | Y | Y | 5.3 | 1.78 |
| Example 30 | 120N | 116N | Y | SR833 | SR399E | IRG819 | — | C-3 | 3000 | Y | Y | 3.5 | 0.88 |
| Example 31 | 120N | 116N | Y | SR833 | SR399E | IRG819 | — | D-2 | 2500 | Y | Y | 0.4 | 0.00 |
| Example 32 | 120N | 116N | Y | SR833 | SR399E | IRG819 | ITX | A-5 | 3200 | Y | Y | 3.6 | 1.21 |
| Example 33 | 120N | 116N | Y | SR833 | SR399E | IRG819 | ITX | A-12 | 2800 | Y | Y | 4.9 | 1.63 |
| Comparative Example 1 | 120N | — | Y | SR833 | SR399E | IRG819 | — | F1 | 3500 | N | Y | N.D. | N.D. |
| Comparative Example 2 | 120N | — | Y | SR833 | SR399E | IRG819 | — | F2 | N.D. | N | Y | N.D. | N.D. |
| Comparative Example 3 | 120N | — | Y | SR833 | SR399E | IRG819 | — | F3 | 8800 | N | Y | N.D. | N.D. |

| | Mass ratio [dispersant/MC solid content] | Particle diameter (μm) | Pencil hardness | Glossiness | Jetting properties | Redispersibility | Storage Stability | Adhesiveness |
|---|---|---|---|---|---|---|---|---|
| Example 1 | 0.100 | 0.190 | H | A | A | B | A | 0 |
| Example 2 | 0.100 | 0.180 | H | A | A | B | A | 0 |
| Example 3 | 0.100 | 0.150 | H | A | A | B | A | 0 |
| Example 4 | 0.100 | 0.180 | H | A | A | B | A | 0 |
| Example 5 | 0.100 | 0.160 | H | A | A | B | A | 0 |
| Example 6 | 0.100 | 0.140 | H | A | A | B | A | 0 |
| Example 7 | 0.100 | 0.130 | H | A | A | B | A | 0 |
| Example 8 | 0.100 | 0.170 | H | A | A | B | A | 0 |
| Example 9 | 0.100 | 0.260 | H | A | A | B | B | 0 |
| Example 10 | 0.100 | 0.290 | H | A | A | B | B | 0 |
| Example 11 | 0.100 | 0.350 | F | B | B | B | B | 0 |
| Example 12 | 0.100 | 0.170 | 2H | A | A | B | A | 0 |
| Example 13 | 0.100 | 0.140 | 2H | A | A | B | A | 0 |
| Example 14 | 0.025 | 0.320 | H | A | B | B | A | 0 |
| Example 15 | 0.050 | 0.150 | H | A | A | B | A | 0 |
| Example 16 | 0.200 | 0.150 | H | A | A | B | A | 0 |
| Example 17 | 0.400 | 0.140 | H | A | A | B | A | 0 |
| Example 18 | 0.600 | 0.140 | H | A | A | B | A | 0 |
| Example 19 | 0.800 | 0.140 | F | A | A | B | A | 0 |
| Example 20 | 1.000 | 0.140 | F | A | A | B | A | 0 |
| Example 21 | 0.100 | 0.130 | H | A | A | A | A | 0 |
| Example 22 | 0.100 | 0.120 | H | A | A | A | A | 0 |
| Example 23 | 0.100 | 0.120 | H | A | A | A | A | 0 |
| Example 24 | 0.100 | 0.120 | H | A | A | A | A | 0 |
| Example 25 | 0.100 | 0.110 | H | A | A | A | A | 0 |
| Example 26 | 0.100 | 0.100 | H | A | A | A | A | 0 |
| Example 27 | 0.100 | 0.100 | H | A | A | A | A | 0 |
| Example 28 | 0.100 | 0.120 | H | A | A | A | A | 0 |
| Example 29 | 0.100 | 0.210 | H | A | A | A | B | 0 |
| Example 30 | 0.100 | 0.240 | H | A | A | A | B | 0 |
| Example 31 | 0.100 | 0.320 | F | B | B | A | B | 0 |
| Example 32 | 0.100 | 0.120 | 2H | A | A | A | A | 0 |
| Example 33 | 0.100 | 0.100 | 2H | A | A | A | A | 0 |
| Comparative Example 1 | 0.100 | 0.600 | 3B | C | D | B | D | 5 |
| Comparative Example 2 | 0.100 | 0.550 | 3B | C | D | B | D | 5 |
| Comparative Example 3 | 0.100 | 0.650 | 3B | C | D | B | D | 5 |

—Explanation of Tables 4 and 5—
Terms in Tables 4 and 5 are as below.
"Molecular weight" of the dispersant indicates weight-average molecular weight (Mw) of the dispersant.
MC solid content indicates the total solid content of the microcapsules.
Tri- or higher functional NCO compound indicates a tri- or higher functional isocyanate compound.
Hydrophilic group-introduced NCO compound indicates an NCO compound into which a hydrophilic group is introduced.
Initiator indicates a photopolymerization initiator.
120N indicates the solid contents of "TAKENATE (registered trademark) D-120N" (an adduct obtained by adding, at 1:3 (molar ratio), trimethylolpropane (TMP) and 1,3-bis(isocyanatomethyl)cyclohexane (HXDI) (that is, a trifunctional isocyanate compound); the structure thereof is as below) manufactured by Mitsui Chemicals, Inc. The "TAKENATE (registered trademark) D-120N" is a 75% by mass ethyl acetate solution of the above trifunctional isocyanate compound.
116N indicates the solid contents of "TAKENATE (registered trademark) D-116N" (an adduct of trimethylolpropane (TMP), m-xylylene diisocyanate (XDI), and polyethylene glycol monomethyl ether (E090); the structure thereof is shown below) manufactured by Mitsui Chemicals, Inc. The 116N is an isocyanate compound into which a hydrophilic group (the group represented by Formula (WS) in which $R^{W1}$ represents an ethylene group, $R^{W2}$ represents a methyl group, and nw is 90) is introduced. The "TAKENATE (registered trademark) D-116N" is a 50% by mass ethyl acetate solution of the above isocyanate compound into which the hydrophilic group is introduced.

IRG819 indicates "IRGACURE (registered trademark) 819" (bis(2,4,6-trimethylbenzoyl)-phenylphosphine oxide; photopolymerization initiator) manufactured by BASF SE.
ITX indicates 2-isopropylthioxanthone.
"Y" in the "Hydrophilic group" column of the "Dispersant" column indicates that the dispersant has a hydrophilic group.
"Y" in the "Bond (U)" column indicates that at least one of a urethane bond or a urea bond is contained, and "N" in this column indicates that neither of a urethane bond nor a urea bond is contained.

As shown in Table 4, in Examples 1 to 33 which used the ink (that is, aqueous dispersion) which contains the microcapsule having the core containing the photopolymerization initiator and the polymerizable monomer, and contains the dispersant having at least one bond selected from a urethane bond or a urea bond and the hydrophilic group, the pencil hardness of the cured film was excellent, and the dispersion stability (that is, jetting properties and storage stability) of the ink was excellent. Furthermore, in Examples 1 to 33, the gloss of the cured film, the adhesiveness of the cured film to the substrate (PS), and redispersibility of the ink were also excellent.

Meanwhile, in Comparative Examples 1 to 3 which used Dispersants F1 to F3 having neither a urethane bond nor a urea bond, the dispersion stability (that is, jetting properties and storage stability) of the ink deteriorated.

Furthermore, in Comparative Examples 1 to 3, the pencil hardness of the cured film and the adhesiveness of the cured film to the substrate (PS) also deteriorated. In Comparative Examples 1 to 3, it is considered that the reason of the deterioration of the pencil hardness of the cured film and the adhesiveness of the cured film to the substrate (PS) is because the hydrophilicity of Dispersants (F1 to F3) was

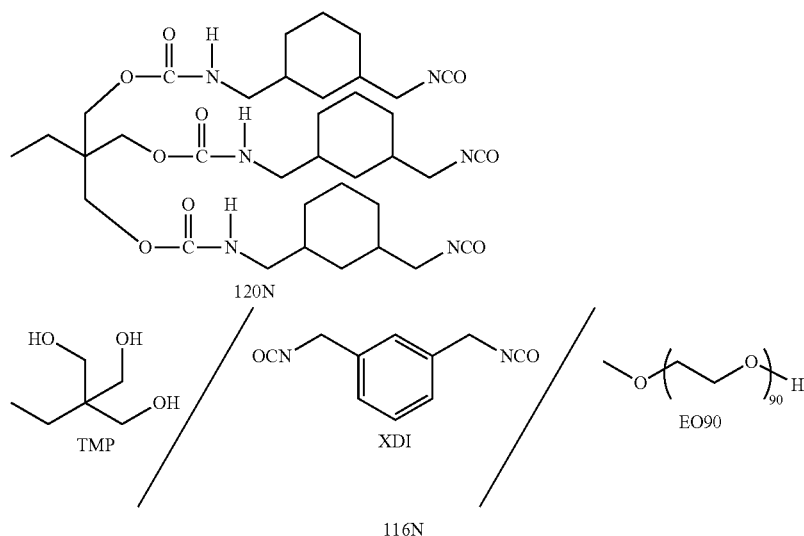

SR833 indicates "SR-833S" (tricyclodecanedimethanol diacrylate; difunctional polymerizable monomer) manufactured by Sartomer Arkema Inc.
SR399E indicates "SR-399E" (dipentaerythritol pentaacrylate; pentafunctional polymerizable monomer) manufactured by Sartomer Arkema Inc.

excessively high and thus the interaction with the hydrophobic substrate (PS) became weak.

In addition, based on the results of the jetting properties in Examples 1 to 11, it is understood that in a case where at least one hydrophilic group of the dispersant is an anionic group, the dispersion stability of the microcapsule is further improved.

Furthermore, based on the results of the storage stability in Examples 1 to 11, it is understood that in a case where the dispersant is the compound represented by Formula (A), the dispersion stability of the microcapsule is further improved.

Furthermore, based on the results of the jetting properties in Examples 14 to 20, it is understood that in the case where the mass ratio (dispersant/MC solid content) (that is, a ratio of the content mass of the dispersant with respect to the content mass of the total solid content of the microcapsule) is 0.05 or more, the dispersion stability of the microcapsule is further improved.

Furthermore, based on the results of the pencil hardness in Examples 14 to 20, it is understood that in the case where the mass ratio (dispersant/MC solid content) is 0.7 or less, the pencil hardness is further improved.

Furthermore, based on the results of the redispersibility in Examples 1 to 8 and 21 to 28, it is understood that in the case where the shell has the hydrophilic group, the dispersion stability of the microcapsule and the redispersibility are further improved.

<Checking Relating to Aqueous Dispersion Having Microcapsule>

With respect to each of the aqueous dispersions having the microcapsules of Examples 1 to 33, the following checking was performed.

(Volume Average Dispersed Particle Diameter of Microcapsule)

With respect to each of the aqueous dispersions having the microcapsules of Examples 1 to 33, the volume average dispersed particle diameter of the microcapsules was measured by a light scattering method. The results are shown in Table 4.

The measurement of the volume average dispersed particle diameter by the light scattering method was carried out by using a wet-type particle size distribution measurement apparatus, LA-960 (manufactured by HORIBA, Ltd.).

(Checking Whether Shell of Microcapsule Has Three-Dimensional Cross-Linked Structure)

With respect to each of the aqueous dispersions having the microcapsules of Examples 1 to 33, whether the shell of the microcapsule actually has the three-dimensional cross-linked structure was checked. The operation described below was performed under the condition of a liquid temperature of 25° C.

From the aqueous dispersion having the microcapsule obtained as above, a sample was collected. Tetrahydrofuran (THF) having a mass 100 times the mass of the total solid content in the sample was added to and mixed with the collected sample, thereby preparing a diluted solution. The obtained diluted solution was subjected to centrifugation (80,000 rpm, 40 minutes). After centrifugation, the presence of the residue was checked by visual observation. In a case where the residue was present, water was added to the residue, and the resultant was stirred for 1 hour by using a stirrer. The residue was redispersed in water, and therefore a redispersion liquid was obtained. For the obtained redispersion liquid, by using a wet-type particle size distribution measurement apparatus (LA-960, manufactured by HORIBA, Ltd.), the particle size distribution was measured by the light scattering method. In a case where the particle size distribution could be checked by the operation described above, it was determined that the shell of the microcapsule had the three-dimensional cross-linked structure.

As the result, it was checked that the shell of the microcapsule had the three-dimensional cross-linked structure in the aqueous dispersions having the microcapsules in Examples 1 to 33.

In addition, based on the above result and the result of the Fourier transform infrared spectroscopy (FT-IR), the microcapsule had the polymerizable group in the aqueous dispersions having the microcapsules in Examples 1 to 33.

(Checking Whether Core of Microcapsule Contains Photopolymerization Initiator)

In the aqueous dispersions having the microcapsules in Examples 1 to 33, whether the core of the microcapsule actually contained the photopolymerization initiator was checked by measuring an internal content rate (%) of the photopolymerization initiator. The details thereof are as described below. The operation described below was performed under the condition of a liquid temperature of 25° C.

From the aqueous dispersions having the microcapsules, two samples (hereinafter, will be referred to as "sample 1A" and "sample 2A") having the same mass were collected.

Tetrahydrofuran (THF) having a mass 100 times the mass of the total solid content in the sample 1A was added to and mixed with the sample 1A, thereby preparing a diluted solution. The obtained diluted solution was subjected to centrifugation under the conditions of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator".

Furthermore, the sample 2A was subjected to centrifugation under the same condition as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator".

Based on "total amount of photopolymerization initiator" and "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

As the results, all of the internal content rates of the three photopolymerization initiators in the aqueous dispersions having the microcapsules in Examples 1 to 33 were 99% or more, and it was confirmed that the cores of the microcapsules actually contained the photopolymerization initiators.

(Checking Whether Core of Microcapsule Contains Polymerizable Compound)

In the aqueous dispersion having the microcapsule, whether the core of the microcapsule actually contained the polymerizable compound was checked by measuring an internal content rate (%) of the polymerizable compound.

The internal content rate of the polymerizable monomer was measured by the same method as that of the internal content rate of the photopolymerization initiator.

The measurement of the internal content rate of the polymerizable compound was performed on each of two kinds of the polymerizable compounds (SR833 and SR399E).

As the results, all of the internal content rates of the two kinds of the polymerizable compounds in the aqueous dispersions having the microcapsules in Examples 1 to 33 were 99% or more, and it was confirmed that the cores of the microcapsules actually contained the two kinds of the polymerizable compounds.

Example 34

An ink of Example 34 was prepared in the same manner as in Example 2 except that in "Manufacture of Aqueous Dispersion Having Microcapsule" and "Manufacture of Ink Jet Ink" of Example 2, SR-833S and SR-399E were changed to Trixene™ BI 7982 (thermally polymerizable monomer; blocked isocyanate; Baxenden Chemicals Ltd) in which propylene glycol monomethyl ether was distilled off under reduced pressure at 2.67 kPa (20 torr) at 60° C. and that IRGACURE 819 was not used.

A mass of Trixene™ BI 7982 in which propylene glycol monomethyl ether was distilled off under reduced pressure at 2.67 kPa (20 torr) at 60° C. was the mass same as a total mass of SR-833S and SR-399E in Example 2.

Hereinafter, "Trixene™ BI 7982 in which propylene glycol monomethyl ether was distilled off under reduced pressure at 2.67 kPa (20 torr) at 60° C." will also be referred to as "BI 7982".

Using the ink of Example 34, the evaluation of Example 34 was carried out in the same manner as the evaluation of Example 2 excepting the following conditions.

In the evaluation of Example 34, the operation in which "the coated film after drying was irradiated with UV" in the evaluation of Example 2, was changed to the operation in which the coated film after drying was heated for 5 minutes in an oven at 160° C., so as to cure the coated film after drying.

The results are shown in Table 5.

Example 35

An ink of Example 35 was prepared in the same manner as in Example 15 except that in "Manufacture of Aqueous Dispersion Having Microcapsule" and "Manufacture of Ink Jet Ink" of Example 15, SR-833S and SR-399E were changed to BI 7982 and that IRGACURE 819 was not used.

A mass of BI 7982 used herein was the same mass as the total mass of SR-833S and SR-399E of Example 15.

Using the ink of Example 35, the evaluation same as that of Example 34 was carried out.

The results are shown in Table 5.

Example 36

An ink of Example 36 was prepared in the same manner as in Example 21 except that in "Manufacture of Aqueous Dispersion Having Microcapsule" and "Manufacture of Ink Jet Ink" of Example 21, SR-833S and SR-399E were changed to BI 7982 and that IRGACURE 819 was not used.

A mass of BI 7982 used herein was the same mass as the total mass of SR-833S and SR-399E of Example 21.

Using the ink of Example 36, the evaluation same as that of Example 34 was carried out.

The results are shown in Table 5.

Example 37

An ink of Example 37 was prepared in the same manner as in Example 2 except that in "Manufacture of Aqueous Dispersion Having Microcapsule" and "Manufacture of Ink Jet Ink" of Example 2, SR-833S and SR-399E were changed to EPICLON™ 840 (thermally polymerizable oligomer having an epoxy group, DIC CORPORATION; hereinafter, will also be referred to as "EP840"), and that IRGACURE 819 was changed to 2-methylimidazole (denoted as "2MI" in Table 5; thermal curing accelerator) having the same mass thereof.

A mass of EP840 used herein was the same mass as the total mass of SR-833S and SR-399E of Example 2.

Using the ink of Example 37, the evaluation same as that of Example 34 was carried out.

The results are shown in Table 5.

Comparative Example 4

An ink of Comparative Example 4 was prepared in the same manner as in Comparative Example 1 except that in "Manufacture of Aqueous Dispersion Having Microcapsule" and "Manufacture of Ink Jet Ink" of Comparative Example 1, SR-833S and SR-399E were changed to BI 7982 and that IRGACURE 819 was not used.

A mass of BI 7982 used herein was the same mass as the total mass of SR-833S and SR-399E of Comparative Example 1.

Using the ink of Comparative Example 4, the evaluation same as that of Example 34 was carried out.

The results are shown in Table 5.

TABLE 5

| | MC solid content | | | | | | | | | |
|---|---|---|---|---|---|---|---|---|---|---|
| | Shell material | | | Core | | Dispersant | | | | |
| | Tri- or higher functional NCO compound | Hydrophilic group-introduced NCO compound | Shell Bond (U) | Polymerizable compound | Thermal curing accelerator | Type | Molecular weight | Bond (U) | Hydrophilic group | Value (U) (mmol/g) | Value (a) (mmol/g) |
| Example 34 | 120N | — | Y | BI7982 | — | A-4 | 3600 | Y | Y | 2.9 | 0.97 |
| Example 35 | 120N | — | Y | BI7982 | — | A-5 | 3200 | Y | Y | 3.6 | 1.21 |
| Example 36 | 120N | 116N | Y | BI7982 | — | A-1 | 2800 | Y | Y | 5.0 | 1.67 |
| Example 37 | 120N | — | Y | EP840 | 2MI | A-4 | 3600 | Y | Y | 2.9 | 0.97 |
| Comparative Example 4 | 120N | — | Y | BI7982 | — | F1 | 3500 | N | Y | N.D. | N.D. |

TABLE 5-continued

|  | Mass ratio [dispersant/MC solid content] | Particle diameter (μm) | Pencil hardness | Glossiness | Jetting properties | Redispersibility | Storage Stability | Adhesiveness |
|---|---|---|---|---|---|---|---|---|
| Example 34 | 0.100 | 0.180 | H | A | A | B | A | 0 |
| Example 35 | 0.050 | 0.150 | H | A | A | B | A | 0 |
| Example 36 | 0.100 | 0.130 | H | A | A | A | A | 0 |
| Example 37 | 0.100 | 0.180 | H | A | A | B | A | 0 |
| Comparative Example 4 | 0.100 | 0.600 | 3B | C | D | B | D | 5 |

As shown in Table 5, in Examples 34 to 37 which used the ink (that is, aqueous dispersion) which contains the microcapsule having the core containing the thermally polymerizable compound, and contains the dispersant having at least one bond selected from the urethane bond or the urea bond and the hydrophilic group, the pencil hardness of the cured film was excellent, and the dispersion stability (that is, jetting properties and storage stability) of the ink was excellent. Furthermore, in Examples 34 to 37, the gloss of the cured film, the adhesiveness of the cured film to the substrate (PS), and the redispersibility of the ink were also excellent.

Meanwhile, in Comparative Example 4 which used Dispersant F1 having neither the urethane bond nor the urea bond, the dispersion stability (that is, jetting properties and storage stability) of the ink deteriorated.

Furthermore, in Comparative Example 4, the pencil hardness of the cured film and the adhesiveness of the cured film to the substrate (PS) also deteriorated. In Comparative Example 4, it is considered that the reason of the deterioration of the pencil hardness of the cured film and the adhesiveness of the cured film to the substrate (PS) is because the hydrophilicity of Dispersant (F1) was excessively high and thus the interaction with the hydrophobic substrate (PS) became weak.

The entire content of JP2016-021363 filed on Feb. 5, 2016 and JP2016-144557 filed on Jul. 22, 2016 are incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. An aqueous dispersion comprising:
a microcapsule comprising: a shell having a three-dimensional cross-linked structure comprising at least one bond selected from a urethane bond or a urea bond; and a core, at least one of the shell or the core having a polymerizable group;
a dispersant comprising: at least one bond selected from a urethane bond or a urea bond; and a hydrophilic group; and
water,
wherein at least one dispersant is a compound represented by the following Formula (X):

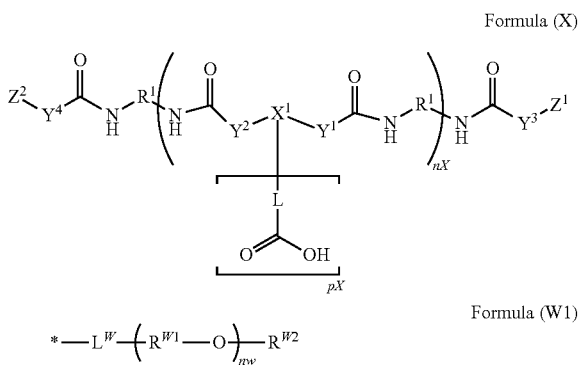

wherein, in Formula (X), $X^1$ represents a (pX+2)-valent organic group; nX and pX each independently represents an integer that is 1 or more; $Y^1$ and $Y^2$ each independently represents O or NH; $Y^3$ represents O, S, NH, or $NZ^3$; $Y^4$ represents O, S, NH, or $NZ^4$; $R^1$ represents a divalent hydrocarbon group having 1 to 20 carbon atoms that may comprise an alicyclic structure or an aromatic ring structure and that may have a substituent; L represents a single bond or a divalent linking group; $Z^1$ and $Z^2$ each independently represents a hydrocarbon group having 1 to 30 carbon atoms that may have a substituent, or represents a group (W1) represented by Formula (W1); and $Z^3$ and $Z^4$ each independently represents a group (W1) represented by Formula (W1);

wherein, in Formula (W1), $R^{W1}$ represents an alkylene group having 1 to 6 carbon atoms that may be branched; $R^{W2}$ represents an alkyl group having 1 to 6 carbon atoms that may be branched; $L^W$ represents a single bond, or a divalent hydrocarbon group having 1 to 30 carbon atoms that may have a substituent; nw represents an integer from 2 to 200; and * represents a binding position; and wherein a carboxy group in Formula (X) may be neutralized.

2. The aqueous dispersion according to claim 1, wherein at least one hydrophilic group of the dispersant is an anionic group.

3. The aqueous dispersion according to claim 2, wherein the anionic group is at least one of a carboxy group or a salt of a carboxy group.

4. The aqueous dispersion according to claim 1, wherein the compound represented by Formula (X) is a compound represented by the following Formula (A):

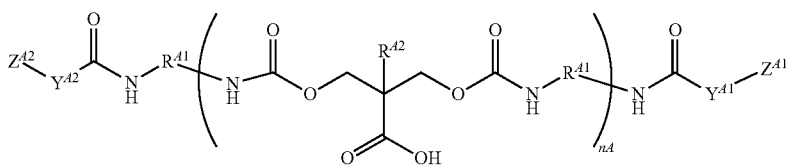

Formula (A)

wherein in Formula (A), nA represents an integer that is 1 or more; $R^{A1}$ represents a divalent hydrocarbon group having 1 to 20 carbon atoms that may contain an alicyclic structure or an aromatic ring structure and may have a substituent; $R^{A2}$ represents a hydrogen atom or an alkyl group having 1 to 10 carbon atoms; $Y^{A1}$ represents O, S, NH, or $NZ^{A3}$; $Y^{A2}$ represents O, S, NH, or $NZ^{A4}$; $Z^{A1}$ and $Z^{A2}$ each independently represents a hydrocarbon group having 1 to 30 carbon atoms that may have a substituent, or represents a group (W1) represented by Formula (W1); and $Z^{A3}$ and $Z^{A4}$ each independently represents a group (W1) represented by Formula (W1); and wherein a carboxy group in Formula (A) may be neutralized.

5. The aqueous dispersion according to claim 1, wherein the dispersant has a value (U), that is obtained by the following Equation (U), that is from 1 mmol/g to 10 mmol/g:

Value (U)=(total number of urethane bonds and urea bonds contained in one molecule of dispersant/ molecular weight of dispersant)×1000    Equation (U).

6. The aqueous dispersion according to claim 1, wherein the dispersant comprises an anionic group as the hydrophilic group, and a value (a), that is a millimolar number of the anionic group included in 1 g of the dispersant, is from 0.3 mmol/g to 3.5 mmol/g.

7. The aqueous dispersion according to claim 1, wherein a ratio of a mass content of the dispersant with respect to a mass content of a total solid content of the microcapsule is from 0.05 to 0.7.

8. The aqueous dispersion according to claim 1, wherein the shell comprises a nonionic group as the hydrophilic group.

9. The aqueous dispersion according to claim 8, wherein the nonionic group included as the hydrophilic group of the shell is a group (WS) represented by the following Formula (WS):

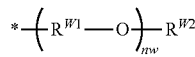

Formula (WS)

wherein, in Formula (WS), $R^{W1}$ represents an alkylene group having 1 to 6 carbon atoms that may be branched; $R^{W2}$ represents an alkyl group having 1 to 6 carbon atoms that may be branched; nw represents an integer from 2 to 200; and * represents a binding position.

10. The aqueous dispersion according to claim 1, wherein the polymerizable group is a radical polymerizable group.

11. The aqueous dispersion according to claim 1, wherein the core comprises a radical polymerizable compound.

12. The aqueous dispersion according to claim 1, wherein the core comprises a di- or lower functional radical polymerizable compound and a tri- or higher functional radical polymerizable compound.

13. The aqueous dispersion according to claim 1, wherein the core comprises a photopolymerization initiator.

14. The aqueous dispersion according to claim 1, wherein the polymerizable group is a thermally polymerizable group.

15. The aqueous dispersion according to claim 1, wherein the core comprises a thermally polymerizable compound.

16. The aqueous dispersion according to claim 1, wherein a sum of a total solid content of the microcapsule and a total amount of the dispersant with respect to a total solid content of the aqueous dispersion is 50% by mass or more.

17. The aqueous dispersion according to claim 1, that is used as an ink jet ink.

18. A method for manufacturing the aqueous dispersion according to claim 1, the method comprising a microcapsule-forming step of:

mixing, with a water-phase component comprising water, an oil-phase component comprising an organic solvent, the dispersant, a tri- or higher functional isocyanate compound, and at least one of an isocyanate compound into which a polymerizable group is introduced or a polymerizable compound; and emulsifying the obtained mixture so as to form the microcapsule.

19. An image forming method comprising:

an application step of applying the aqueous dispersion according to claim 1 to a recording medium; and a curing step of curing the aqueous dispersion applied to the recording medium.

* * * * *